United States Patent
Murakami et al.

(10) Patent No.: US 10,739,130 B2
(45) Date of Patent: *Aug. 11, 2020

(54) OPTICAL MEASURING DEVICE GENERATING POINT CLOUD DATA

(71) Applicant: Keyence Corporation, Osaka (JP)

(72) Inventors: Shigeto Murakami, Osaka (JP); Masaki Fujiwara, Osaka (JP); Takashi Nakatsukasa, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 117 days.

This patent is subject to a terminal disclaimer.

(21) Appl. No.: 15/618,161

(22) Filed: Jun. 9, 2017

(65) Prior Publication Data

US 2017/0370707 A1   Dec. 28, 2017

(30) Foreign Application Priority Data

Jun. 27, 2016   (JP) .................................. 2016-127053

(51) Int. Cl.
*G01B 11/25* (2006.01)
*H04N 5/247* (2006.01)

(52) U.S. Cl.
CPC .......... *G01B 11/2513* (2013.01); *H04N 5/247* (2013.01)

(58) Field of Classification Search
CPC ........................... G01B 11/2513; H04N 5/247
See application file for complete search history.

(56) References Cited

U.S. PATENT DOCUMENTS

| 2009/0046358 | A1* | 2/2009 | Shimada .............. G02B 21/088 359/381 |
| 2009/0195670 | A1* | 8/2009 | Koishi .................... G06T 15/50 348/223.1 |

(Continued)

FOREIGN PATENT DOCUMENTS

| JP | H1083050 A | 3/1998 |
| JP | 2001101410 A | 4/2001 |

(Continued)

OTHER PUBLICATIONS

Toni F. Schenk, Remote Sensing and Reconstruction for Three-Dimensional Objects and Scenes, Jul. 1-10, 1995, the International Society for Optical Engineering, vol. 2572, Entire Document (Year: 1995).*

(Continued)

*Primary Examiner* — Ayman A Abaza
*Assistant Examiner* — Hesham K Abouzahra
(74) *Attorney, Agent, or Firm* — Kilyk & Bowersox, P.L.L.C.

(57) ABSTRACT

Provided is a measuring device that can easily perform high-accuracy measurement at low cost. A stage is held on an installation part. A head unit including a light projecting unit and a light receiving unit, and the installation part are fixedly coupled together by a stand. A light shielding mechanism is attached to the stand in order to block ambient light. The light shielding mechanism includes a front cover member that covers a space on the stage from above. Point cloud data representing the three-dimensional shape of the measuring object is generated based on the light reception signal. Designation of a point to be measured in the measuring object is received, and a measurement value at the designated point is calculated based on the obtained point cloud data.

15 Claims, 32 Drawing Sheets

(56) References Cited

U.S. PATENT DOCUMENTS

| | | |
|---|---|---|
| 2012/0194672 A1 | 8/2012 | Kawa |
| 2012/0194673 A1 | 8/2012 | Kawa |
| 2013/0181983 A1 | 7/2013 | Kitamura et al. |
| 2014/0071243 A1 | 3/2014 | Nakatsukasa |
| 2014/0071458 A1 | 3/2014 | Nakatsukasa |
| 2014/0071459 A1 | 3/2014 | Nakatsukasa |
| 2014/0146325 A1* | 5/2014 | Tabuchi ................. G01B 11/24 356/609 |
| 2014/0152794 A1 | 6/2014 | Takahashi |
| 2016/0084633 A1* | 3/2016 | Ferrari .................. G01B 21/04 33/503 |
| 2016/0379050 A1* | 12/2016 | Tian .................. G06K 9/00281 382/118 |
| 2017/0030706 A1 | 2/2017 | Natori et al. |
| 2017/0032177 A1 | 2/2017 | Suenaga et al. |
| 2017/0370706 A1 | 12/2017 | Nakatsukasa |
| 2017/0370708 A1 | 12/2017 | Fujiwara et al. |

FOREIGN PATENT DOCUMENTS

| | | |
|---|---|---|
| JP | 2007121150 A | 5/2007 |
| JP | 2007255974 A | 10/2007 |
| JP | 2008174184 A | 7/2008 |
| JP | 2009106651 A | 5/2009 |
| JP | 2009276249 A | 11/2009 |
| JP | 2010164509 A | 7/2010 |
| JP | 2011118435 A | 6/2011 |
| JP | 2012008867 A | 1/2012 |
| JP | 2013228267 A | 11/2013 |
| JP | 2014013144 A | 1/2014 |
| JP | 2015212680 A | 11/2015 |

OTHER PUBLICATIONS

Guhring, J., "Dense 3-D surface acquisition by structured light using off-the-shelf components," SPIE vol. 4309, Jan. 22-23, 2001, pp. 220-231.

Bergmann, D., "New approach for automatic surface reconstruction with coded light," SPIE vol. 2572, Jul. 9-10, 1995, pp. 2-9.

* cited by examiner

FIRST

SEVENTH

THIRTEENTH

OPTICAL MEASURING DEVICE GENERATING POINT CLOUD DATA

CROSS-REFERENCE TO RELATED APPLICATIONS

The present application claims foreign priority based on Japanese Patent Application No. 2016-127053, filed Jun. 27, 2016, the contents of which is incorporated herein by reference.

BACKGROUND OF THE INVENTION

1. Field of the Invention

The present invention relates to a measuring device that measures a measuring object.

2. Description of Related Art

In a measuring device of a triangular distance measuring method, a surface of a measuring object is irradiated with light, and a light receiving element including pixels arrayed one-dimensionally or two-dimensionally receives the light reflected from the surface. A height of the surface of the measuring object can be measured based on a peak position of a light reception amount distribution obtained by a light reception signal output from the light receiving element.

Shape measurement of the triangular distance measuring method in which coded light and a phase shift method are combined is proposed in Toni F. Schenk, "Remote Sensing and Reconstruction for Three-Dimensional Objects and Scenes", Proceedings of SPIE, Volume 2572, pp. 1-9 (1995). Shape measurement of the triangular distance measuring method in which coded light and stripe light are combined is proposed in Sabry F. El-Hakim and Armin Gruen, "Videometrics and Optical Methods for 3D Shape Measurement", Proceedings of SPIE, Volume 4309, pp. 219-231 (2001). In these methods, shape measurement accuracy of the measuring object can be improved.

In the shape measurement of the triangular distance measuring method, when ambient light other than measurement light having a pattern is reflected by the measuring object and is incident on the light receiving element, a noise component caused by the ambient light is included in a light reception signal output from the light receiving element. In this case, the shape measurement accuracy of the measuring object is degraded.

In order to suppress the incidence of the ambient light on the measuring object, it is conceivable to install the measuring device in a darkroom. However, in this case, cost is increased because the darkroom needs to be prepared in addition to the measuring device. It is also difficult for a measurer who is unfamiliar with operation in the darkroom to perform efficient measurement operation.

SUMMARY OF THE INVENTION

An object of the present invention is to provide a measuring device that can easily perform high-accuracy measurement at low cost.

(1) A measuring device according to the present invention includes: a stage holding unit; a stage held by the stage holding unit and on which a measuring object is placed; a head unit including a light projecting unit and a light receiving unit, the light projecting unit irradiating the measuring object placed on the stage with measurement light having a pattern, the light receiving unit receiving the measurement light reflected by the measuring object and outputting a light reception signal representing a light reception amount; a coupling part that fixedly couples the head unit and the stage holding unit such that the measurement light is guided obliquely downward from the light projecting unit to the measuring object, and such that an optical axis of the light receiving unit extends obliquely downward; a point cloud data generating section that generates point cloud data representing a three-dimensional shape of the measuring object based on the light reception signal output from the light receiving unit; a measuring section that receives designation of a point to be measured in the measuring object and calculates a measurement value at the designated point based on the point cloud data generated by the point cloud data generating section; and a first light shielding member that is provided above a space on the stage so as to block ambient light from above the space on the stage, and so as not to block the measurement light, the space being defined on the stage so as to include the measuring object.

In the measuring device, the head unit including the light projecting unit and the light receiving unit is fixedly coupled to the stage holding unit. The measuring object is placed on the stage held by the stage holding unit, and the light projecting unit irradiates the measuring object with the measurement light having the pattern. The measurement light reflected by the measuring object is received by the light receiving unit, and a light reception signal representing a light reception amount is output. The point cloud data representing the three-dimensional shape of the measuring object is generated based on the light reception signal. The measurement value at the designated point is calculated based on the generated point cloud data.

When the ambient light other than the measurement light is reflected by the measuring object S and is incident on the light receiving unit, a noise component caused by the ambient light is included in the light reception signal output from the light receiving unit. In this case, the accuracy of the point cloud data is degraded.

According to the above configuration, the first light shielding member provided above the space on the stage blocks the ambient light from above the space on the stage. This enables the ambient light incident on the light receiving unit to be reduced without installing the measuring device in the darkroom. Accordingly, the noise component caused by the ambient light is reduced, and the degradation of the accuracy of the point cloud data is suppressed. As a result, the high-accuracy measurement can easily be performed at low cost.

(2) The first light shielding member may be configured to be able to switch between a closed state in which the space on the stage is covered from above and an open state in which the space on the stage is not covered from above.

In this case, the operation to place the measuring object on the stage and the operation to measure the measuring object are facilitated by switching the first light shielding member between the closed state and the open state.

(3) The first light shielding member may include a second light shielding member provided on at least one side of the space on the stage so as to block the ambient light from one side of the space on the stage, and so as not to block the measurement light.

In this case, the noise component caused by the ambient light is further reduced because the ambient light, which is reflected by the measuring object and is incident on the light receiving unit, is further reduced. As a result, the degradation of the accuracy of the point cloud data is further suppressed.

(4) The measuring device may further include a third light shielding member formed to surround a whole periphery of the space on the stage so as to block the ambient light from all sides of the space on the stage, and so as not to block at least part of the measurement light.

In this case, the noise component caused by the ambient light is further reduced because the ambient light, which is reflected by the measuring object and is incident on the light receiving unit, is further reduced. As a result, the degradation of the accuracy of the point cloud data is further suppressed.

(5) The measuring device may further include: an ambient light determining section that determines whether the ambient light has entered the space on the stage; and a report section that reports the entry of the ambient light when the ambient light determining section determines that the ambient light has entered the space on the stage.

In this case, the user can easily recognize the light shielding state of the ambient light blocked by the first and third light shielding members.

(6) The third light shielding member may have a bellows shape that is vertically expandable and contractible.

In this case, by vertically expanding and contracting at least part of the third light shielding member, the user can easily perform the operation to place the measuring object on the stage from the outside of the space on the stage and the operation to take out the measuring object on the stage to the outside of the space on the stage.

(7) The first light shielding member may include a light shielding member accommodation part that accommodates at least part of the third light shielding member.

In this case, the user can have at least the part of third light shielding member accommodated in the light shielding member accommodation part when the third light shielding member is unnecessary.

(8) The third light shielding member may be made of a flexible material, and may include a vertically extending slit.

In this case, by turning over the slit of the third light shielding member, the user can easily perform the operation to place the measuring object on the stage from the outside of the space on the stage and the operation to take out the measuring object on the stage to the outside of the space on the stage.

(9) The first light shielding member may be configured to be detachably attached to the coupling part.

In this case, the user can measure the measuring object in the darkroom with the first light shielding member being detached from the coupling part. In a room equipped with a lighting device, the user can measure the measuring object with the first light shielding member being attached to the coupling part. Thus, the user can attach and detach the first light shielding member to and from the coupling part according to an environment where the measuring object is measured.

When the first light shielding member is attached to the coupling part, the first light shielding member is provided integrally with the head unit and the stage holding unit. Therefore, the first light shielding member is accurately disposed at a position above the space on the stage.

(10) The light receiving unit may include a monochrome imaging element constituted by a plurality of pixels having a common sensitivity characteristic.

In the monochrome imaging element, unlike a color imaging element, it is not necessary to provide a pixel receiving light having a red wavelength, a pixel receiving light having a green wavelength, and a pixel receiving light having a blue wavelength. In the case where a specific wavelength such as the blue wavelength is adopted as the measurement light, only the pixel receiving the light having the specific wavelength can be used during the measurement in the color imaging element, while the monochrome imaging element is free from such restriction. Therefore, measurement resolution of the monochrome imaging element is higher than resolution of the color imaging element. In the monochrome imaging element, unlike the color imaging element, it is not necessary to provide a color filter in each pixel. Therefore, sensitivity of the monochrome imaging element is higher than sensitivity of the color imaging element. Accordingly, the point cloud data can be obtained with high accuracy.

(11) The measuring device may further include: a first storage section that stores region information for distinguishing a predetermined effective region and an ineffective region other than the effective region from each other with respect to the space on the stage; a measurement data obtaining section that performs first obtaining processing, in which the point cloud data corresponding to the effective region is obtained as the measurement data from three-dimensional shape data based on the region information stored in the first storage section, the three-dimensional shape data being generated by the point cloud data generating section; and a first receiving section that receives selection as to whether the first obtaining processing is performed, wherein the measurement data obtaining section performs second obtaining processing, in which the point cloud data corresponding to the effective region and the point cloud data corresponding to the ineffective region are obtained as the measurement data from the three-dimensional shape data generated by the point cloud data generating section, when the selection is made that the first obtaining processing is not performed, and the measuring section calculates the measurement value at the designated point based on the measurement data obtained through the first or second obtaining processing.

As described above, the positional relationship between the light receiving unit and the predetermined effective region on the stage is uniquely fixed because the light projecting unit, the light receiving unit, and the stage holding unit are integrally provided. Therefore, in the first obtaining processing, the measurement data corresponding to the effective region can accurately be obtained based on the positional relationship between the light receiving unit and the effective region.

The measurement data obtained through the first obtaining processing does not include the point cloud data corresponding to the ineffective region. Therefore, the measurement value at the point designated by the user is not mistakenly calculated based on the point cloud data corresponding to the ineffective region. Additionally, even if the user mistakenly designates the point in the ineffective region as the point to be measured in the measuring object, the point cloud data corresponding to the ineffective region is not used to calculate the measurement value. Accordingly, the calculation of an abnormal measurement value is prevented. As a result, the shape at the desired point of the measuring object can easily and accurately be measured.

(12) The measuring device may further include: a second receiving section that receives designation of a region to be removed in a region corresponding to the measurement data obtained by the measurement data obtaining section; and a measurement data correcting section that removes, when the region to be removed is designated, the point cloud data corresponding to the designated region from the measurement data obtained by the measurement data obtaining section.

In this case, the user can obtain the measurement data, in which the point cloud data corresponding to the designated region is removed, by designating the region to be removed. Therefore, the user can correct the once-obtained measurement data according to the measurement content. Accordingly, the convenience of the measurement of the measuring object is improved.

(13) The stage is provided in the stage holding unit so as to be rotatable about a rotation axis in a vertical direction, and the measuring device may further include a rotation control section that controls rotation of the stage, the point cloud data generating section may generate first three-dimensional shape data as the point cloud data based on a light reception signal output from the light receiving unit when the stage is located at a first rotation position, and may generate second three-dimensional shape data as the point cloud data based on a light reception signal output from the light receiving unit when the stage is located at a second rotation position, to synthesize the first three-dimensional shape data and the second three-dimensional shape data.

In this case, because the rotation axis of the stage is not parallel to the optical axis of the light receiving unit, the rotation of the stage changes the point of the measuring object oriented toward the light receiving unit. The measuring object is irradiated with the measurement light while the rotation position of the stage varies, whereby the light receiving unit receives the light reflected at different points of the measuring object. Accordingly, the point cloud data can be generated in the wide range of the measuring object based on the light reception signal output from the light receiving unit.

(14) The head unit may be configured to be detachably attached to the coupling part, and the measuring device may further include: a calculating section that calculates a positional relationship between the rotation axis of the stage and the light receiving unit in a state where the head unit is attached to the coupling part; and a second storage section in which the positional relationship calculated by the calculating section is stored, and the point cloud data generating section synthesizes the first three-dimensional shape data and the second three-dimensional shape data based on the positional relationship stored in the second storage section.

In this case, when the head unit is detached from the coupling part, the measuring object that cannot be placed on the stage can be measured in another place different from the stage. On the other hand, the head unit is attached to the coupling part, and the first three-dimensional shape data and the second three-dimensional shape data are generated while the stage is rotated. Therefore, the point cloud data can be generated in the wide range of the measuring object. At this time, the first three-dimensional shape data and the second three-dimensional shape data cannot accurately be synthesized when the positional relationship between the rotation axis of the stage and the light receiving unit is displaced before and after the operation to detach and attach the head unit from and to the coupling part.

According to the above configuration, the positional relationship between the rotation axis of the stage and the light receiving unit is calculated after the operation to detach and attach the head unit from and to the coupling part. Therefore, the first three-dimensional shape data and the second three-dimensional shape data are accurately synthesized based on the calculated positional relationship.

(15) The stage may include first and second placement surfaces on which the measuring object can be placed, and the stage may be configured such that an angle between the first and second placement surfaces is changeable.

According to the above configuration, the angle between the first and second placement surfaces can be changed such that one of the placement surfaces is inclined with respect to the other placement surface. This enables the user to selectively place the measuring object on one of the first and second placement surfaces. Accordingly, the attitude of the measuring object can easily be adjusted.

According to the present invention, the high-accuracy measurement can easily be performed at low cost.

DETAILED DESCRIPTION OF PREFERRED EMBODIMENT

Hereinafter, a measuring device according to one embodiment of the present invention will be described with reference to the drawings.

[1] Configuration of Measuring Device

Figure 1:
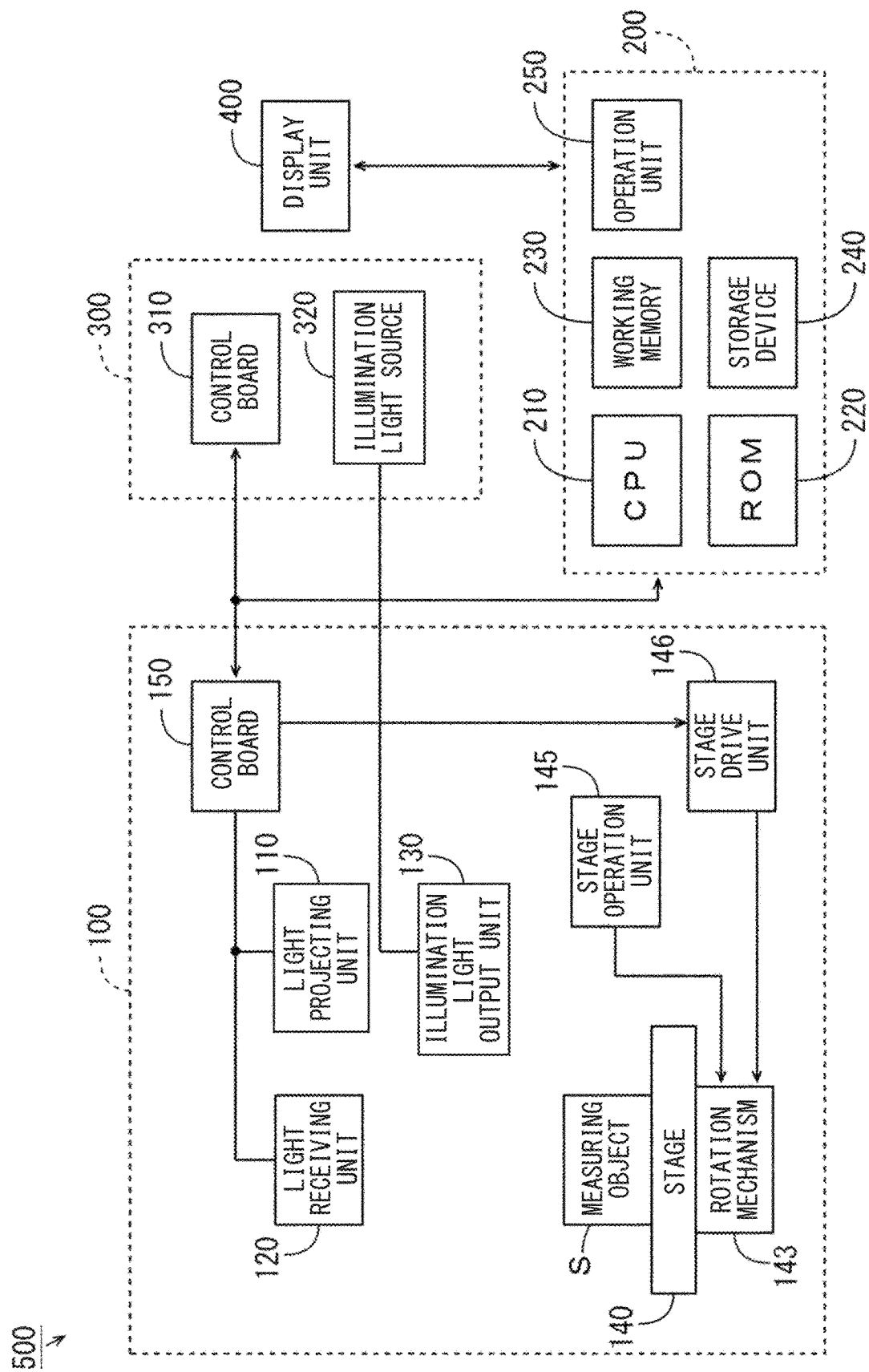
FIG. 1 is a block diagram illustrating a configuration of a measuring device according to one embodiment of the present invention.
Figure 2:
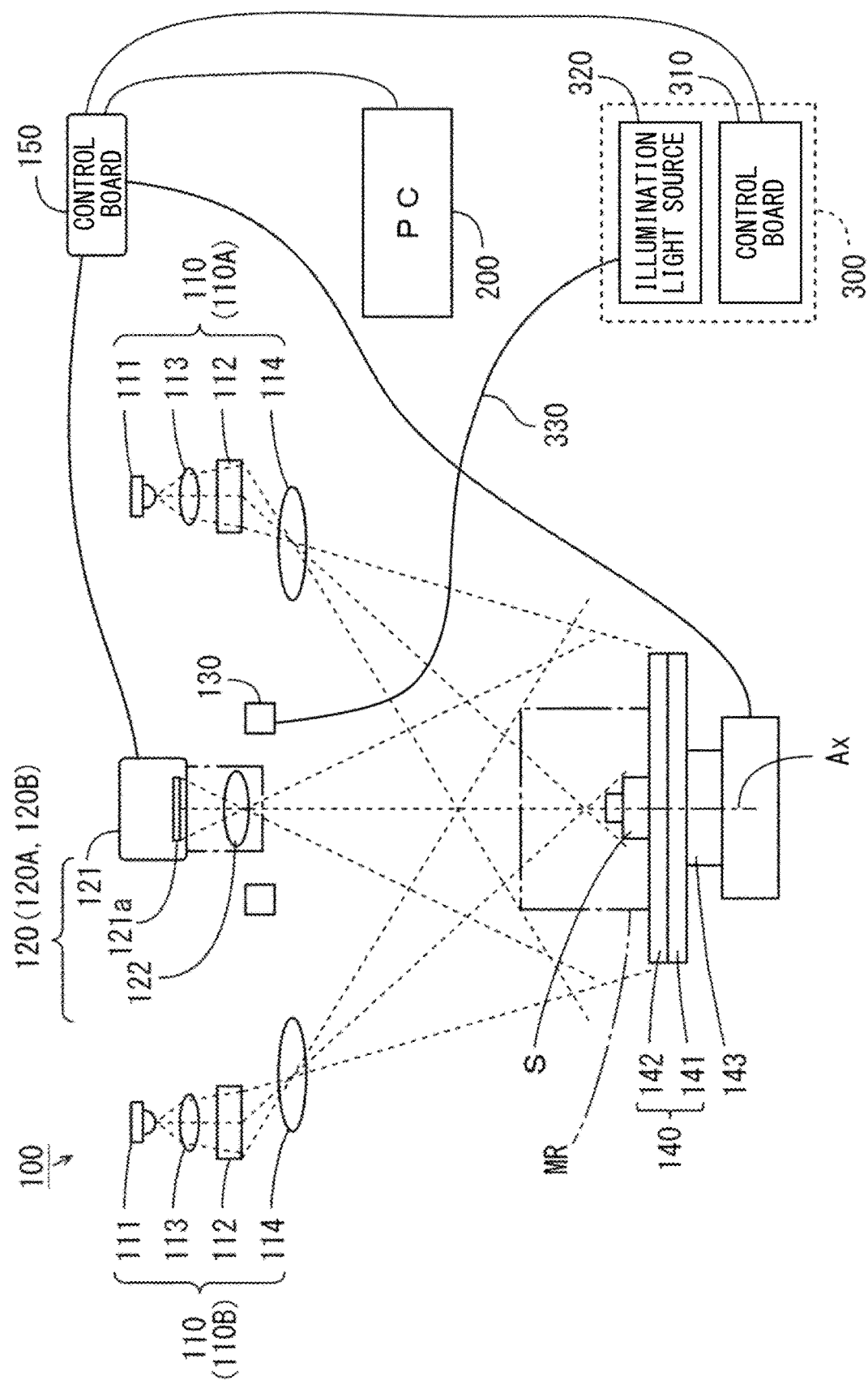
FIG. 2 is a schematic diagram illustrating a configuration of a measuring unit of the measuring device in FIG. 1.

FIG. 1 is a block diagram illustrating a configuration of a measuring device according to one embodiment of the present invention. FIG. 2 is a schematic diagram illustrating a configuration of a measuring unit of a measuring device 500 in FIG. 1. Hereinafter, the measuring device 500 according to the present embodiment will be described with reference to FIGS. 1 and 2. As illustrated in FIG. 1, the measuring device 500 includes a measuring unit 100, a PC (Personal Computer) 200, a control unit 300, and a display unit 400. For example, the measuring unit 100 is an imaging device in which a light projecting unit and a light receiving unit are integrated. The measuring unit 100 includes a light projecting unit 110, a light receiving unit 120, an illumination light output unit 130, a stage 140, and a control board 150.

The measuring unit 100 may include a plurality of light projecting units 110. The measuring unit 100 may include a plurality of light receiving units 120. In the present embodiment, the measuring unit 100 includes two light projecting units 110 and two light receiving units 120. Hereinafter, in the case where the two light projecting units 110 are distinguished from each other, one of the light projecting units 110 is referred to as a light projecting unit 110A, and the other light projecting unit 110 is referred to as a light projecting unit 110B. In the case where the two light receiving units 120 are distinguished from each other, one of the light receiving units 120 is referred to as a light receiving unit 120A, and the other light receiving unit 120 is referred to as a light receiving unit 120B.

Referring to FIG. 2, two light projecting units 110 and one light receiving unit 120 are illustrated in the two light projecting units 110 and the two light receiving units 120. The light projecting units 110 and the light receiving units 120 are each disposed in one direction at a position obliquely above the stage 140. Details of the dispositions of the light projecting unit 110 and the light receiving unit 120 will be described later. As illustrated in FIG. 2, each light projecting unit 110 includes a measurement light source 111, a pattern generating unit 112, and a plurality of lenses 113, 114. Each light receiving unit 120 includes a camera 121 and a lens 122. A measuring object S is placed on the stage 140.

For example, the measurement light source 111 of each of the light projecting units 110A, 110B is a blue LED (Light Emitting Diode). The measurement light source 111 may be other light sources such as a halogen lamp. Light (hereinafter, referred to as measurement light) emitted from the measurement light source 111 is appropriately collected by the lens 113, and then enters the pattern generating unit 112.

For example, the pattern generating unit 112 is a DMD (Digital Micro-mirror Device). The pattern generating unit 112 may be an LCD (Liquid Crystal Display), an LCOS (Liquid Crystal on Silicon), or a mask. The measurement light incident on the pattern generating unit 112 is output after being converted into the measurement light having a previously-set pattern and previously-set intensity (brightness). The measurement light output from the pattern generating unit 112 is converted into the measurement light having a diameter larger than a size of the measuring object S by using the lens 114, and the measuring object S on the stage 140 is irradiated with the measurement light.

The measurement light source 111, lens 113, and pattern generating unit 112 of the light projecting unit 110A are disposed substantially parallel to an optical axis of the light receiving unit 120. Similarly, the measurement light source 111, lens 113, and pattern generating unit 112 of the light projecting unit 110B are disposed substantially parallel to an optical axis of the light receiving unit 120. On the other hand, the lens 114 of each of the light projecting units 110A, 110B is disposed so as to be offset from the measurement light source 111, the lens 113, and the pattern generating unit 112. Therefore, the optical axes of the light projecting units 110A, 110B are inclined with respect to the optical axis of the light receiving unit 120, and the measurement light is output toward the measuring object S from both sides of the light receiving unit 120.

In this example, to make an irradiation range of the measurement light wide, the light projecting units 110A, 110B are configured to have a given angle of view. For example, the angles of view of the light projecting units 110A, 110B are defined by a size of the pattern generating unit 112 and a focal distance of the lens 114. In the case where the irradiation range of the measurement light does not need to be widened, a telecentric optical system in which the angle of view becomes substantially 0 degrees may be used in each of the light projecting units 110A, 110B.

The measurement light reflected toward above the stage 140 by the measuring object S is focused through the lens 122 of the light receiving unit 120 to form an image, and received by using an imaging element 121a of the camera 121.

In this example, to make an imaging visual field of the light receiving unit 120 wide, the light receiving unit 120 is configured to have a given angle of view. As used herein, the imaging visual field of the light receiving unit 120 means a spatial region where the light receiving unit 120 can capture an image. For example, the angle of view of the light receiving unit 120 is defined by the size of the imaging element 121a and the focal distance of the lens 122. When the wide visual field is unnecessary, the telecentric optical system may be used for the light receiving unit 120. Here, magnifications of the lenses 122 of the two light receiving units 120 provided in the measuring unit 100 differ from each other. Therefore, selective use of the two light receiving units 120 enables the image of the measuring object S to be captured with two different magnifications. Preferably, the two light receiving units 120 are disposed such that the optical axes of the two light receiving units 120 are parallel to each other.

For example, the camera 121 is a CCD (Charge Coupled Device) camera. For example, the imaging element 121a is a monochrome CCD (Charge Coupled Device). The imaging element 121a may be other imaging elements such as a CMOS (Complementary Metal Oxide Semiconductor) image sensor. Each pixel of the imaging element 121a outputs, to the control board 150, an analog electric signal (hereinafter, referred to as a light reception signal) corresponding to a light reception amount.

In the monochrome CCD, unlike a color CCD, it is not necessary to provide a pixel receiving light having a red wavelength, a pixel receiving light having a green wavelength, and a pixel receiving light having a blue wavelength. In the case where a specific wavelength such as the blue wavelength is adopted as the measurement light, only the pixel receiving the light having the specific wavelength can be used during the measurement in the color CCD, while the monochrome CCD is free from such restriction. Therefore, measurement resolution of the monochrome CCD is higher than resolution of the color CCD. In the monochrome CCD, unlike the color CCD, it is not necessary to provide a color filter in each pixel. Therefore, sensitivity of the monochrome CCD is higher than sensitivity of the color CCD. Accordingly, point cloud data (to be described later) can be obtained with high accuracy. For these reasons, the monochrome CCD is provided in the camera 121 in this example.

In this example, the illumination light output unit 130 outputs the light having the red wavelength, the light having the green wavelength, and the light having the blue wavelength to the measuring object S in a time division manner. According to this configuration, the light receiving unit 120 provided with the monochrome CCD can capture a color image of the measuring object S.

On the other hand, in the case where the color CCD has the sufficient resolution and sensitivity, the imaging element 121a may be the color CCD. In this case, the illumination light output unit 130 does not need to irradiate the measuring object S with the light having the red wavelength, the light having the green wavelength, and the light having the blue wavelength in the time division manner, but irradiates the measuring object S with white light. Therefore, a configuration of an illumination light source 320 (to be described later) can be simplified.

An A/D converter (Analog/Digital Converter) (not illustrated) and a FIFO (First In First Out) memory (not illustrated) are mounted on the control board 150. Under the control of the control unit 300, the A/D converter of the control board 150 converts a light reception signal output from the camera 121 into a digital signal while sampling the light reception signal in a given sampling period. The digital signal output from the A/D converter is sequentially accumulated in the FIFO memory. The digital signals accumulated in the FIFO memory are sequentially transferred to the PC 200 as pixel data. Here, the A/D converter is not necessarily provided when the camera 121 is the monochrome CMOS camera, and the digital electric signal corresponding to the light reception amount is output from each pixel of the imaging element 121a to the control board 150.

As illustrated in FIG. 1, the PC 200 includes a CPU (Central Processing Unit) 210, a ROM (Read Only Memory) 220, a working memory 230, a storage device 240, and an operation unit 250. The operation unit 250 includes a keyboard and a pointing device. For example, a mouse or a joystick is used as the pointing device.

A system program is stored in the ROM 220. The working memory 230 is configured by a RAM (Random Access Memory), and is used to process various pieces of data. For example, the storage device 240 is configured by a hard disk drive. For example, a data generation program, a measurement program, and a rotation axis calibration program are stored in the storage device 240. The storage device 240 is also used to store various pieces of data such as pixel data supplied from the control board 150.

The CPU 210 generates image data based on the pixel data supplied from the control board 150. The CPU 210 also performs various pieces of processing on the generated image data using the working memory 230, and displays the image on the display unit 400 based on the image data. The CPU 210 also applies a drive signal to a stage drive unit 146, to be described later, through the control board 150. For example, the display unit 400 is configured by an LCD panel or an organic EL (Electro-Luminescence) panel. For example, an image (hereinafter, referred to as a live image) is displayed on the display unit 400 based on the image data, which is obtained in real time with the camera 121 of the light receiving unit 120.

An image of the measuring object S irradiated with the measurement light from the one light projecting unit 110A and an image of the measuring object S irradiated with the measurement light from the other light projecting unit 110B may be displayed side by side on the display unit 400 (dual screen display). An image of the measuring object S irradiated with the measurement light from the one light projecting unit 110A and an image of the measuring object S irradiated with the measurement light from the other light projecting unit 110B may be displayed on the display unit 400 so as to overlap each other (synthesized display).

In the case of the dual screen display, the light projecting units 110A, 110B alternately irradiate the measuring object S with the measurement light at, for example, a constant period (several Hz), and the image that is obtained when the light projecting unit 110A irradiates the measuring object S with the measurement light and the image that is obtained when the light projecting unit 110B irradiates the measuring object S with the measurement light are separately displayed on the display unit 400. While viewing the displayed image, a user can adjust the light reception amount of the light receiving unit 120 when the light projecting unit 110A outputs the measurement light, and adjust the light reception amount of the light receiving unit 120 when the light projecting unit 110B outputs the measurement light. The light reception amount of the light receiving unit 120 can be adjusted by changing brightness of the light reception amount output from the light projecting units 110A, 110B or changing exposure time of the light receiving unit 120.

In the case of the synthesized display, similarly to the dual screen display, while viewing the displayed image, the user can adjust the light reception amount of the light receiving unit 120 when the light projecting unit 110A outputs the measurement light, and adjust the light reception amount of the light receiving unit 120 when the light projecting unit 110B outputs the measurement light. In this case, in addition to the synthesized-display image, the image of the measuring object S irradiated with the measurement light from the one light projecting unit 110A and the image of the measuring object S irradiated with the measurement light from the other light projecting unit 110B may be displayed side by side on the display unit 400. The image of the dual screen display and the image of the synthesized display may be displayed on the display unit 400 in a switching manner. Alternatively, the image of the synthesized display, the image of the measuring object S irradiated with the measurement light from the one light projecting unit 110A, and the image of the measuring object S irradiated with the measurement light from the other light projecting unit 110B may be displayed on the display unit 400 in a switching manner.

As illustrated in FIG. 2, the stage 140 includes a stage base 141 and a stage plate 142. The stage plate 142 is disposed on the stage base 141. The stage plate 142 includes a placement surface on which the measuring object S is placed. An attaching part (for example, a screw hole) to which a clamp or a jig is attached may be provided in the stage plate 142. The stage plate 142 according to the present embodiment has a disc shape.

A substantially columnar effective region MR is set in a space on the stage plate 142. The effective region MR can be irradiated with the measurement light from the light projecting units 110A, 110B, and the image of the effective region MR can be captured by the light receiving unit 120. For example, the imaging visual field of the light receiving unit 120 is defined by a magnification, a focal depth, and an angle of view of the lens 122 included in the light receiving unit 120. Details of a setting content of the effective region MR will be described later.

The stage 140 is attached to a rotation mechanism 143. The rotation mechanism 143 is fixed to an installation part 161 (see FIG. 4) to be described later. For example, the rotation mechanism 143 includes an encoder and a stepping motor. The rotation mechanism 143 is driven by a stage operation unit 145 or the stage drive unit 146 in FIG. 1, and rotated about a rotation axis Ax, which passes through a center of the stage 140 and extend in a vertical direction. The user can manually operate the stage operation unit 145 to rotate the stage 140. Based on the drive signal supplied from the PC 200 through the control board 150, the stage drive unit 146 supplies current to the rotation mechanism 143, which allows the placement surface of the stage plate 142 to rotate relative to the light receiving unit 120.

During the rotation of the stage 140, a signal output from the encoder of the rotation mechanism 143 is transmitted to the PC 200 through the control board 150. The signal enables the CPU 210 in FIG. 1 to detect a rotation amount (rotation position) of the stage plate 142 from a predetermined reference angle.

In the present embodiment, the stage 140 can be driven with the stepping motor of the rotation mechanism 143, and can be manually operated. However, the present invention is not limited thereto. Alternatively, the stage 140 may be driven only with the stepping motor of the rotation mechanism 143, or can only be manually operated.

The control unit 300 includes a control board 310 and an illumination light source 320. A CPU (not illustrated) is mounted on the control board 310. Based on an instruction from the CPU 210 of the PC 200, the CPU of the control board 310 controls the light projecting unit 110, the light receiving unit 120, and the control board 150. The control board 310 and the illumination light source 320 may be mounted on the measuring unit 100. However, the control board 310 and the illumination light source 320 easily generate heat, and the accuracy of the measuring unit 100 may be degraded due to an influence of the heat. Accordingly, in order to ensure the accuracy of the measuring unit 100, the control board 310 and the illumination light source 320 are preferably provided outside the measuring unit 100.

For example, the illumination light source 320 includes three LEDs that emit red light, green light, and blue light. The light having any color can be generated from the illumination light source 320 by control of luminance of the light emitted from each LED. The light (hereinafter, referred to as illumination light) generated from the illumination light source 320 is output from the measuring unit 100 of the illumination light output unit 130 through a light guide 330. The illumination light source 320 may not be provided in the control unit 300, but may be provided in the measuring unit 100. In this case, the necessity of the light guide 330 is eliminated.

Figure 3:
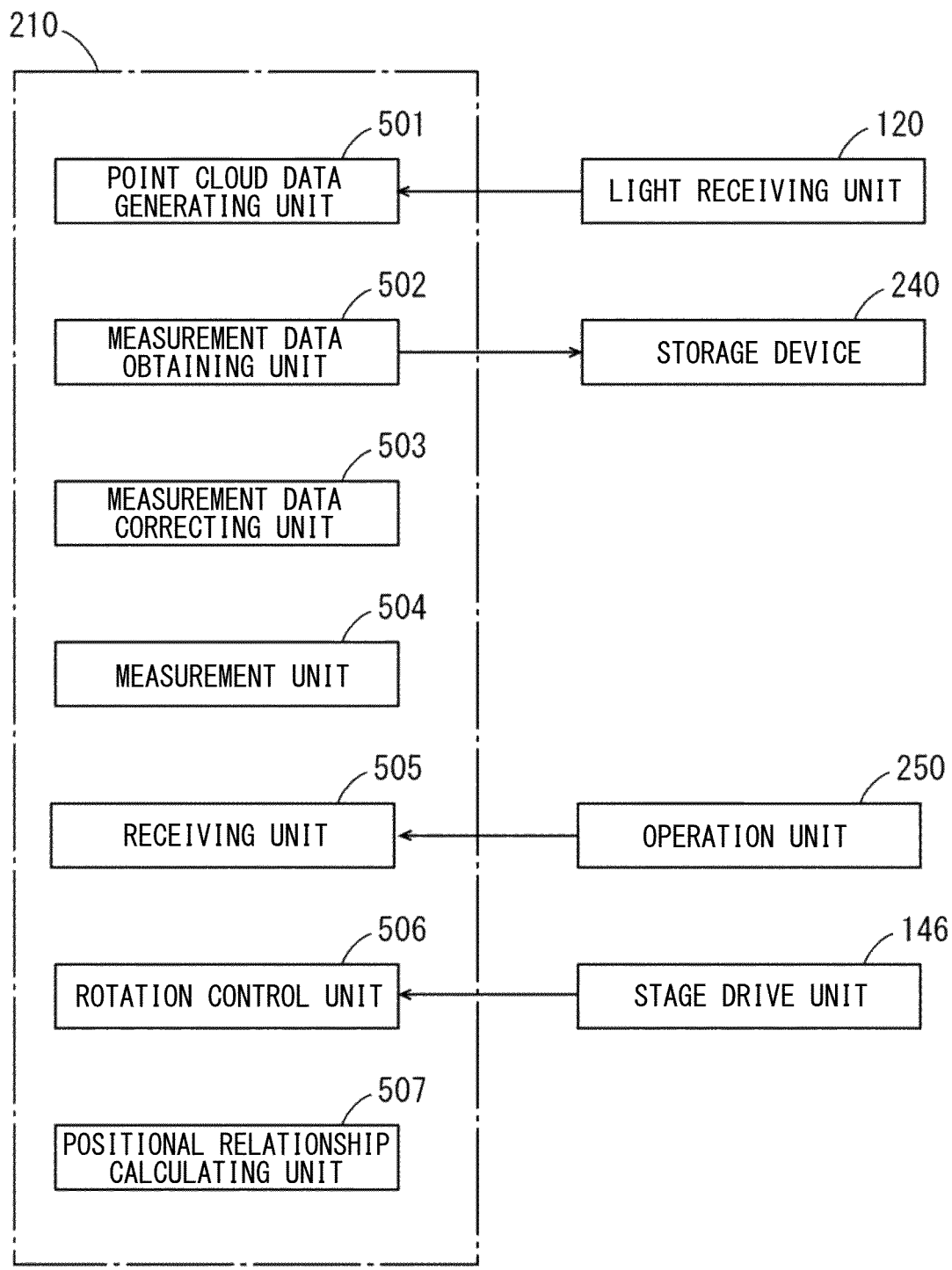
FIG. 3 is a functional block diagram illustrating a function implemented by a CPU in FIG. 1.

FIG. 3 is a functional block diagram illustrating a function implemented by the CPU 210 in FIG. 1. As illustrated in FIG. 3, the CPU 210 includes a point cloud data generating unit 501, a measurement data obtaining unit 502, a measurement data correcting unit 503, a measurement unit 504, a receiving unit 505, a rotation control unit 506, and a positional relationship calculating unit 507.

The point cloud data generating unit 501 generates point cloud data representing a three-dimensional shape of the measuring object S based on the light reception signal output from the light receiving unit 120. When selection is made that the point cloud data corresponding to the effective region MR should be set to the measurement data, the measurement data obtaining unit 502 obtains the point cloud data corresponding to the effective region MR as the measurement data with respect to the space on the stage 140 based on region information (to be described later) stored in the storage device 240. When selection is made that the point cloud data corresponding to the effective region MR and other regions should be set to the measurement data, the measurement data obtaining unit 502 obtains all the pieces of point cloud data generated by the point cloud data generating unit 501.

In the case where a region to be removed is designated in the region corresponding to the obtained measurement data, the measurement data correcting unit 503 removes the point cloud data corresponding to the designated region from the obtained measurement data.

The measurement unit 504 receives the designation of a point to be measured in the measuring object S, and calculates a measurement value at the designated point based on the measurement data obtained by the measurement data obtaining unit 502 or the measurement data corrected with the measurement data correcting unit 503.

Based on the user operation of the operation unit 250, the receiving unit 505 receives the selection as to whether the measurement data is set to the point cloud data corresponding to the effective region MR or the point cloud data corresponding to the effective region MR and other regions. Based on the user operation of the operation unit 250, the receiving unit 505 also receives the designation of the region to be removed in the region corresponding to the obtained measurement data.

The rotation control unit 506 controls the stage drive unit 146, thereby controlling the rotation of the stage 140. The positional relationship calculating unit 507 calculates a positional relationship between the rotation axis Ax of the stage 140, the rotation axis, and the light receiving unit 120 in rotation axis calibration processing (to be described later). Details of the functions will be described later.

The CPU 210 executes one of a system program, a data generation program, a measurement program, and a rotation axis calibration program, which are stored in the ROM 220 and the storage device 240, thereby implementing the point cloud data generating unit 501, the measurement data obtaining unit 502, the measurement data correcting unit 503, the measurement unit 504, the receiving unit 505, the rotation control unit 506, and the positional relationship calculating unit 507. A part or all the functional sections may be implemented by hardware such as an electronic circuit.

The plurality of light projecting units 110, the plurality of light receiving units 120, the illumination light output unit 130, and the stage 140 are coupled to one another in the measuring unit 100 such that a positional relationship among these components is kept constant.

Figure 4:
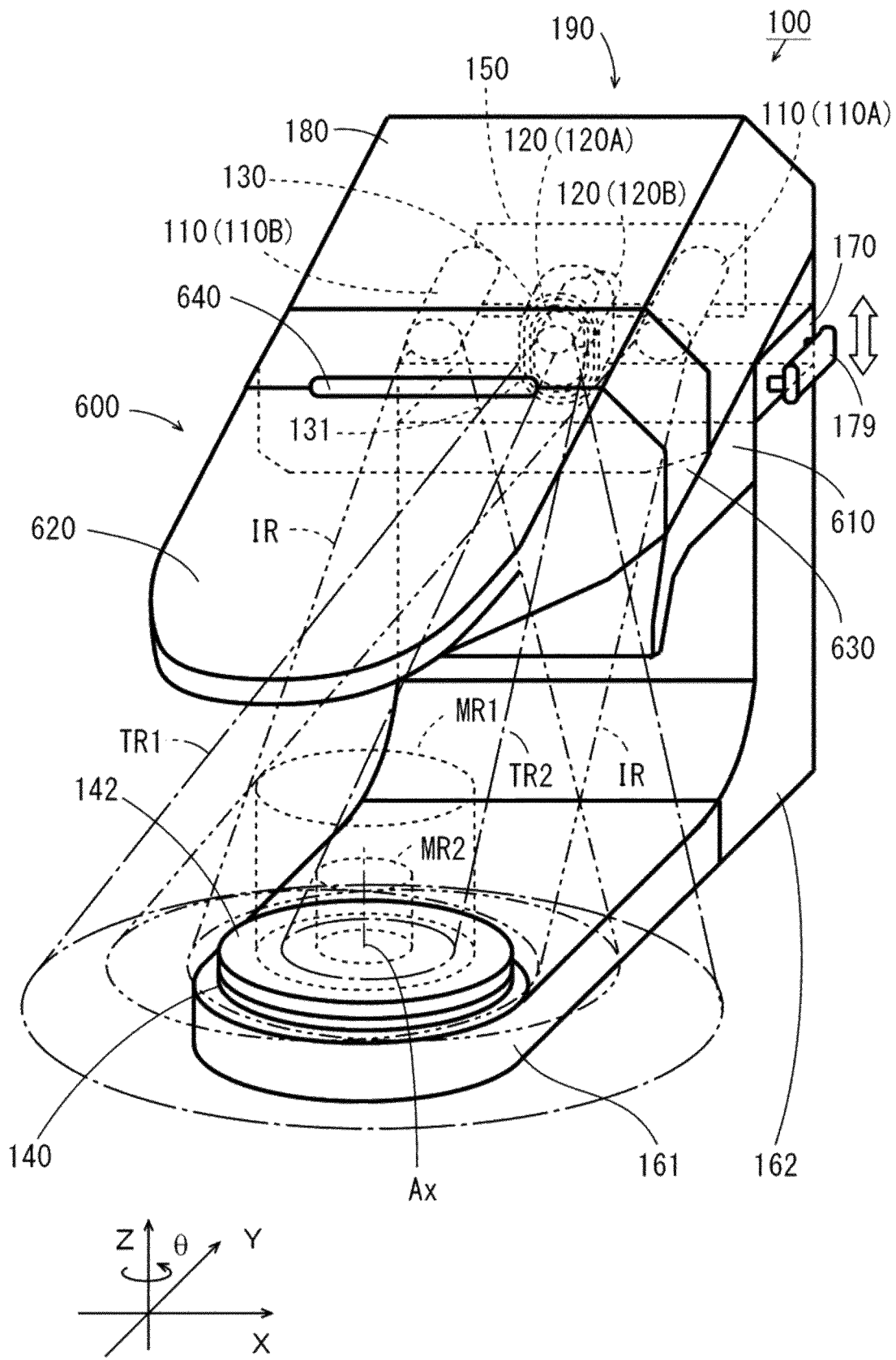
FIG. 4 is a perspective view illustrating a schematic appearance of the measuring unit.

FIG. 4 is a perspective view illustrating a schematic appearance of a measuring unit 100. In FIG. 4, the appearance of the measuring unit 100 is indicated by a bold solid line, and some components provided in the measuring unit 100 are indicated by a dotted line. FIG. 4 illustrates the state in which the light shielding mechanism 600 is attached to the measuring unit 100. Details of the light shielding mechanism 600 will be described later.

As illustrated in FIG. 4, the measuring unit 100 includes a mount 170. The two light projecting units 110, the two light receiving units 120, the illumination light output unit 130, and the control board 150 are attached to the mount 170. In this state, the positional relationship among the two light projecting units 110, the two light receiving units 120, and the illumination light output unit 130 is fixed using the mount 170. The two light receiving units 120 are vertically arranged. The illumination light output unit 130 has an elliptically cylindrical shape, and is disposed so as to surround the two light receiving units 120. An elliptical illumination light output port 131 is formed at one end of the illumination light output unit 130. The two light projecting units 110 are arranged such that the two light receiving units 120 and the illumination light output unit 130 are interposed therebetween.

A head casing 180 is attached to the mount 170. The two light projecting units 110, the two light receiving units 120, the illumination light output unit 130, and a part of the control board 150 are accommodated in the head casing 180. The two light projecting units 110, the two light receiving units 120, the illumination light output unit 130, the control board 150, the mount 170, and the head casing 180 constitute a head unit 190.

The measuring unit 100 also includes an installation part 161 and a stand 162. The installation part 161 has a flat bottom, and is formed with a substantially constant width so as to extend in one direction. The installation part 161 is installed on a horizontal installation surface such as a top surface of a table.

The stand 162 is formed so as to be connected to one of ends of the installation part 161, and so as to extend upward from the one end of the installation part 161. The rotation mechanism 143 in FIG. 2 is fixed to a position near the other end of the installation part 161. The rotation mechanism 143 rotatably holds the stage 140. In the present embodiment, the installation part 161 and the stand 162 may be configured so as to be detachable from each other.

A pair of grips 179 is provided on both sides of the mount 170 so as to be able to be gripped by the user. Only one of the pair of grips 179 is illustrated in FIG. 4. The mount 170 of the head unit 190 is configured to be detachably attached to the top of the stand 162. As illustrated by outline arrows in FIG. 4, the user can attach and detach the mount 170 to and from the stand 162 by gripping the pair of grips 179 of the mount 170.

The mount 170 of the head unit 190 is attached to the stand 162, whereby the head unit 190 and the installation part 161 are fixedly coupled together using the stand 162. Accordingly, the positional relationship among the stage 140, the two light projecting units 110, and the two light receiving units 120 is kept constant.

Each light projecting unit 110 is positioned such that the irradiation region irradiated with the measurement light includes the stage 140 and a space above the stage 140. The measurement light is guided obliquely downward with respect to the measuring object S of the light projecting unit 110. Each light receiving unit 120 is positioned such that the optical axis extends obliquely downward, and such that the imaging visual field of the camera 121 in FIG. 2 includes the stage 140 and the space above the stage 140. In FIG. 4, an irradiation region IR of each light projecting unit 110 is indicated by an alternate long and two short dashes line, and the imaging visual fields TR1, TR2 of the light receiving units 120A, 120B are indicated by an alternate long and short dash line. Each of the light receiving units 120A, 120B is fixed in a state where a predetermined angle (for example, 45 degrees) is formed between the optical axis (the optical axis of the lens 122 in FIG. 2) of the optical system thereof and the placement surface of the stage plate 142.

As illustrated in FIG. 4, the irradiation regions IR of the two light projecting units 110A, 110B and the imaging visual fields TR1, TR2 of the light receiving units 120A, 120B partially overlap each other in the space above the stage 140. An effective region MR1 corresponding to the light receiving unit 120A is set to the position where the irradiation regions IR of the light projecting units 110A, 110B and the imaging visual field TR1 of the light receiving unit 120A overlap each other. An effective region MR2 corresponding to the light receiving unit 120B is set to the position where the irradiation regions IR of the light projecting units 110A, 110B and the imaging visual field TR2 of the light receiving unit 120B overlap each other.

The two light receiving units 120A, 120B provided in the measuring unit 100 in this example differ from each other in the magnification, focal depth, and angle of view of the lens 122. Specifically, the magnification of the lens 122 of the light receiving unit 120B is higher than the magnification of the lens 122 of the light receiving unit 120A. The focal depth of the lens 122 of the light receiving unit 120B is shallower than the focal depth of the lens 122 of the light receiving unit 120A. The angle of view of the lens 122 of the light receiving unit 120B is smaller than the angle of view of the lens 122 of the light receiving unit 120A. In this case, the imaging visual field TR2 of the light receiving unit 120B is smaller than the imaging visual field TR1 of the light receiving unit 120A. Therefore, the effective region MR1 corresponding to the one light receiving unit 120A is set in a relatively wide range on the stage 140. On the other hand, the effective region MR2 corresponding to the other light receiving unit 120B is set on the stage 140 in a range narrower than the effective region MR1 corresponding to the light receiving unit 120A.

Figure 5:
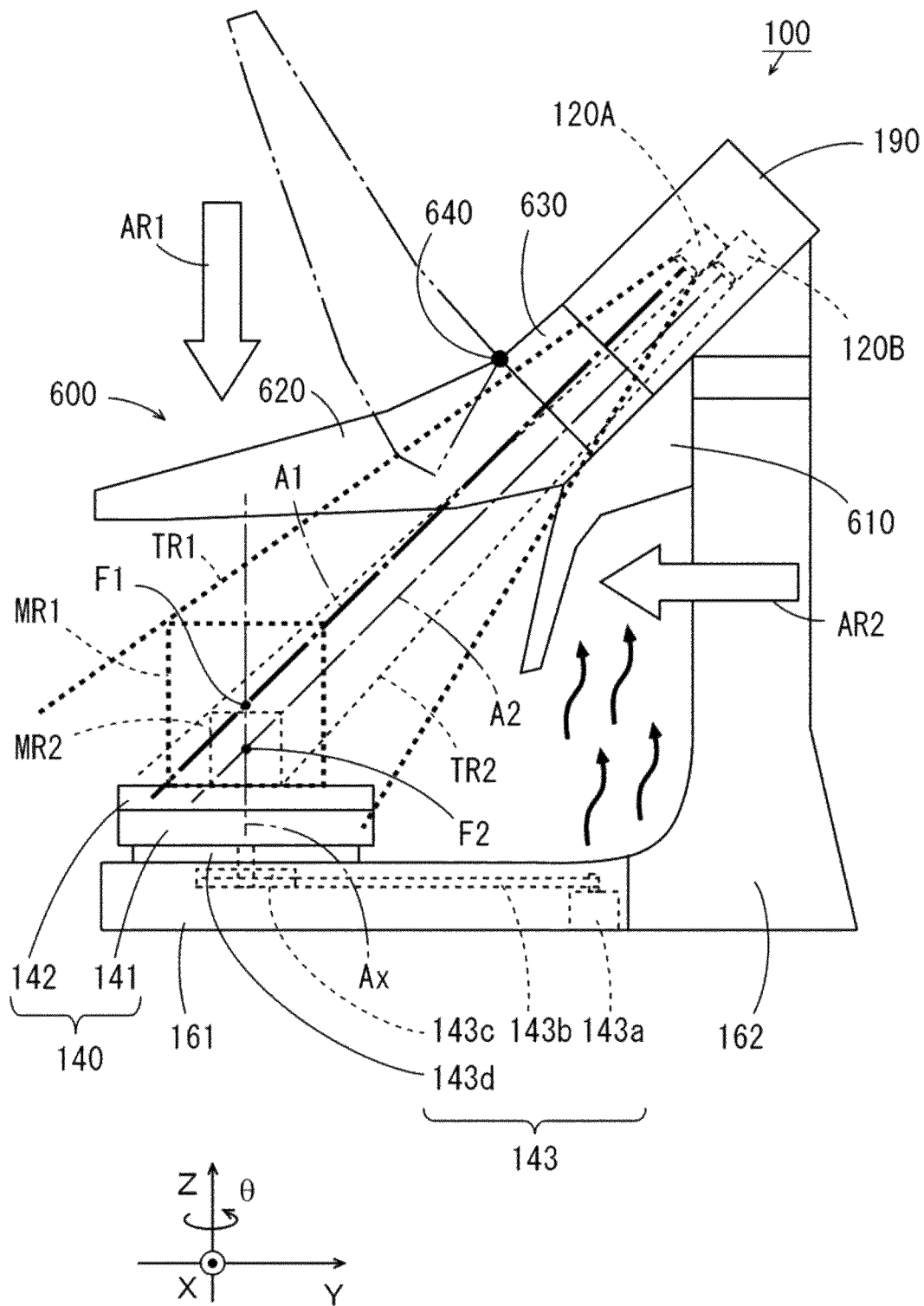
FIG. 5 is a schematic side view of the measuring unit illustrating details of a positional relationship between two light receiving units and a stage.

FIG. 5 is a schematic side view illustrating details of a positional relationship between the two light receiving units 120A, 120B and the stage 140 in the measuring unit 100. In FIG. 5, an optical axis A1 of the optical system of the light receiving unit 120A is indicated by a bold alternate long and short dash line, and the imaging visual field TR1 and the effective region MR1 of the light receiving unit 120A is indicated by a bold dotted line. An optical axis A2 of the optical system of the light receiving unit 120B is indicated by an alternate long and short dash line, and an imaging visual field TR2 and an effective region MR2 of the light receiving unit 120B is indicated by a dotted line.

When the two optical axes A1, A2 are on the same straight line while the imaging visual field TR1 is set to the wide range including the stage 140, there is a possibility that the imaging visual field TR2 is displaced from the placement surface of the stage 140 and the position near the placement surface. In this case, when the measuring object S with a low height is placed on the placement surface of the stage 140, the measuring object S cannot be measured with the high-magnification light receiving unit 120B. On the other hand, in the measuring unit 100 according to the present embodiment, the optical axis A2 is positioned below the optical axis A1 as illustrated in FIG. 5. Therefore, irrespective of the position of the imaging visual field TR1, the imaging visual field TR2 can be set to the placement surface of the stage 140 and the position near the placement surface.

As described above, in the space on the stage 140, the imaging visual field TR2 of the light receiving unit 120B is included in the imaging visual field TR1 of the light receiving unit 120A. In this case, for example, the live image obtained by the light receiving unit 120A includes the region of the live image that can be obtained by the light receiving unit 120B. Accordingly, the light receiving units 120A, 120B used in the imaging can easily be switched.

For example, the effective region MR1 corresponding to the light receiving unit 120A is set around an intersection F1 between the rotation axis Ax of the stage 140 and a focal surface of the optical system of the light receiving unit 120A. For example, the effective region MR2 corresponding to the light receiving unit 120B is set around an intersection F2 between the rotation axis Ax of the stage 140 and a focal surface of the optical system of the light receiving unit 120B.

In these cases, the measuring object S is placed in the center of the stage plate 142, which allows the measuring object S to be easily placed in the effective regions MR1, MR2. The light receiving units 120A, 120B used in the imaging are switched without moving the measuring object S. Therefore, a surface state of the measuring object S can accurately be observed while the magnification of the live image of the measuring object S is changed.

Indexes (for example, circles) indicating bottom ranges of the effective regions MR1, MR2 corresponding to the light receiving units 120A, 120B may be marked on the placement surface of the stage plate 142. In this case, the user can easily recognize the positions and sizes of the effective regions MR1, MR2 set onto the stage 140.

Hereinafter, a region other than the effective region MR1 in the imaging visual field TR1 of the light receiving unit 120A and a region other than the effective region MR2 in the imaging visual field TR2 of the light receiving unit 120B are referred to as an ineffective region. For example, information distinguishing the effective regions MR1, MR2 from the ineffective region is previously stored in the storage device 240 of FIG. 1 as region information at a point of factory shipment of the measuring device 500.

When ambient light other than the measurement light is reflected by the measuring object S and is incident on the light receiving units 120A, 120B, a noise component caused by the ambient light is included in the light reception signals output from the light receiving units 120A, 120B. In this case, the accuracy of the point cloud data generated based on the light reception signals is degraded.

Therefore, the light shielding mechanism 600 is attached to the measuring unit 100 according to the present embodiment in order to reduce the entry of the ambient light around the measuring unit 100 into the space including the effective regions MR1, MR2 on the stage 140. Hereinafter, a direction from the stand 162 toward the stage 140 in the measuring unit 100 is referred to as front of the measuring unit 100, and a direction opposite to the front is referred to as rear of the measuring unit 100. A direction orthogonal to a direction from the front to the rear of the measuring unit 100 on the basis of the center of the measuring unit 100 in a horizontal plane is referred to as a crosswise direction of the measuring unit 100.

As illustrated in FIG. 4, the light shielding mechanism 600 includes a rear cover member 610, a front cover member 620, a front-cover support member 630, and a hinge 640. The rear cover member 610 is detachably attached to a front end at the upper end of the stand 162. The rear cover member 610 extends in a crosswise direction and an obliquely forward direction while being bent at the position between the imaging visual fields TR1, TR2 of the light receiving units 120A, 120B and the stand 162.

The front-cover support member 630 is connected to both sides of the rear cover member 610 so as to be located above the rear cover member 610, and to partially cover the irradiation regions IR of the light projecting units 110A, 110B, and the imaging visual fields TR1, TR2 of the light receiving units 120A, 120B from above. The rear end of the front-cover support member 630 is connected to the front end of the head casing 180 while the rear cover member 610 is attached to the stand 162. The front cover member 620 is connected to the front end of the front-cover support member 630 with the hinge 640. The front cover member 620 is formed so as to extend forward from the front end of the front-cover support member 630 toward the space above the stage 140.

The front cover member 620 is provided such that the space on the stage 140 can be opened and closed by the hinge 640 as illustrated in FIG. 5. As illustrated by a solid line in FIG. 5, the front cover member 620 is formed so as to face the whole placement surface of the stage 140 in the closed state, and covers the space on the stage 140 from above. At this point, the front-cover support member 630 and the front cover member 620 do not block the measurement light with which the measuring object S on the stage 140 is irradiated from the light projecting units 110A, 110B. On the other hand, as indicated by the alternate long and two dashes line in FIG. 5, the front cover member 620 does not cover the space on the stage 140 from above in the open state.

According to the above configuration, the light shielding mechanism 600 blocks the ambient light from above the effective regions MR1, MR2 on the stage 140 when the front cover member 620 of the light shielding mechanism 600 is in the closed state. The light shielding mechanism 600 does not block the measurement light with which the effective regions MR1, MR2 are irradiated. Therefore, the noise component caused by the ambient light is reduced because the ambient light incident on the light receiving units 120A, 120B is reduced. As a result, the degradation of the accuracy of the point cloud data is suppressed. In FIG. 5, the ambient light from above is schematically illustrated by an outline arrow AR1.

According to the above configuration, the rear cover member 610 in the light shielding mechanism 600 blocks part of the ambient light from the rear of the space on the stage 140. The rear cover member 610 does not block the measurement light with which the effective regions MR1, MR2 are irradiated. Therefore, the noise component caused by the ambient light is further reduced because the ambient light incident on the light receiving units 120A, 120B is further reduced. As a result, the degradation of the accuracy of the point cloud data is further suppressed. In FIG. 5, the ambient light from the back is schematically illustrated by an outline arrow AR2.

As illustrated in FIG. 5, the rotation mechanism 143 according to the present embodiment includes the encoder (not illustrated), a stepping motor 143a, a belt 143b, a pulley 143c, and a turntable 143d. The stepping motor 143a is provided at a position near the rear end of the installation part 161. On the other hand, the turntable 143d is provided at a position near the front end of the installation part 161 while being rotatable about the rotation axis Ax, and the turntable 143d holds the stage 140. The pulley 143c is connected to the turntable 143d. The pulley 143c and the rotation axis of the stepping motor 143a are connected to each other using the belt 143b. With this configuration, when the stepping motor 143a is operated, a torque generated from the stepping motor 143a is transferred to the turntable 143d through the belt 143b and the pulley 143c, thereby rotating the stage 140.

When the stepping motor 143a is driven, the heat is sometimes generated from the stepping motor 143a. In such cases, an atmosphere around the stepping motor 143a is heated, and the heated atmosphere flows nonuniformly to a space above the stepping motor 143a as indicated by a plurality of bold arrows in FIG. 5.

When the nonuniform flow of the heated atmosphere is generated in the imaging visual fields TR1, TR2 of the light receiving units 120A, 120B, the light incident on the light receiving units 120A, 120B is refracted by an atmospheric fluctuation, and the light reception signals output from the light receiving units 120A, 120B include a fluctuation component. In this case, the accuracy of the generated point cloud data is degraded.

Therefore, in the present embodiment, the rear cover member 610 is formed so as to extend downward and obliquely forward from the head unit 190 to the position in front of the stepping motor 143a. In this case, the rear cover member 610 serves as a windshield that prevents the atmosphere heated by the stepping motor 143a from entering the imaging visual fields TR1, TR2. Therefore, the degradation of the accuracy of the point cloud data is further suppressed.

Additionally, according to the above configuration, the entry of the heated atmosphere into the space surrounded by the rear cover member 610, the front-cover support member 630, and the front cover member 620 is reduced even if some sort of heat source exists outside the measuring unit 100. Accordingly, the atmospheric fluctuation is hardly generated in the imaging visual fields TR1, TR2 of the light receiving units 120A, 120B.

Additionally, according to the above configuration, the operation to place the measuring object S on the stage 140 and the operation to position the measuring object S can easily be performed when the front cover member 620 is put into the open state. The operation to measure the measuring object S is easily performed because the front cover member 620 can open and close the space on the stage 140.

As described above, in the light shielding mechanism 600, the rear cover member 610 is configured to be detachably attached to the upper end of the stand 162. Therefore, the light shielding mechanism 600 can be attached to and detached from the measuring unit 100 as necessary. Specifically, the user can measure the measuring object S in the darkroom with the light shielding mechanism 600 being detached from the measuring unit 100. In a room equipped with a lighting device, the user can measure the measuring object S with the light shielding mechanism 600 being attached to the measuring unit 100. At this point, because the light shielding mechanism 600 is integral with the installation part 161 using the stand 162, the front cover member 620 of the light shielding mechanism 600 is accurately disposed at the position above the stage 140. In the light shielding mechanism 600, the front cover member 620 may be configured to be detachably attached to the front-cover support member 630.

In the light shielding mechanism 600, preferably, inside portions of the rear cover member 610, front-cover support member 630, and front cover member 620 are painted with a light absorbing color. Therefore, the measurement light with which the measuring object S is irradiated is prevented from being incident on the light receiving units 120A, 120B as ambient light, which is caused by the reflection or scattering between an inner surface of the light shielding mechanism 600 and the measuring object S.

In order to suppress the generation of the ambient light caused by the measurement light output from the head unit 190, preferably, whole outer surfaces of the light shielding mechanism 600, the installation part 161, the stand 162, and the stage 140 are painted with a light absorbing color. For example, black painting is preferable as the painting of the light absorbing color, and matte black painting is more preferable. As a result, the noise component caused by the diffused or scattered measurement light is sufficiently reduced.

Instead of the painting, a blackout cloth or a flocked sheet may be adhered to the portion facing the space on the stage 140 in each of the light shielding mechanism 600, the installation part 161, the stand 162, and the stage 140.

In the measuring unit 100 illustrated in FIGS. 4 and 5, a three-dimensional coordinate system (hereinafter, referred to as a device coordinate system) unique to the measuring unit 100 is defined in the space on the stage 140 including the effective regions MR1, MR2. The device coordinate system in this example includes an X-axis, a Y-axis, and a Z-axis, which are orthogonal to an origin. Hereinafter, a direction parallel to the X-axis of the device coordinate system is referred to as an X-direction, a direction parallel to the Y-axis is referred to as a Y-direction, and a direction parallel to the Z-axis is referred to as a Z-direction. A direction rotating about an axis parallel to the Z-axis is referred to as a θ-direction. The X-direction and the Y-direction are orthogonal to each other in a plane parallel to the placement surface of the stage plate 142. The Z-direction is orthogonal to a plane parallel to the placement surface of the stage plate 142. In FIGS. 4 and 5, the X-direction, the Y-direction, the Z-direction, and the θ-direction are indicated by arrows.

Figure 6:
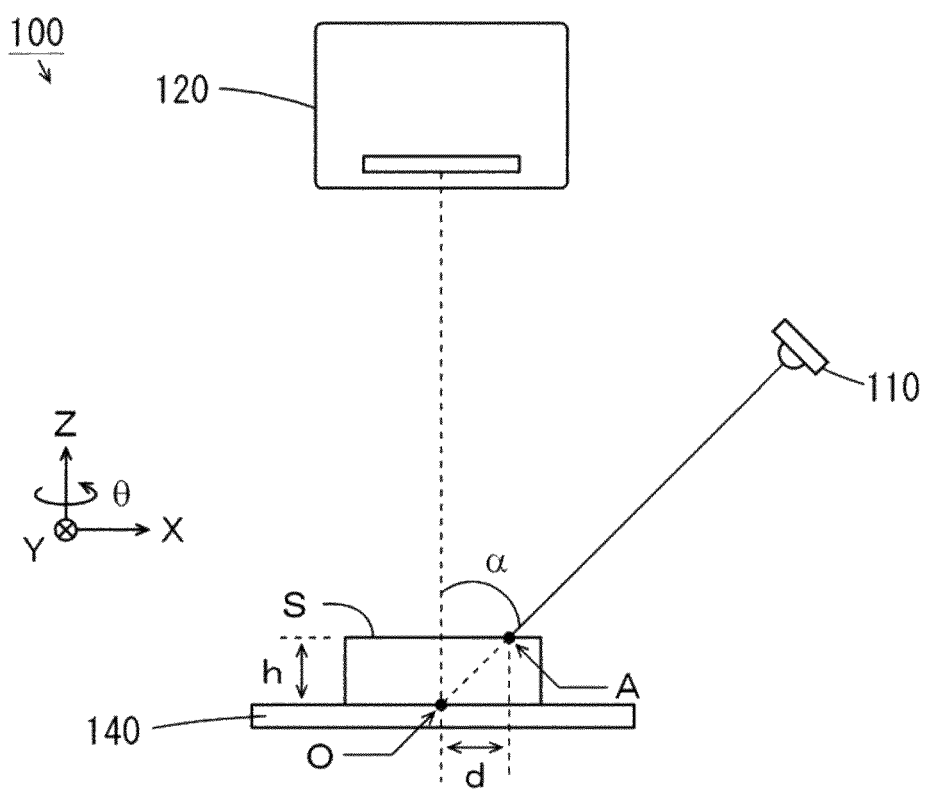
FIG. 6 is a view illustrating a principle of a triangular distance measuring method.

[2] Three-Dimensional Shape Data Indicating Three-Dimensional Shape of Measuring Object (1) Shape Measurement by Triangular Distance Measuring Method The measuring unit 100 measures the shape of the measuring object S by the triangular distance measuring method. FIG. 6 is a view illustrating a principle of the triangular distance measuring method. The X-direction, the Y-direction, the Z-direction, and the θ-direction, which are defined along with the device coordinate system, are indicated by arrows in FIG. 6 and each of FIGS. 7A and 7B, FIGS. 8A to 8D, FIGS. 9A to 9C, and FIGS. 11A to 11D to be described later.

An angle α between the optical axis of the measurement light output from the light projecting unit 110 and the optical axis (the optical axis of the light receiving unit 120) of the measurement light incident on the light receiving unit 120 is previously set as illustrated in FIG. 6. The angle α is larger than 0 degrees and smaller than 90 degrees.

In the case where the measuring object S is not placed on the stage 140, the measurement light output from the light projecting unit 110 is reflected from a point O on the placement surface of the stage 140, and is incident on the light receiving unit 120. On the other hand, in the case where the measuring object S is placed on the stage 140, the measurement light output from the light projecting unit 110 is reflected from a point A on the surface of the measuring object S, and is incident on the light receiving unit 120.

Assuming that d is a distance between the point O and the point A in the X-direction, a height h of the point A of the measuring object S with respect to the placement surface of the stage 140 is given by $h=d\div\tan(\alpha)$. The CPU 210 of the PC 200 in FIG. 1 measures the distance d between the point O and the point A in the X-direction based on the pixel data of the measuring object S, the pixel data being supplied from the control board 150. Based on the measured distance d, the CPU 210 calculates the height h at the point A on the surface of the measuring object S. The heights at all the points on the surface of the measuring object S are calculated, which allows a coordinate represented by the device coordinate system to be specified with respect to all the points irradiated with the measurement light. This enables the measurement of the three-dimensional shape of the measuring object S.

In order to irradiate all the points on the surface of the measuring object S with the measurement light, the light projecting unit 110 in FIG. 2 outputs pieces of measurement light having various patterns. The pattern generating unit 112 in FIG. 2 controls the pattern of the measurement light. Patterns of the measurement light will be described below.

(2) First Pattern of Measurement Light

Figure 7A:
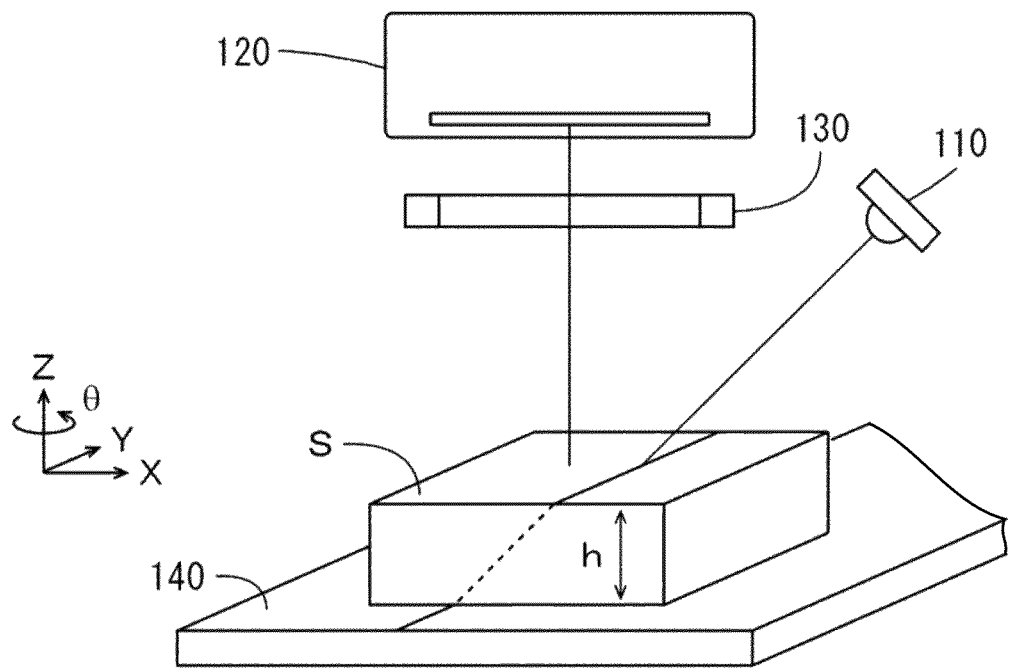
FIGS. 7A and 7B are views illustrating a first pattern of measurement light.
Figure 7B:
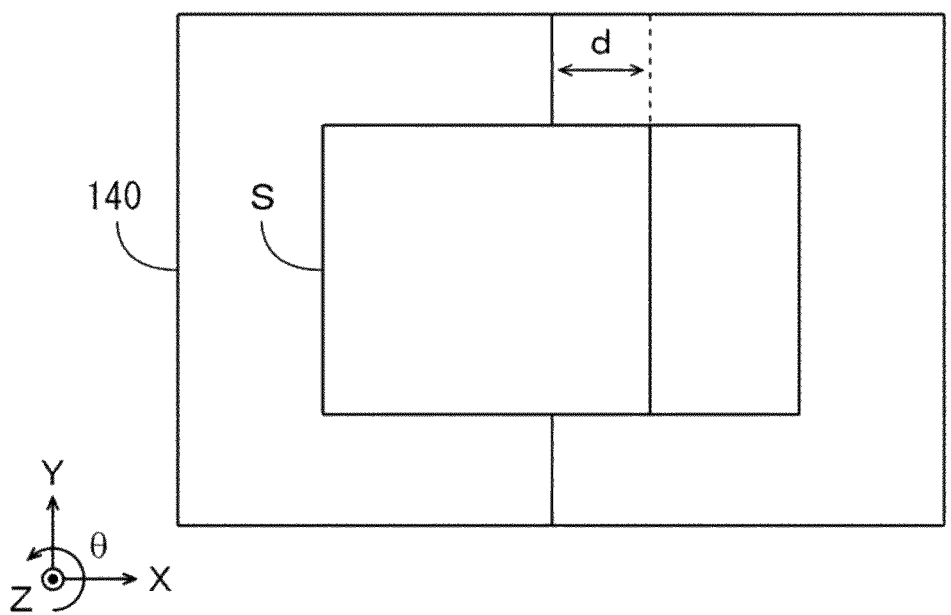

FIGS. 7A and 7B are views illustrating a first pattern of the measurement light. FIG. 7A illustrates a state in which the light projecting unit 110 irradiates the measuring object S on the stage 140 with the measurement light. FIG. 7B is a plan view illustrating the measuring object S irradiated with the measurement light. As illustrated in FIG. 7A, measurement light (hereinafter, referred to as linear measurement light) having a linear section parallel to the Y-direction is output from the light projecting unit 110 as the first pattern. In this case, as illustrated in FIG. 7B, a portion of the linear measurement light with which the stage 140 is irradiated and a portion of the linear measurement light with which the surface of the measuring object S is irradiated is displaced from each other in the X-direction by the distance d corresponding to the height h of the surface of the measuring object S. Accordingly, the height h of the measuring object S can be calculated by the measurement of the distance d.

In the case where a plurality of portions on the surface of the measuring object S along the Y-direction have different heights, the heights h of the plurality of portions along the Y-direction can be calculated by the measurement of the distance d in each portion.

After measuring the distance d with respect to the plurality of portions along the Y-direction at one position in the X-direction, the CPU 210 in FIG. 1 performs scan in the X-direction with the linear measurement light parallel to the Y-direction, thereby measuring the distance d with respect to the plurality of portions along the Y-direction at another position in the X-direction. Therefore, the heights h of the plurality of portions of the measuring object S along the Y-direction are calculated at the plurality of positions in the X-direction. The scan is performed with the linear measurement light in the X-direction in the range wider than the size of the measuring object S in the X-direction, which allows the height h to be calculated at all the points on the surface of the measuring object S. This enables the measurement of the three-dimensional shape of the measuring object S.

(3) Second Pattern of Measurement Light

FIGS. 8A to 8D are views illustrating a second pattern of the measurement light. As illustrated in FIGS. 8A to 8D, measurement light (hereinafter, referred to as sinusoidal measurement light), which has the linear section parallel to the Y-direction and in which the intensity changes sinusoidally in the X-direction, is output from the light projecting unit 110 a plurality of times (in this example, four times) as the second pattern.

Figure 8A:
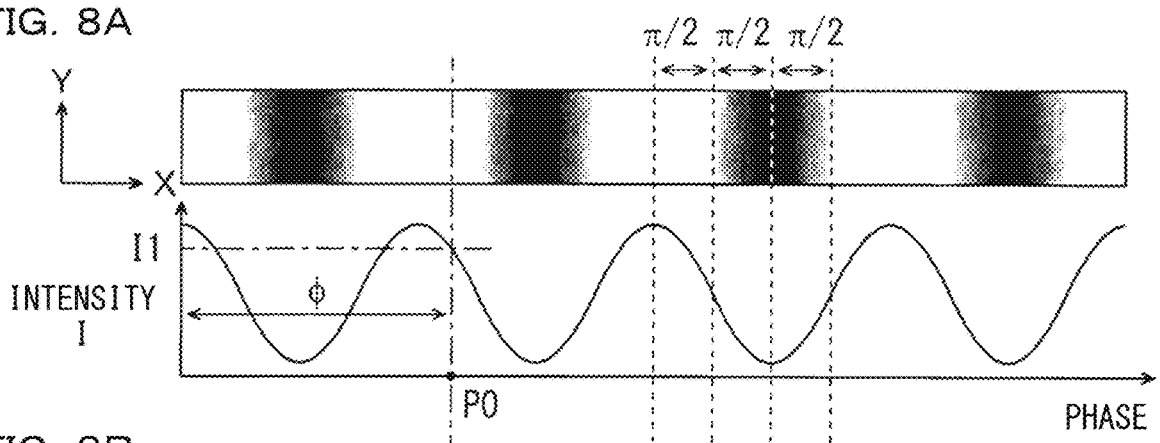
FIGS. 8A to 8D are views illustrating a second pattern of the measurement light.

FIG. 8A illustrates the sinusoidal measurement light output at a first time. The intensity of the sinusoidal measurement light output at the first time has an initial phase φ in any portion P0 on the surface of the measuring object S. When the sinusoidal measurement light is output, the light receiving unit 120 receives the light reflected by the surface of the measuring object S. The intensity of the received light is measured based on the pixel data of the measuring object S. It is assumed that I1 is the intensity of the light reflected by a portion P0 on the surface of the measuring object S.

Figure 8B:
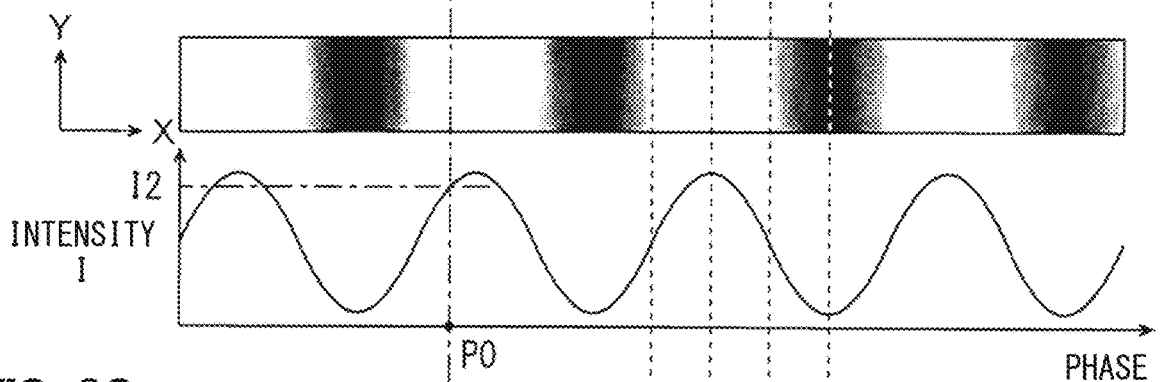

FIG. 8B illustrates the sinusoidal measurement light output at a second time. The intensity of the sinusoidal measurement light output at the second time has a phase (φ+π/2) in the portion P0 on the surface of the measuring object S. When the sinusoidal measurement light is output, the light receiving unit 120 receives the light reflected by the surface of the measuring object S. The intensity of the received light is measured based on the pixel data of the measuring object S. It is assumed that I2 is the intensity of the light reflected by the portion P0 on the surface of the measuring object S.

Figure 8C:
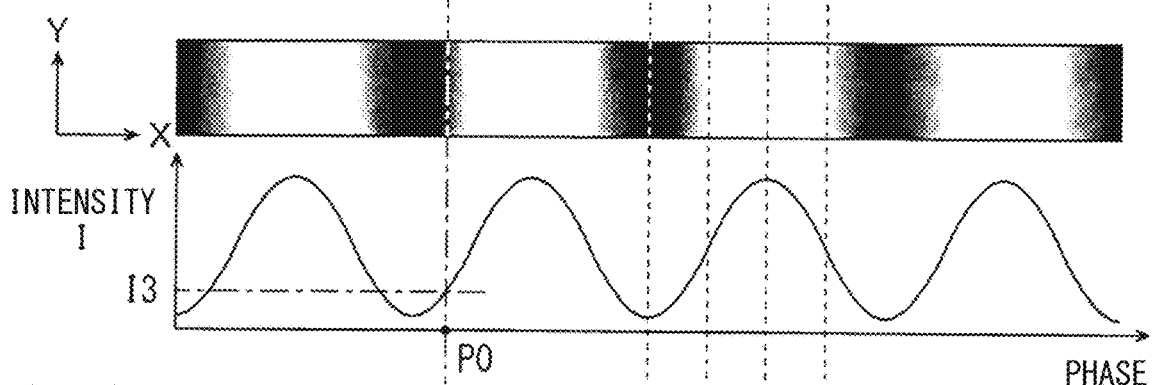

FIG. 8C illustrates the sinusoidal measurement light output at a third time. The intensity of the sinusoidal measurement light output at the third time has a phase ($\phi+\pi$) in the portion P0 on the surface of the measuring object S. When the sinusoidal measurement light is output, the light receiving unit 120 receives the light reflected by the surface of the measuring object S. The intensity of the received light is measured based on the pixel data of the measuring object S. It is assumed that I3 is the intensity of the light reflected by the portion P0 on the surface of the measuring object S.

Figure 8D:
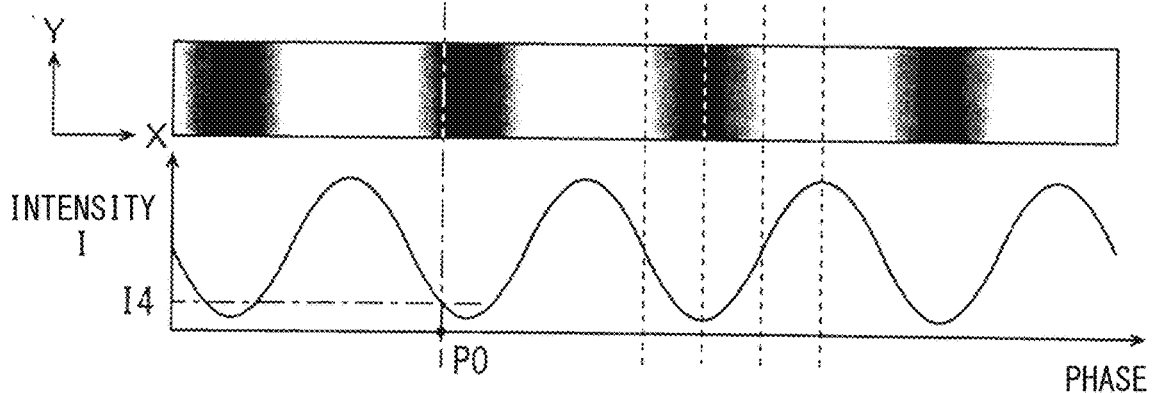

FIG. 8D illustrates the sinusoidal measurement light output at a fourth time. The intensity of the sinusoidal measurement light output at the fourth time has a phase ($\phi+3\pi/2$) in the portion P0 on the surface of the measuring object S. When the sinusoidal measurement light is output, the light receiving unit 120 receives the light reflected by the surface of the measuring object S. The intensity of the received light is measured based on the pixel data of the measuring object S. It is assumed that I4 is the intensity of the light reflected by the portion P0 on the surface of the measuring object S.

The initial phase $\phi$ is given by $\phi=\tan^{-1}[(I1-I3)/(I2-I4)]$. The height h in any portion of the measuring object S is calculated from the initial phase $\phi$. According to the method, the initial phase $\phi$ can easily be calculated at high speed in all the portions of the measuring object S by the four-time measurement of the light intensity. Pieces of measurement light having different phases are output at least three times to measure the intensity of the received light, which allows the calculation of the initial phase $\phi$. The height h is calculated in all the portions on the surface of the measuring object S, which allows the measurement of the three-dimensional shape of the measuring object S.

(4) Third Pattern of Measurement Light

Figure 9A:
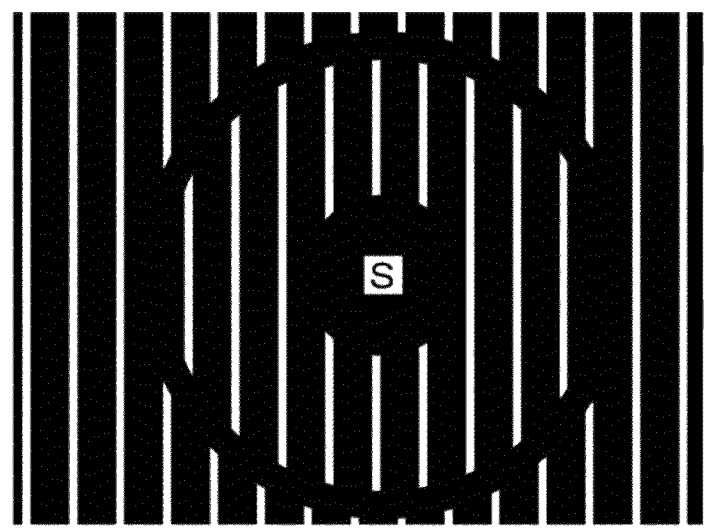
FIGS. 9A to 9C are views illustrating a third pattern of the measurement light.
Figure 9A:
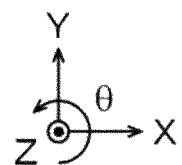
Figure 9B:
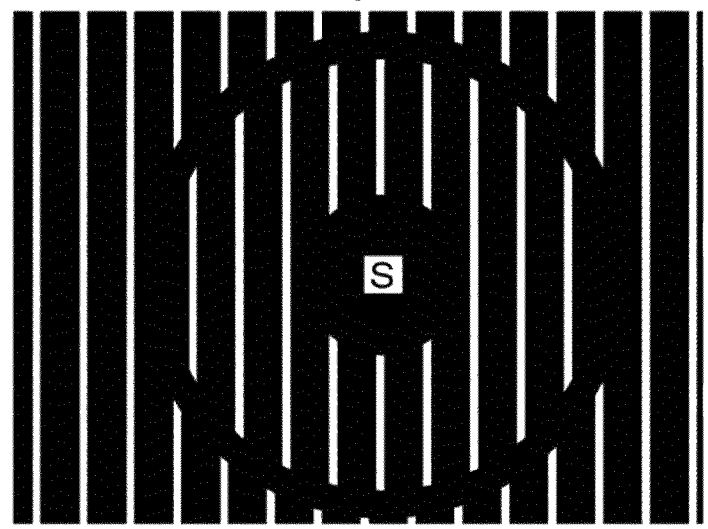
Figure 9B:
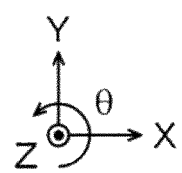
Figure 9C:
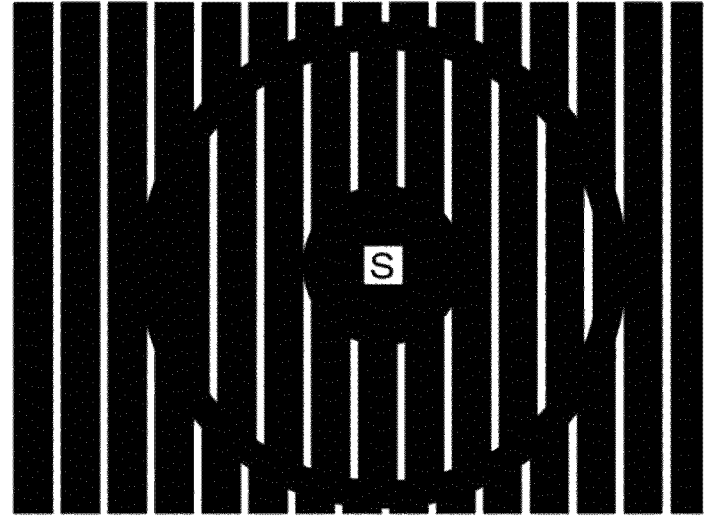
Figure 9C:
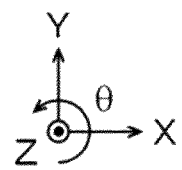

FIGS. 9A to 9C are views illustrating a third pattern of the measurement light. As illustrated in FIGS. 9A to 9C, measurement light (hereinafter, referred to as stripe measurement light) having the linear sections, which are parallel to the Y-direction and arranged in the X-direction, is output from the light projecting unit 110 a plurality of times (in this example, 16 times) as the third pattern. That is, linearly bright portions parallel to the Y-direction and linearly dark portions parallel to the Y-direction are periodically arrayed in the X-direction in the stripe measurement light.

When the first-time stripe measurement light is output, the light receiving unit 120 receives the light reflected by the surface of the measuring object S. The intensity of the received light is measured based on the pixel data of the first captured image of the measuring object S. FIG. 9A illustrates the first-time captured image of the measuring object S corresponding to the first stripe measurement light.

The second-time stripe measurement light has a pattern in which the bright and dark portions are moved from the first-time stripe measurement light by one unit in the X-direction. When the second-time stripe measurement light is output, the light receiving unit 120 receives the light reflected by the surface of the measuring object S. The intensity of the received light is measured based on the pixel data of the second captured image of the measuring object S.

The third-time stripe measurement light has a pattern in which the bright and dark portions are moved from the second-time stripe measurement light by one unit in the X-direction. When the third-time stripe measurement light is output, the light receiving unit 120 receives the light reflected by the surface of the measuring object S. The intensity of the received light is measured based on the pixel data of the third captured image of the measuring object S.

Through repetition of similar operations, the light intensities corresponding to fourth-time striped measurement light to sixteenth-time striped measurement light are measured based on the pixel data of the fourth to sixteenth captured images of the measuring object S. All the portions of the surface of the measuring object S are irradiated with the striped measurement light when the striped measurement light, in which the period in the X direction is 16 units, is output sixteen times. FIG. 9B illustrates the seventh captured image of the measuring object S corresponding to the seventh-time stripe measurement light. FIG. 9C illustrates the thirteenth-time captured image of the measuring object S corresponding to the thirteenth-time stripe measurement light.

Figure 10:
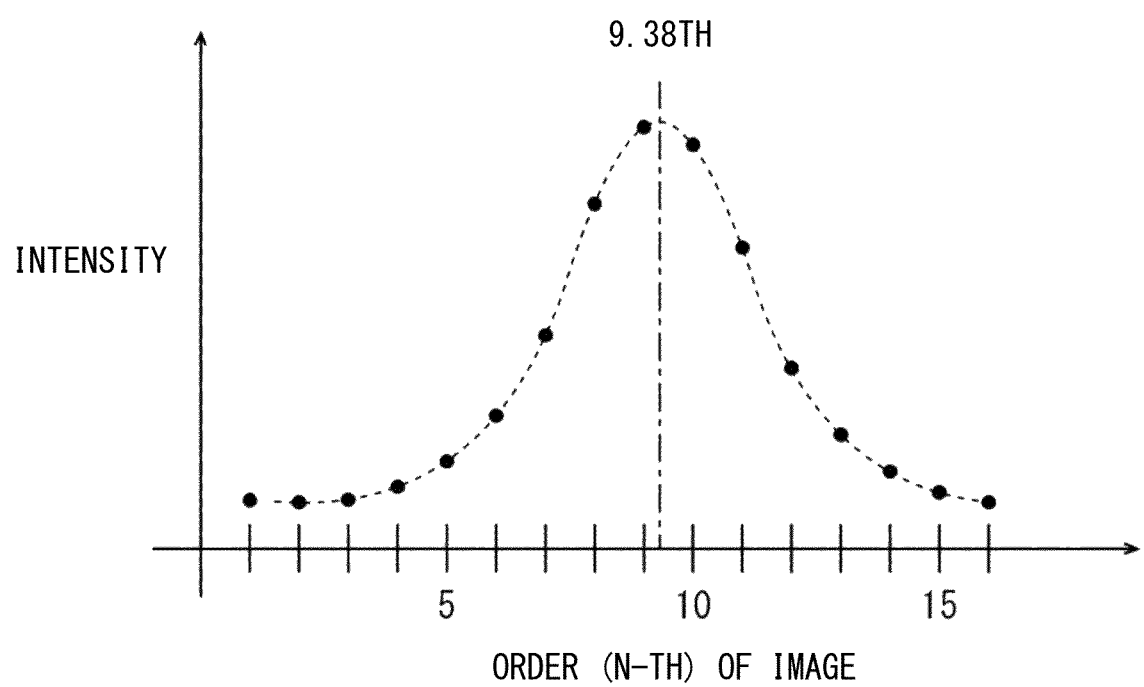
FIG. 10 is a view illustrating a relationship between timing (order) at which an image of a specific portion of a measuring object is captured and intensity of received light.

FIG. 10 is a view illustrating a relationship between timing (order) at which the image of a specific portion of the measuring object S is captured and the intensity of received light. In FIG. 10, a horizontal axis indicates order of the image and a vertical axis indicates the intensity of the received light. As described above, first to sixteenth captured images are generated for each portion of the measuring object S. The intensity of the light corresponding to each pixel of the generated first to sixteenth photographed images is measured.

The intensity of the light of each pixel of the captured image corresponding to the number of the captured image is illustrated, thereby obtaining a scatter diagram as illustrated in FIG. 10. The number (order) of the captured image at the maximum intensity of the light can be estimated with accuracy smaller than 1 by fitting, for example, a Gaussian curve, a spline curve or a parabola to the obtained scatter diagram. In the example of FIG. 10, the intensity of light is estimated to be the maximum in a virtual 9.38th captured image located between the ninth and the tenth captured images using the curve indicated by a fitted dotted line.

The maximum intensity of the light can be estimated from the fitted curve. The height h in each portion of the measuring object S can be calculated based on the number of the captured image in which the intensity of the light estimated in each portion of the measuring object S becomes the maximum. According to this method, the three-dimensional shape of the measuring object S is measured based on the intensity of the light having a sufficiently large S/N (Signal/Noise) ratio. Therefore, shape measurement accuracy of the measuring object S can be improved.

A relative height (a relative value of the height) in each portion on the surface of the measuring object S is measured in the shape measurement of the measuring object S using the measurement light having a periodic pattern shape such as the sinusoidal measurement light, the striped measurement light and the like. This is attributed to the following fact. Each of a plurality of straight lines (stripes), which constitute the pattern while being parallel to the Y-direction, cannot be identified, and uncertainty corresponding to an integral multiple of one period ($2\pi$) of the plurality of straight lines exists. Therefore, an absolute phase cannot be obtained. For this reason, known unwrapping processing may be performed on data of the measured height on the assumption that a height in one portion of the measuring object S and a height in an adjacent portion change continuously.

(5) Fourth Pattern of Measurement Light

FIGS. 11A to 11D are views illustrating a fourth pattern of the measurement light. As illustrated in FIGS. 11A to 11D, measurement light (hereinafter, referred to as code-like measurement light), which has the linear sections parallel to the Y-direction and in which the bright and dark portions are arrayed in the X-direction, is output from the light projecting unit 110 a plurality of times (in this example, four times) as the fourth pattern. Each of proportions of the bright and dark portions is 50% in the code-like measurement light.

The surface of the measuring object S is divided into a plurality of regions (in the example of FIGS. 11A to 11D, 16 regions) in the X direction. Hereinafter, the plurality of divided regions of the measuring object S in the X direction are referred to as first to sixteenth regions.

Figure 11A:
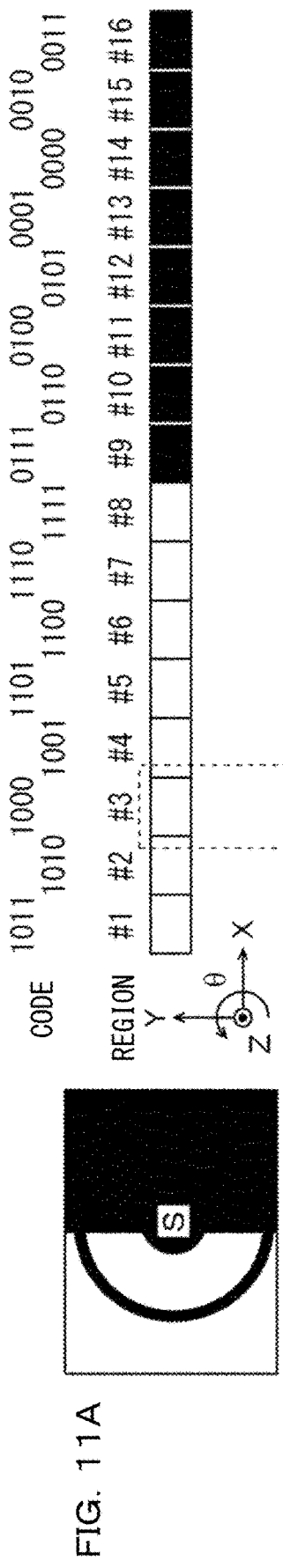
FIGS. 11A to 11D are views illustrating a fourth pattern of the measurement light.

FIG. 11A illustrates the code-like measurement light output at the first time. The code-like measurement light output at the first time includes the bright portion with which the first to eighth regions of the measuring object S are irradiated. The coded measurement light output at the first time includes the dark portion with which the ninth to sixteenth regions of the measuring object S are irradiated. Therefore, in the code-like measurement light output at the first time, the bright and dark portions are parallel in the Y direction and are arrayed in the X direction. Each of the proportions of the bright and dark portions is 50% in the code-like measurement light output at the first time.

Figure 11B:
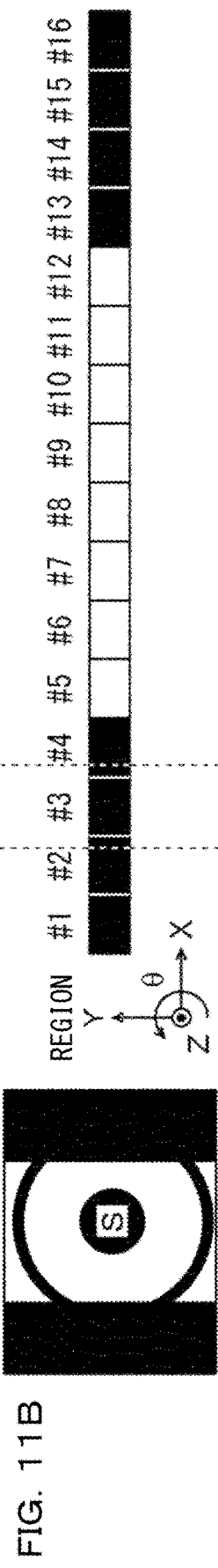

FIG. 11B illustrates the code-like measurement light output at the second time. The code-like measurement light output at the second time includes the bright portion with which the fifth to twelfth regions of the measuring object S are irradiated. The code-like measurement light output at the second time includes the dark portions with which the first to fourth, and thirteenth to sixteenth regions of the measuring object S are irradiated. Therefore, in the code-like measurement light output at the second time, the bright and dark portions are parallel in the Y direction and are arrayed in the X direction. Each of the proportions of the bright and dark portions is 50% in the code-like measurement light output at the second time.

Figure 11C:
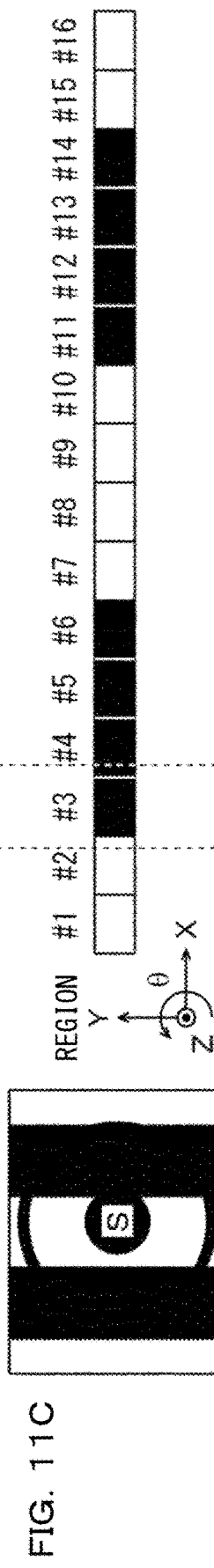

FIG. 11C illustrates the code-like measurement light output at the third time. The code-like measurement light output at the third time includes the bright portions with which the first, second, seventh to tenth, fifteenth and sixteenth regions of the measuring object S are irradiated. The code-like measurement light output at the third time includes the dark portions with which the third to sixth, and eleventh to fourteenth regions of the measuring object S are irradiated. Thus, in the code-like measurement light output at the third time, the bright and dark portions are parallel in the Y direction and are arrayed in the X direction. Each of the proportions of the bright and dark portions is 50% in the code-like measurement light output at the third time.

Figure 11D:
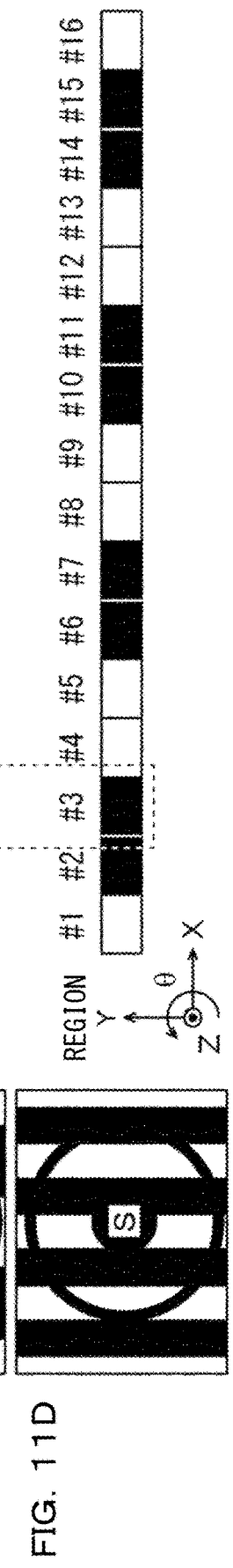

FIG. 11D illustrates the code-like measurement light output at the fourth time. The code-like measurement light output at the fourth time includes the bright portions with which the first, fourth, fifth, eighth, ninth, twelfth, thirteenth, and sixteenth regions of the measuring object S are irradiated. The code-like measurement light output at the fourth time includes the dark portions with which the second, third, sixth, seventh, tenth, eleventh, fourteenth, and fifteenth regions of the measuring object S are irradiated. Therefore, in the code-like measurement light output at the fourth time, the bright and dark portions are parallel in the Y direction and are arrayed in the X direction. Each of the proportions of the bright and dark portions is 50% in the code-like measurement light output at the fourth time.

A logic "1" is assigned to the bright portion of the code-like measurement light, and a logic "0" is assigned to the dark portion of the code-like measurement light. An alignment of the logics of the first- to fourth-time code-like measurement light with which each region of the measuring object S is irradiated is referred to as a code. In this case, the first region of the measuring object S is irradiated with the code-like measurement light of a code "1011". Therefore, the first region of the measuring object S is coded into the code "1011".

The second region of the measuring object S is irradiated with the code-like measurement light of a code "1010". Therefore, the second region of the measuring object S is coded into the code "1010". The third region of the measuring object S is irradiated with the code-like measurement light of a code "1000". Therefore, the third region of the measuring object S is coded into the code "1000". Similarly, the sixteenth region of the measuring object S is irradiated with the code-like measurement light of a code "0011". Therefore, the sixteenth region of the measuring object S is coded into the code "0011".

Thus, the measuring object S is irradiated with the code-like measurement light a plurality of times such that any one of digits of the code varies only by "1" between the adjacent regions of the measuring object S. That is, the measuring object S is irradiated with the coded measurement light a plurality of times such that the bright and dark portions change into a gray code-like pattern.

The light receiving unit 120 receives the light reflected by each region on the surface of the measuring object S. The code that changes due to the presence of the measuring object S is obtained in each region of the measuring object S by the measurement of the code of the received light. A difference between the obtained code and the code during the absence of the measuring object S is obtained in each region to calculate the distance corresponding to the distance d in FIG. 6. The absolute value of the distance d is calculated by the measurement method using the code-like measurement light, the measurement method using the code-like measurement light having a characteristic that the code appears only once in the X-axis direction of the image. Therefore, the absolute height (the absolute value of the height) of the region of the measuring object S is calculated. The three-dimensional shape of the measuring object S can be measured by the calculation of the heights of all the regions on the surface of the measuring object S.

In the above description, the surface of the measuring object S is divided into the 16 regions in the X direction, and the code-like measurement light is output from the light projecting unit 110 four times. However, the present invention is not limited thereto. Alternatively, the surface of the measuring object S may be divided into 2N regions (N is a natural number) in the X direction, and the code-like measurement light may be output from the light projecting unit 110 N times. In the above description, N is set to 4 for the sake of easy understanding. In the later-described data generation processing, for example, N is set to 8 in data generation processing. Accordingly, the surface of the measuring object S is divided into 256 regions in the X direction.

In the shape measurement of the measuring object S using the code-like measurement light, the distance in which the code-like measurement light can be separated and identified, that is, the distance corresponding to one pixel is the minimum resolution. Accordingly, when the light receiving unit 120 has the 1024-pixel visual field in the X direction, the measuring object S having the height of 10 mm can be measured with the resolution of 10 mm÷1024≈10 μm. By combining the shape measurement using the low-resolution code-like measurement light in which the absolute value can be calculated and the shape measurement using the high-resolution sinusoidal measurement light or stripe measurement light in which the absolute value cannot be calculated, the absolute value of the height of the measuring object S can be calculated with higher resolution.

Particularly, the resolution of 1/100 pixel can be attained in the shape measurement of the measuring object S using the stripe measurement light of FIGS. 9A to 9C. The resolution of 1/100 pixel corresponds to the division of the surface of the measuring object S into about 100000 regions in the X direction (that is, N≈17) when the light receiving unit 120 has the 1024-pixel visual field in the X direction. Therefore, the absolute value of the height of the measuring object S can be calculated with higher resolution by the combination of the shape measurement using the code-like measurement light and the shape measurement using the stripe measurement light.

The method for scanning the measuring object S with the linear measurement light is generally referred to as a light section method. On the other hand, the method for irradiating the measuring object S with the sinusoidal measurement light, the stripe measurement light, or the code-like measurement light is classified into a pattern projection method. Among the pattern projection methods, the method for irradiating the measuring object S with the sinusoidal measurement light or the stripe measurement light is classified into the phase shift method, and the method for irradiating the measuring object S with the coded measurement light is classified into a space coding method.

In the phase shift method, during the sinusoidal measurement light or stripe measurement light that is a periodic projection pattern, the height of the measuring object S is obtained from a phase difference between the phase, which is calculated based on the light reception amount reflected from a reference height position when the measuring object S is absent, and the phase, which is calculated based on the light reception amount reflected from the surface of the measuring object S when the measuring object S is present. In the phase shift method, the individual periodic stripes cannot be distinguished from each other, but the uncertainty corresponding to the integral multiple of one period of stripe ($2\pi$) exists. Therefore, there is a disadvantage that the absolute phase cannot be obtained. However, because fewer images are obtained compared to the light section method, there are advantages that the measurement time is relatively short and that the measurement resolution is high.

On the other hand, in the space coding method, the code changed due to the presence of the measuring object S is obtained in every region of the measuring object S. The absolute height of the measuring object S can be obtained by obtaining the difference between the obtained code and the code during the absence of the measuring object S in each region. In the space coding method, there is an advantage that the measurement can be performed using relatively few images to obtain the absolute height. However, there is a limitation to the measurement resolution compared to the phase shift method.

Although each of the projection methods has advantages and disadvantages, the projection methods are common in the use of the principle of triangular distance measuring method. The point cloud data representing the three-dimensional shape of the measuring object S is generated based on image data (hereinafter, referred to as pattern image data) of the measuring object S to which the measurement light having the above pattern is projected.

Hereinafter, the point cloud data representing the three-dimensional shape of the measuring object S is referred to as three-dimensional shape data. The three-dimensional shape data includes pieces of positional data at a plurality of points on the surface of the measuring object S. For example, the positional data represents coordinates in the X-direction, the Y-direction, and the Z-direction. Assuming that Pn (n is a natural number) is data at any point in the three-dimensional shape data, for example, Pn can be represented by ($X_n, Y_n, Z_n$) using a coordinate value of the device coordinate system. The three-dimensional shape data may be configured by surface information data generated based on the point cloud data, or include data in another format such as polygon mesh. An image (hereinafter, referred to as a three-dimensional shape image) representing the three-dimensional shape of the measuring object S can be displayed based on the three-dimensional shape data.

In the present embodiment, the three-dimensional shape image is an image indicating a state in which the three-dimensional shape data is projected onto any plane, in which a two-dimensional coordinate system is defined, and an image used to receive the user designation of the measurement point. The user can designate the plane onto which the three-dimensional shape data is projected as a direction (the position of the light receiving unit 120 with respect to the measuring object S) in which the user views the measuring object S. This enables the change in orientation of the measuring object S represented by the three-dimensional shape image.

(6) Synthesis of a Plurality of Pieces of Three-Dimensional Shape Data

When the position and attitude of the measuring object S are kept constant with respect to the light projecting unit 110 and the light receiving unit 120, only a part of the measuring object S is irradiated with the measurement light. Only the light reflected partially by the measuring object S is incident on the light receiving unit 120. Therefore, the three-dimensional shape data cannot be obtained in the wide range of the surface of the measuring object S. The image of the measuring object S is captured from a plurality of directions different from each other while the position and attitude of the measuring object S are changed, a plurality of pieces of three-dimensional shape data corresponding to the plurality of imaging directions are obtained, and the obtained plurality of pieces of three-dimensional shape data may be synthesized.

Figure 12A:
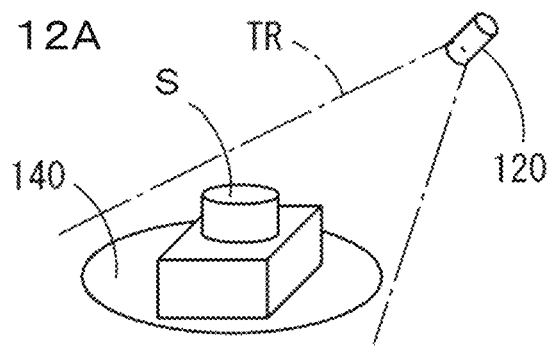
FIGS. 12A to 12F are views illustrating an example in which a plurality of pieces of three-dimensional shape data are generated by capturing the image of the measuring object from a plurality of directions.
Figure 12D:
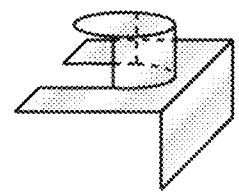

FIGS. 12A to 12F are views illustrating an example in which the plurality of pieces of three-dimensional shape data are generated by capturing the image of the measuring object S from a plurality of directions. For example, as illustrated in FIG. 12A, after the user adjusts the position and attitude of the measuring object S on the stage 140, the image of the measuring object S is captured using the measurement light, whereby the initial three-dimensional shape data is generated. FIG. 12D illustrates an example of the obtained three-dimensional shape image. The three-dimensional shape data is generated based on the measurement light, which is incident on the light receiving unit 120 after being reflected by the surface of the measuring object S. Therefore, on the surface of the measuring object S, the three-dimensional shape data is generated in a portion, which is visible from the position of the light receiving unit 120, but the three-dimensional shape data cannot be generated in a portion, which is invisible from the position of the light receiving unit 120.

Figure 12B:
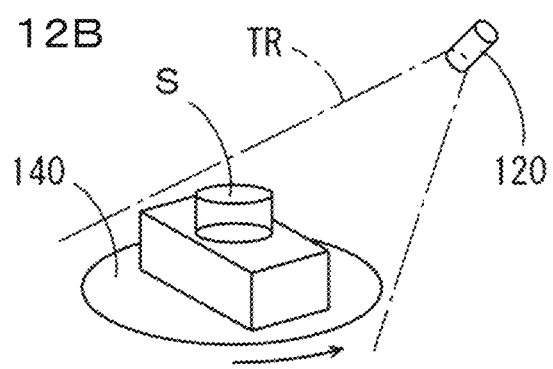
Figure 12E:
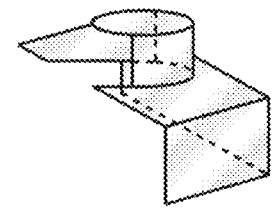

As illustrated in FIG. 12B, after the rotation mechanism 143 in FIG. 2 rotates the stage 140 by a given angle, the image of the measuring object S is captured using the measurement light, whereby the second three-dimensional shape data is generated. In the example of FIG. 12B, the stage 140 is rotated counterclockwise by about 45 degrees from the state in FIG. 12A when seen from above. FIG. 12E illustrates an example of the obtained three-dimensional shape image. When the stage 140 is rotated as described above, the portion visible from the position of the light receiving unit 120 and the portion invisible from the position of the light receiving unit 120 on the surface of the measuring object S also change according to the rotation of the stage 140. As a result, the three-dimensional shape data including a portion that is not obtained during the initial imaging is generated.

Figure 12C:
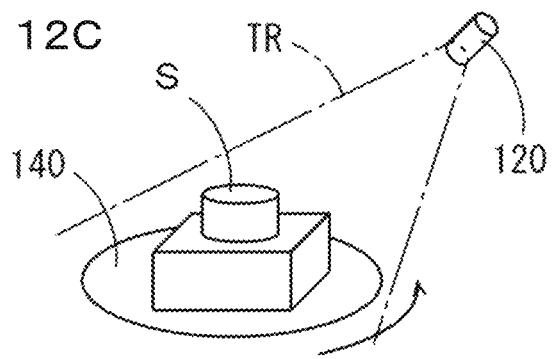
Figure 12F:
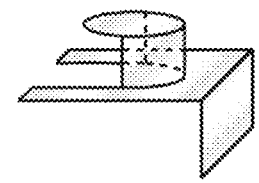

As illustrated in FIG. 12C, after the rotation mechanism 143 in FIG. 2 rotates the stage 140 by a given angle, the image of the measuring object S is captured using the measurement light, whereby the third three-dimensional shape data is generated. In the example of FIG. 12C, the stage 140 is rotated counterclockwise by about 45 degrees from the state in FIG. 12B when the stage 140 is seen from above. FIG. 12F illustrates an example of the obtained three-dimensional shape image.

The plurality of pieces of three-dimensional shape data corresponding to the plurality of imaging directions are generated by the repetition of the rotation of the stage 140 and the imaging of the measuring object S.

During the plurality of times of imaging, the CPU 210 in FIG. 1 detects a rotation position (rotation angle) of the stage 140. The positional relationship among the two light projecting units 110, the two light receiving units 120, and the rotation axis Ax of the stage 140 is kept constant. For example, a parameter (hereinafter, referred to as a device parameter) representing the relative position is stored in the storage device 240 of FIG. 1. For example, the device parameter is represented by the device coordinate system.

In this case, based on the device parameter and the rotation position of the stage 140, each of the plurality of pieces of three-dimensional shape data can be coordinate-transformed such that the positional data included in each piece of three-dimensional shape data is represented by a virtually common three-dimensional coordinate system based on a part of the stage 140.

In this example, as described above, the plurality of pieces of three-dimensional shape data are coordinate-transformed so as to be represented by the common three-dimensional coordinate system, and the coordinate-transformed plurality of pieces of three-dimensional shape data are synthesized by pattern matching performed on the overlapping portion. Therefore, the three-dimensional shape data is generated in the wide range of the outer surface of the measuring object S.

[3] Texture Image Data Representing Appearance of Measuring Object

In the measuring unit 100, image data (hereinafter, referred to as texture image data) representing an appearance (surface state) of the measuring object S is generated while the illumination light output unit 130 irradiates the measuring object S with the illumination light or while the light projecting units 110A, 110B irradiate the measuring object S with uniform measurement light. The uniform measurement light means measurement light having no pattern, and can be used instead of the illumination light. Hereinafter, such measurement light is referred to as uniform measurement light. For example, the surface state of the measuring object S includes a pattern and a hue. Hereinafter, an image represented by the texture image data is referred to as a texture image.

Various examples of the texture image data will be described below. For example, the plurality of pieces of texture image data may be obtained while a focal position of the light receiving unit 120 is changed with respect to the measuring object S. In this case, the texture image data (hereinafter referred to as all-focus texture image data) focused on the whole surface of the measuring object S is generated by the synthesis of the plurality of pieces of texture image data. In the case where the all-focus texture image data is generated, it is necessary to provide a focus moving mechanism that moves the focal position of the light receiving unit 120 in the measuring unit 100.

The plurality of pieces of texture image data may be obtained on a plurality of different imaging conditions. For example, the imaging conditions include the exposure time of the light receiving unit 120, the intensity (brightness) of the illumination light from the illumination light output unit 130, and the intensity (brightness) of the uniform measurement light from the light projecting unit 110. In this case, by performing known High-Dynamic Range (HDR) synthesis using the obtained plurality of pieces of texture image data, the texture image data (hereinafter, referred to as HDR texture image data) in which underexposure and overexposure are suppressed is generated.

The imaging condition may be changed while the focal position is changed. Specifically, the texture image data is obtained on the plurality of different imaging conditions at each position while the focus of the light receiving unit 120 is changed to a plurality of positions with respect to the measuring object S. The texture image data, which is focused on the whole surface of the measuring object S and in which the underexposure and the overexposure are suppressed, is generated by the synthesis of the obtained plurality of pieces of texture image data.

Each piece of texture image data includes texture information (information representing optical surface state) representing color or luminance at each point of the measuring object S. On the other hand, the three-dimensional shape data does not include the information about the optical surface state of the measuring object S. Therefore, textured three-dimensional shape data in which texture information is provided to the three-dimensional shape data is generated by the synthesis of the three-dimensional shape data and any one of the pieces of texture image data.

The textured three-dimensional shape data includes both positional data at each of a plurality of points on the surface of the measuring object S and data indicating the color or luminance of the point correlated with the positional data at each point. In this case, assuming that TPn (n is a natural number) is data indicating any point in the textured three-dimensional shape data, for example, TPn can be represented by (Xn,Yn,Zn,Rn,Gn,Bn) using a coordinate value of the device coordinate system and red, green, and blue components (R,G,B) of three primary colors. Alternatively, for example, TPn can be represented by (Xn,Yn,Zn,In) using a coordinate value of the device coordinate system and luminance value (I). The textured three-dimensional shape data may be configured by surface information data that is generated based on the point cloud data.

Hereinafter, the texture image represented by the texture image data obtained by the constant focal position and imaging condition is referred to as a normal texture image, an image represented by the all-focus texture image data is referred to as an all-focus texture image, and an image represented by the HDR texture image data is referred to as an HDR texture image. The image represented by the textured three-dimensional shape data is referred to as a textured three-dimensional shape image.

In the present embodiment, the textured three-dimensional shape image is an image indicating the state in which the textured three-dimensional shape data is projected onto any plane, in which the two-dimensional coordinate system is defined, and an image used to receive the user designation of the measurement point. The user can designate the plane onto which the textured three-dimensional shape data is projected as a direction (the position of the light receiving unit 120 with respect to the measuring object S) in which the user views the measuring object S. This enables the change in orientation of the measuring object S represented by the textured three-dimensional shape image.

As described above, the image of the measuring object S is captured using the illumination light or the uniform measurement light in order to generate the texture image data. Here, as described above, the illumination light output unit 130 includes the illumination light output port 131 that is formed so as to surround the two light receiving units 120. With such a configuration, the measuring object S is irradiated with at least part of the illumination light output from the output port 131 in a state where the illumination light is substantially parallel to the optical axis of the light receiving unit 120. In the case where the image of the measuring object S is captured using the illumination light, a shadow component is hardly generated in the generated texture image data. Preferably, the illumination light is used during the generation of the texture image data.

As illustrated in the example of FIGS. 12A to 12F, in the case where the plurality of pieces of three-dimensional shape data are generated by the imaging of the measuring object S from the plurality of directions, the imaging may be performed using the illumination light or uniform measurement light together with the imaging performed using the measurement light. In this case, the plurality of pieces of texture image data corresponding to the plurality of pieces of three-dimensional shape data can be generated. Accordingly, the textured three-dimensional shape data representing the three-dimensional shape and surface state can be generated in the wide range of the outer surface of the measuring object S by the synthesis of the plurality of pieces of three-dimensional shape data and the plurality of pieces of texture image data.

[4] Shape Measurement (1) Preparation for Shape Measurement

Figure 13:
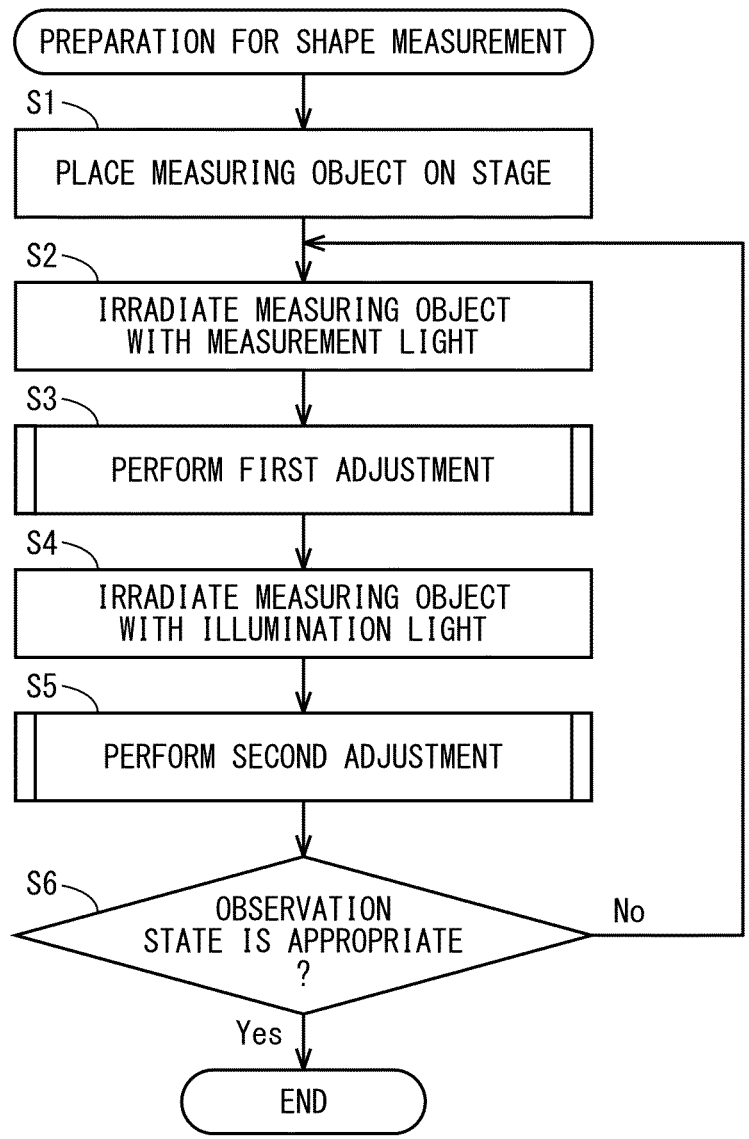
FIG. 13 is a flowchart illustrating a procedure for preparing shape measurement.

The user prepares the shape measurement before measuring the measuring object S. FIG. 13 is a flowchart illustrating a procedure for preparing the shape measurement. The procedure for preparing the shape measurement will be described below with reference to FIGS. 1, 2, and 13. The user firstly places the measuring object S on the stage 140 (step S1). Then, the user irradiates the measuring object S with the measurement light using the light projecting unit 110 (step S2). At this time, the live image of the measuring object S is displayed on the display unit 400. Subsequently, the user adjusts the brightness of the obtained live image and the position and attitude of the measuring object S (hereinafter, referred to as first adjustment) while viewing the live image displayed on the display unit 400 (step S3). The live image brightness obtained in step S3 can be adjusted by the change of at least one of the measurement light amount and the exposure time of the light receiving unit 120. In the present embodiment, one of the measurement light amount and the exposure time of the light receiving unit 120 is adjusted in order to set the brightness of the live image obtained using the measurement light to the brightness suitable for the observation. Preferably, the brightness of the obtained live image is adjusted by the exposure time of the light receiving unit 120 while the measurement light amount is kept constant. This enables the suppression of measurement accuracy degradation, which is caused by a temperature change of the measurement light source 111 in association with the change of the measurement light amount.

In step S2, the measuring object S may be irradiated with the measurement light having any one of the first to fourth patterns, or the measuring object S may be irradiated with the uniform measurement light. In step S3, when the shadow is not generated at the point to be measured (hereinafter, referred to as a measurement point) in the measuring object S, the user does not need to adjust the position and attitude of the measuring object S, but only needs to adjust the measurement light amount or the exposure time of the light receiving unit 120.

The user then stops the irradiation of the measurement light, and irradiates the measuring object S with the illumination light from the illumination light output unit 130 (step S4). Here, the live image of the measuring object S is displayed on the display unit 400. Subsequently, the user adjusts the brightness of the obtained live image (hereinafter, referred to as second adjustment) while viewing the live image displayed on the display unit 400 (step S5). Basically, similarly to the example in step S3, the live image brightness obtained in step S5 can be adjusted by the change of at least one of the illumination light amount and the exposure time of the light receiving unit 120. In the present embodiment, one of the illumination light amount and the exposure time of the light receiving unit 120 is adjusted in order to set the brightness of the live image obtained using the illumination light to the brightness suitable for the observation.

The user then checks the live image displayed on the display unit 400, and determines whether the light amount, the exposure time of the light receiving unit 120, and the position and attitude of the measuring object S (hereinafter referred to as an observation state) are appropriate (step S6). In step S6, the measuring object S may be irradiated with the measurement light or the illumination light, or sequentially be irradiated with the measurement light and the illumination light.

When the observation state is determined to be inappropriate in step S6, the user returns to the processing in step S2. On the other hand, when the observation state is determined to be appropriate in step S6, the user ends the preparation for the shape measurement.

In the above description, the second adjustment is performed after the first adjustment. However, the present invention is not limited thereto. Alternatively, the first adjustment may be performed after the second adjustment. In this case, the user may adjust the position and attitude of the measuring object S in the second adjustment, and check whether the desired portion of the measuring object S is irradiated with the measurement light during the first adjustment. When the desired portion of the measuring object S is not irradiated with the measurement light, the position and attitude of the measuring object S may be adjusted again, and the illumination light amount or the exposure time of the light receiving unit 120 may be adjusted again as the second adjustment.

(2) First Adjustment

Figure 14:
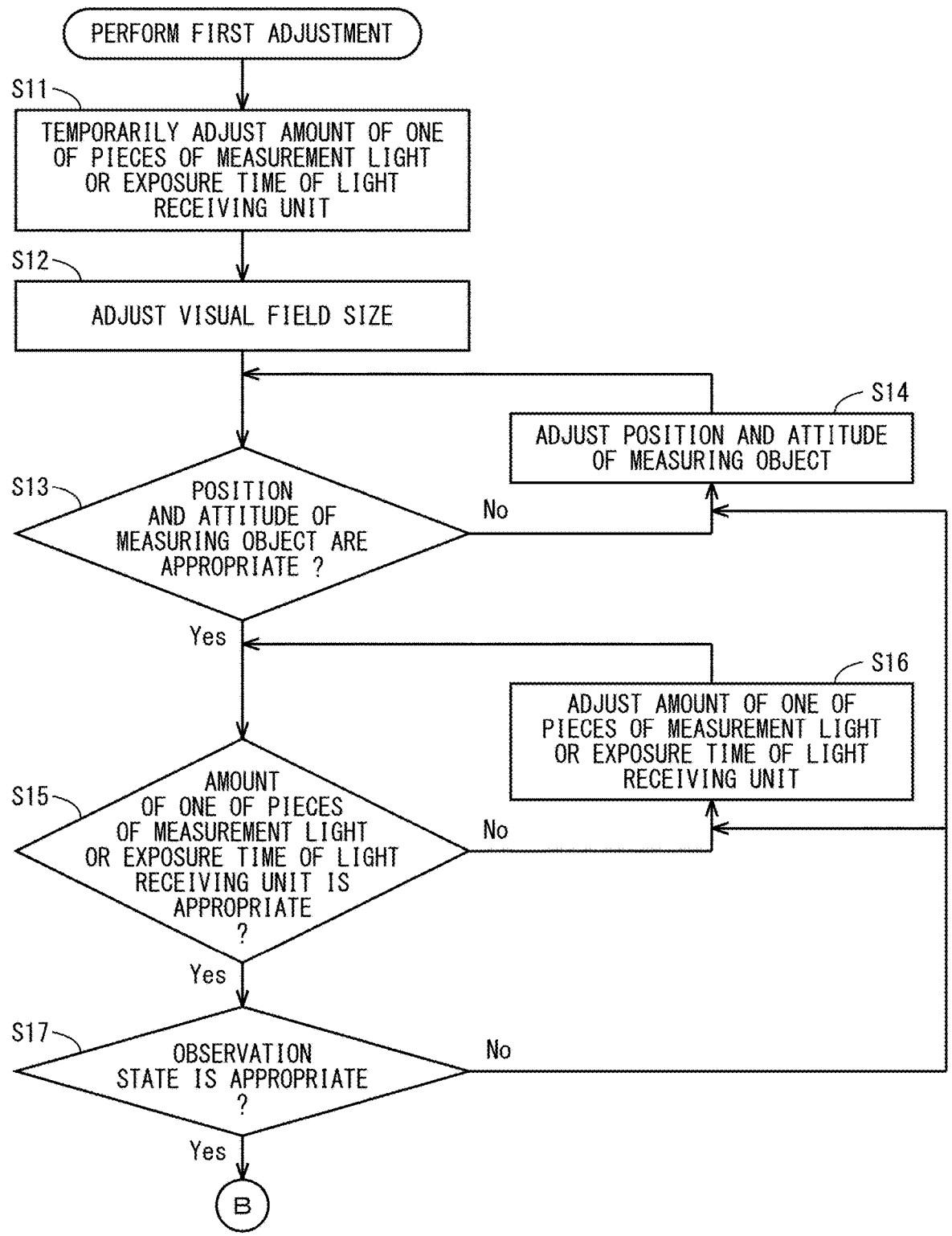
FIG. 14 is a flowchart illustrating details of first adjustment in the procedure for preparing the shape measurement.
Figure 15:
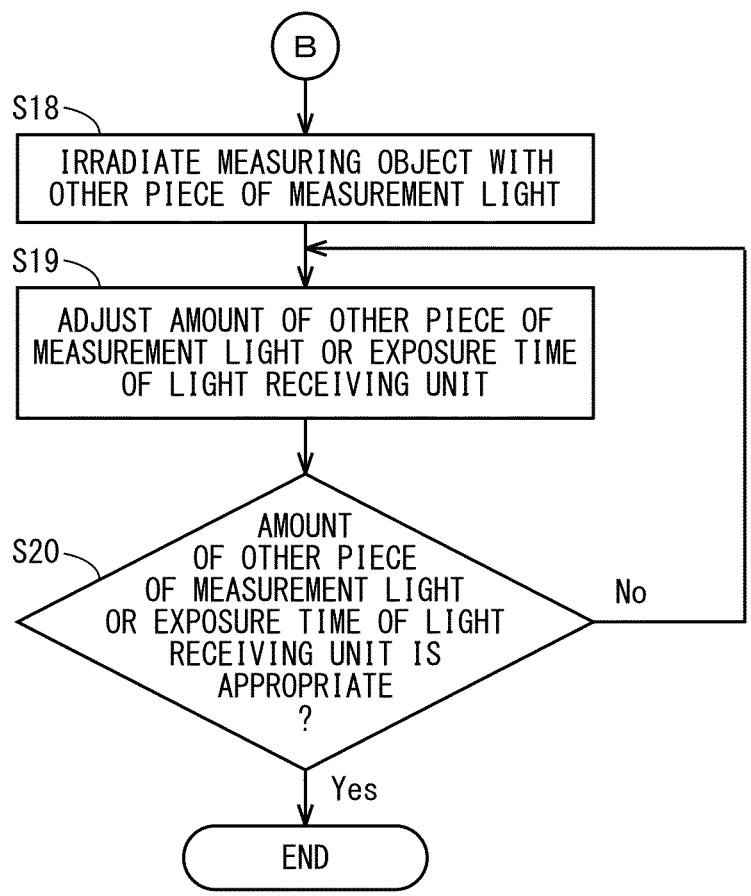
FIG. 15 is a flowchart illustrating details of the first adjustment in the procedure for preparing the shape measurement.

FIGS. 14 and 15 are flowcharts illustrating details of the first adjustment in the procedure for preparing the shape measurement. The details of the first adjustment in the procedure for preparing the shape measurement will be described below with reference to FIGS. 1, 2, 14, and 15. Hereinafter, the measurement light output from one of the light projecting units 110A, 110B is referred to as one piece of measurement light, and the measurement light output from the other of the light projecting units 110A, 110B is referred to as the other piece of measurement light. In the measuring unit 100, amounts of one and the other pieces of measurement light can independently be set. The exposure time of the light receiving unit 120 when the image of the measuring object S is captured using one piece of measurement light, and the exposure time of the light receiving unit 120 when the image of the measuring object S is captured using the other piece of measurement light can independently be set.

First, the user temporarily adjusts the amount of one piece of measurement light and the exposure time of the light receiving unit 120 in order to set the brightness of the obtained live image to the brightness suitable for the observation (step S11). The user then adjusts the magnification (hereinafter, referred to as a visual field size) of the live image of the measuring object S displayed on the display unit 400 (step S12). Specifically, the user selects one of the light receiving unit 120A having the low-magnification lens 122 and the light receiving unit 120B having the high-magnification lens 122 as the light receiving unit 120 used in the measurement of the measuring object S. Therefore, the live image obtained by the selected light receiving unit is displayed on the display unit 400. The visual field size in the selection of the low-magnification light receiving unit 120A is larger than the visual field size in the selection of the high-magnification light receiving unit 120B. The measuring unit 100 may have a digital zoom function. In this case, the user can select one of the two light receiving units 120A, 120B, and adjust display magnification of the live image obtained by the selected light receiving unit 120.

Subsequently, the user determines whether the position and attitude of the measuring object S are appropriate based on the live image of the measuring object S displayed on the display unit 400 (step S13). When the shadow is not generated at the measurement point of the measuring object S, the user determines that the position and attitude of the measuring object S are appropriate. On the other hand, when the shadow is generated at the measurement point of the measuring object S, the user determines that the position and the attitude of the measuring object S are inappropriate.

When the position and attitude of the measuring object S are determined to be inappropriate in step S13, the user adjusts the position and attitude of the measuring object S (step S14). Specifically, the user adjusts the position and attitude of the measuring object S by rotating the stage 140 with the rotation mechanism 143 or manually moving the measuring object S. Then, the user returns to the processing in step S13.

On the other hand, when the position and attitude of the measuring object S are determined to be appropriate in step S13, the user determines whether the brightness of the obtained live image is the brightness suitable for the observation, that is, whether the amount of one piece of measurement light with which the measuring object S is irradiated or the exposure time of the light receiving unit 120 is appropriate based on the live image of the measuring object S displayed on the display unit 400 (step S15).

When the amount of one piece of measurement light or the exposure time of the light receiving unit 120 is determined to be inappropriate in step S15, the user adjusts the amount of one piece of measurement light or the exposure time of the light receiving unit 120 (step S16). Then, the user returns to the processing in step S15.

On the other hand, when the amount of one piece of measurement light is determined to be appropriate in step S15, the user determines whether the observation state is appropriate from the live image of the measuring object S displayed on the display unit 400 (step S17). When the observation state is determined to be inappropriate in step S17, the user returns to the processing in step S14 or S16. Specifically, the user returns to the processing in step S14 when the position and attitude of the measuring object S are determined to be inappropriate in the observation state. The user returns to the processing in step S16 when the amount of light (one piece of measurement light) or the exposure light of the light receiving unit 120 is determined to be inappropriate in the observation state.

On the other hand, when the observation state is determined to be appropriate in step S17, the user stops the irradiation of one piece of measurement light and irradiates the measuring object S with the measurement light from the other light projecting unit 110B (step S18). Therefore, the live image of the measuring object S is displayed on the display unit 400. Subsequently, in order to set the brightness of the obtained live image to the brightness suitable for the observation, the user adjusts the amount of the other piece of measurement light or the exposure time of the light receiving unit 120 while viewing the live image of the measuring object S displayed on the display unit 400 (step S19).

Then, based on the live image of the measuring object S displayed on the display unit 400, the user determines whether the brightness of the obtained live image is suitable for the observation, that is, whether the amount of the other piece of measurement light or the exposure time of the light receiving unit 120 is appropriate (step S20). The user returns to the processing in step S19 when the amount of the other piece of measurement light or the exposure time of the light receiving unit 120 is determined to be inappropriate in step S20. On the other hand, when the amount of the other piece of measurement light or the exposure time of the light receiving unit 120 is determined to be appropriate in step S20, the user ends the first adjustment. The light amount condition of one and the other pieces of measurement light optimal for the generation of the three-dimensional shape data or the exposure time condition of the light receiving unit 120 corresponding to each of one and the other pieces of measurement light is set by performing the first adjustment. In the case where the other light projecting unit 110B is not used, the user may omit the procedure in steps S18 to S20 and end the first adjustment after the processing in step S17.

(3) Second Adjustment

Figure 16:
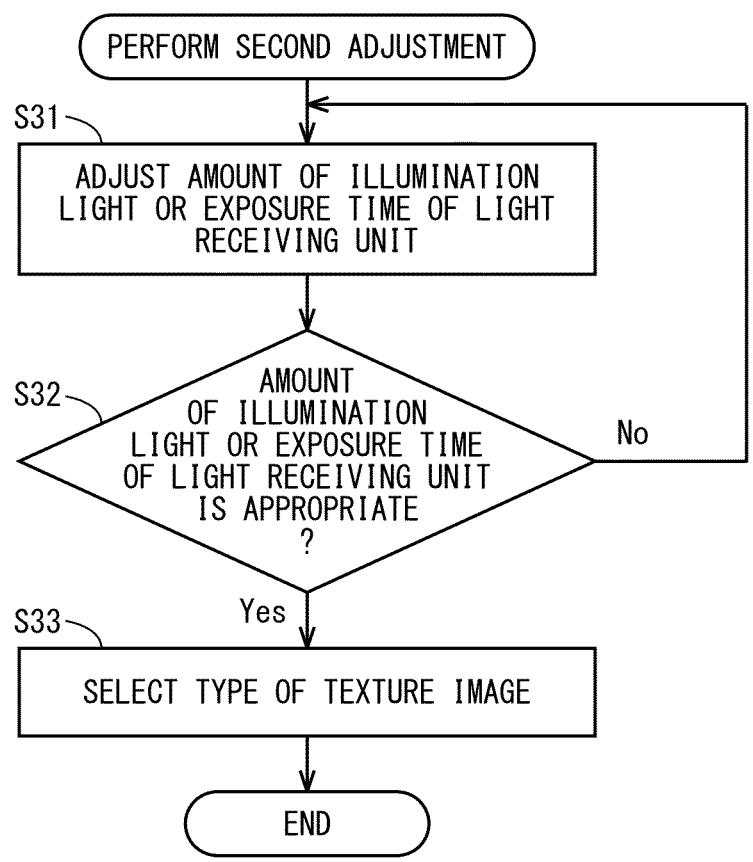
FIG. 16 is a flowchart illustrating details of second adjustment in the procedure for preparing the shape measurement.

FIG. 16 is a flowchart illustrating details of the second adjustment in the procedure for preparing the shape measurement. The details of the second adjustment in the procedure for preparing the shape measurement will be described below with reference to FIGS. 1, 2, and 16. In the measuring unit 100 according to the present embodiment, the illumination light amount can be set independently of the amounts of one and the other pieces of measurement light. The exposure time of the light receiving unit 120 in capturing the image of the measuring object S using the illumination light can be set independently of the exposure time of the light receiving unit 120 in capturing the image of the measuring object S using one and the other pieces of measurement light.

The user firstly adjusts the illumination light amount or the exposure time of the light receiving unit 120 in order to set the brightness of the obtained live image to the brightness suitable for the observation (step S31). Based on the live image of the measuring object S displayed on the display unit 400, the user then determines whether the brightness of the obtained live image is suitable for the observation, that is, whether the illumination light amount with which the measuring object S is irradiated or the exposure time of the light receiving unit 120 is appropriate (step S32).

The user returns to the processing in step S31 when the illumination light amount or the exposure time of the light receiving unit 120 is determined to be inappropriate in step S32. On the other hand, when the illumination light amount or the exposure time of the light receiving unit 120 is determined to be appropriate in step S32, the user selects a type of the texture image to be obtained (step S33), and ends the second adjustment. For example, the type of the texture image includes the normal texture image, the all-focus texture image, and the HDR texture image. The light amount condition of the illumination light optimal for the generation of the texture image data or the exposure time of the light receiving unit 120 corresponding to the illumination light is set by performing the second adjustment.

When the all-focus textured image or the HDR texture image is selected in step S33, another setting may be performed in order to appropriately obtain the all-focus texture image data or the HDR texture image data. For example, a change range of the focal position may be set when the all-focus texture image is selected. For example, a change range of the imaging condition may be set when the HDR texture image data is selected. Based on these settings, the all-focus texture image or the HDR texture image may be displayed on the display unit 400 for the purpose of pre-view.

(4) Data Generation Processing

After the user prepares the shape measurement in FIG. 13, the data generation processing is performed in order to generate the three-dimensional shape data and textured three-dimensional shape data of the measuring object S. The data generation processing is performed based on a data generating condition set previously by the user. The data generating condition is previously stored in the storage device 240 in FIG. 1 before the data generation processing is performed. The data generating condition includes information about the three-dimensional shape data that should be generated through the data generation processing.

For example, as illustrated in the example of FIGS. 12A to 12F, in the case where one piece of three-dimensional shape data is generated by the synthesis of the plurality of pieces of three-dimensional shape data obtained by the imaging from the plurality of directions, it is necessary to rotate the stage 140 (see FIG. 2) in order to generate the plurality of pieces of three-dimensional shape data. Therefore, the user sets the rotation position of the stage 140 at each imaging time, the rotation direction of the stage 140, and the number of imaging times as the generating condition.

More specifically, in planar view, the user rotates the stage plate 142 clockwise by each 120 degrees in the range of 0 degrees to 360 degrees to perform the imaging at positions of 0 degrees, 120 degrees, and 240 degrees. Alternatively, in planar view, the user rotates the stage plate 142 counterclockwise by each 60 degrees in the range of 120 degrees to 300 degrees to perform the imaging at positions of 120 degrees, 180 degrees, 240 degrees, and 300 degrees.

During the setting of the generating condition, a user interface may be displayed on a screen of the display unit 400, for example, in order to input or designate a rotation start position, a rotation end position, a rotation direction, and rotation pitch angle of the stage plate 142. In the user interface, a user interface may be displayed in order to input or designate a rotation passing position in addition to or instead of the rotation direction. Therefore, the user can easily set the generating condition by operating the user interface using the operation unit 250 in FIG. 1.

Figure 17:
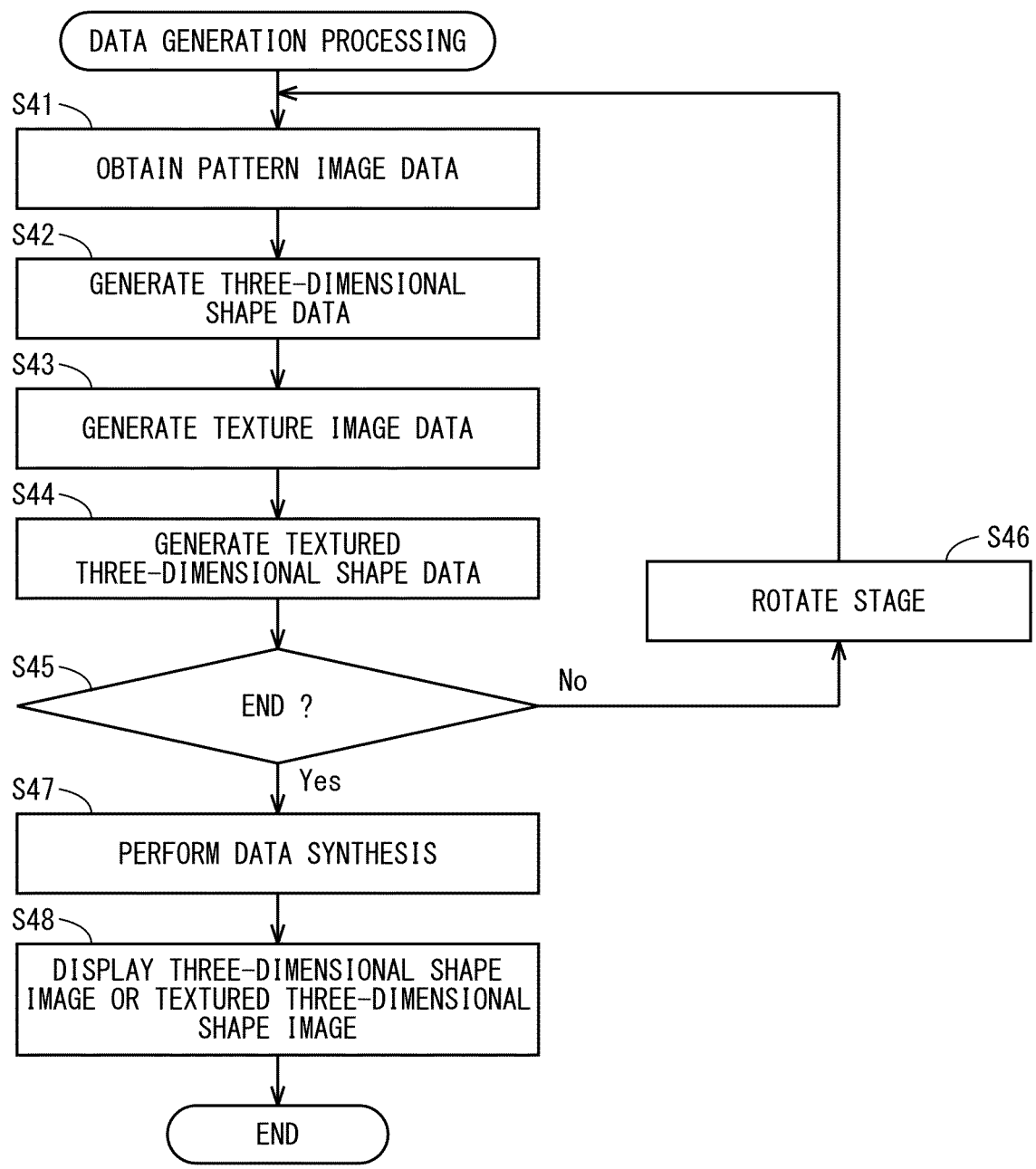
FIG. 17 is a flowchart illustrating data generation processing.

FIG. 17 is a flowchart illustrating data generation processing. The CPU 210 in FIG. 1 performs the data generating program stored in the storage device 240 of FIG. 1 in response to the instruction to start the data generation processing from the user.

The CPU 210 firstly irradiates the measuring object S with the measurement light from the light projecting unit 110 according to the light amount condition set in the first adjustment, and obtains image data (pattern image data) of the measuring object S in which the pattern of the measurement light is projected onto the measuring object S (step S41). The obtained pattern image data is stored in the working memory 230.

The CPU 210 then processes the obtained pattern image data using a predetermined algorithm to generate the three-dimensional shape data indicating the three-dimensional shape of the measuring object S (step S42). The generated three-dimensional shape data is stored in the working memory 230.

The CPU 210 then obtains the texture image data corresponding to the type of the texture image selected in step S33 of FIG. 16 (step S43). The obtained texture image data is stored in the working memory 230.

The CPU 210 then generates the textured three-dimensional shape data by the synthesis of the three-dimensional shape data generated in step S42 and the texture image data obtained in step S43 (step S44).

Based on the previously-set generating condition, the CPU 210 then determines whether the imaging is performed on the whole measuring object S (step S45). When the imaging is not performed on the whole measuring object S, the CPU 210 rotates the stage 140 (see FIG. 2) by a predetermined pitch based on the generating condition (step S46), and returns to the processing in step S41.

When the imaging is performed on the whole measuring object S in step S45, the CPU 210 performs synthesis of the plurality of pieces of three-dimensional shape data generated by the plural repetition of the processing in step S42, and performs synthesis of the plurality of pieces of textured three-dimensional shape data generated by the plural repetition of the processing in step S44 (step S47). In the case where the pieces of processing in steps S41 to S45 are performed only once, the processing in step S47 is omitted. Thus, the three-dimensional shape data and textured three-dimensional shape data, which are used to measure the measuring object S, are generated.

Then, based on the generated three-dimensional shape data or textured three-dimensional shape data, the CPU 210 displays the three-dimensional shape image or textured three-dimensional shape image of the measuring object S on the display unit 400 (step S48).

In step S48, the user can appropriately select one of the three-dimensional shape image and the textured three-dimensional shape image as the image to be displayed on the display unit 400. When the measurement point of the measuring object S is not appropriately displayed in step S45, the user may perform the first adjustment in FIGS. 14 and 15 again.

In the data generation processing, the point cloud data generating unit 501 in FIG. 3 mainly performs the pieces of processing in steps S41 to S45, S47, and S48, and the rotation control unit 506 in FIG. 3 mainly performs the processing in step S46.

(5) Measurement of Measuring Object

Various types of measurement are performed on the measuring object S based on the three-dimensional shape data or textured three-dimensional shape data, which is generated through the data generation processing in FIG. 17, and a measurement condition set by the user. The measurement condition includes a measurement point and a measurement item. Details of the measurement point and measurement item will be described later.

During the setting of the measurement condition, for example, the textured three-dimensional shape image is displayed on the display unit 400 based on the textured three-dimensional shape data generated through the previous data generation processing. The user can operate the operation unit 250 in FIG. 1 to designate the direction (the position of the light receiving unit 120 with respect to the measuring object S) in which the user views the measuring object S.

In response to the user designation of the direction, the CPU 210 in FIG. 1 displays the textured three-dimensional shape image in which the orientation of the observation object S on the display unit 400 is adjusted such that the state in which the measuring object S is seen from the designated direction is reproduced. In this state, the user operates the operation unit 250 in FIG. 1 while visually recognizing the textured three-dimensional shape image, thereby setting the measurement condition on the screen of the display unit 400.

Figure 18:
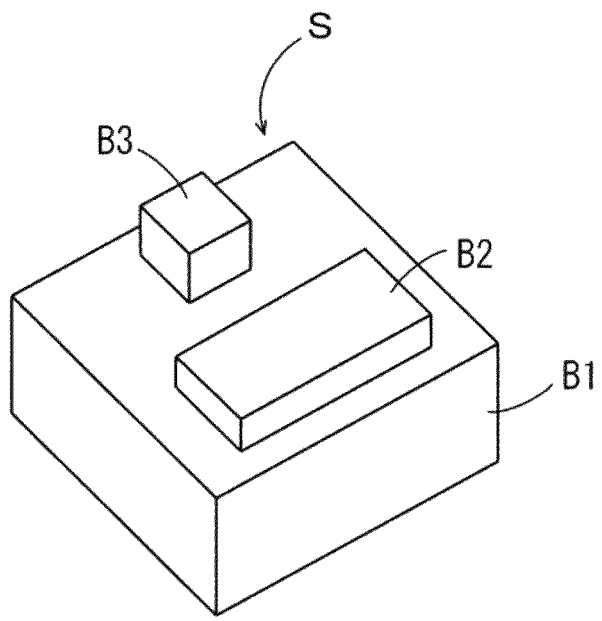
FIG. 18 is a perspective view illustrating an appearance example of the measuring object.
Figure 19:
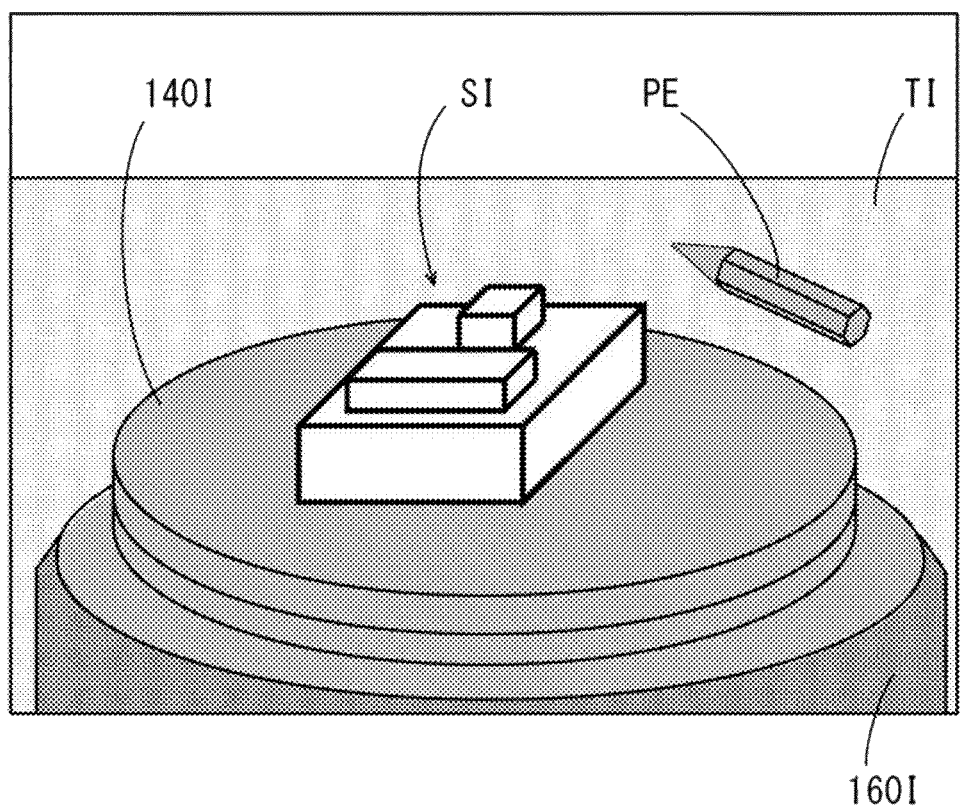
FIG. 19 is a view illustrating an example of a textured three-dimensional shape image obtained through data generation processing performed on the measuring object in FIG. 18.

FIG. 18 is a perspective view illustrating an example of the measuring object S, and FIG. 19 is a view illustrating an example of the textured three-dimensional shape image obtained through the data generation processing performed on the measuring object S in FIG. 18. As illustrated in FIG. 18, the measuring object S in this example includes a board B1 and elements B2, B3 mounted on the board B1.

As illustrated in FIGS. 4 and 5, the light receiving unit 120A that captures the image of the measuring object S is positioned such that the imaging visual field TR1 includes at least the placement surface of the stage 140 and a space surrounding the placement surface. Therefore, in the data generation processing, the measurement light reflected at a position other than the measuring object S is incident on the light receiving unit 120A. In this case, as illustrated in FIG. 19, the textured three-dimensional shape image obtained through the data generation processing includes an image illustrating many members existing in the imaging visual field TR1 (see FIGS. 4 and 5) of the light receiving unit 120A.

Specifically, the textured three-dimensional shape image of FIG. 19 includes an image 1401 of the stage 140 in FIG. 2, an image 1601 of the installation part 161 in FIG. 3, an image TI of a table on which the measuring unit 100 in FIG. 3 is placed, and an image PE of a pencil placed on the table together with an image SI of the measuring object S. The point cloud data representing the images 1401, 1601, TI, and PE corresponds to the ineffective region displaced from the effective regions MR1, MR2 (see FIG. 5), and is basically unnecessary for the measurement of the measuring object S.

When many unnecessary pieces of point cloud data are present in the measurement of the measuring object S, there is a possibility that the user mistakenly sets the measurement condition. There is also a possibility that an unnecessarily large load is applied during calculation processing or display processing in the measurement. Therefore, in the measuring device 500 according to the present embodiment, the user can select the obtainment of only the point cloud data corresponding to the effective region from the three-dimensional shape data generated through the data generation processing or the obtainment of the point cloud data corresponding to the effective region and the point cloud data corresponding to the ineffective region as the measurement data. In this case, the CPU 210 in FIG. 1 obtains the measurement data from the three-dimensional shape data generated through the data generation processing according to the user selection.

The user can also designate the region to be removed from the region corresponding to the obtained measurement data. In this case, the CPU 210 in FIG. 1 removes the point cloud data corresponding to the designated region in the obtained measurement data in response to the user designation, thereby correcting the measurement data.

Figure 20:
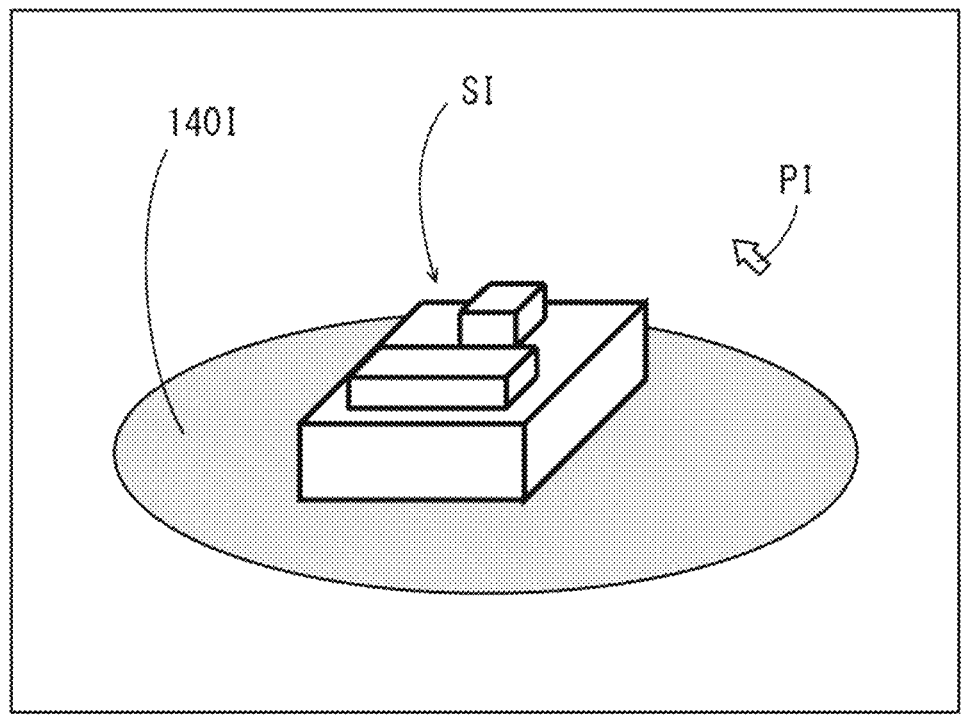
FIG. 20 is a view illustrating an example of the textured three-dimensional shape image representing only a portion corresponding to the effective region in the textured three-dimensional shape image in FIG. 19.

FIG. 20 is a view illustrating an example of the textured three-dimensional shape image representing only a portion corresponding to the effective region in the textured three-dimensional shape image in FIG. 19. For example, the user selects the obtainment of the point cloud data corresponding to the effective region as the measurement data in the state where the textured three-dimensional shape image in FIG. 19 is displayed on the display unit 400. Therefore, the CPU 210 in FIG. 1 removes the point cloud data corresponding to the ineffective region from the three-dimensional shape data corresponding to the example in FIG. 18, and uses the remaining point cloud data as the measurement data.

In the textured three-dimensional shape image of FIG. 20, the portion other than the placement surface in the image 1401 of the stage 140, the image 1601 of the installation part 161, the image TI of the table, and the image PE of the pencil are removed from the textured three-dimensional shape image in FIG. 19.

In the case where the user considers that the image 1401 of the stage 140 is also unnecessary in the textured three-dimensional shape image of FIG. 20, the user designates the unnecessary portion on the screen of the display unit 400, thereby designating the region to be removed from the region corresponding to the measurement data.

Figure 21:
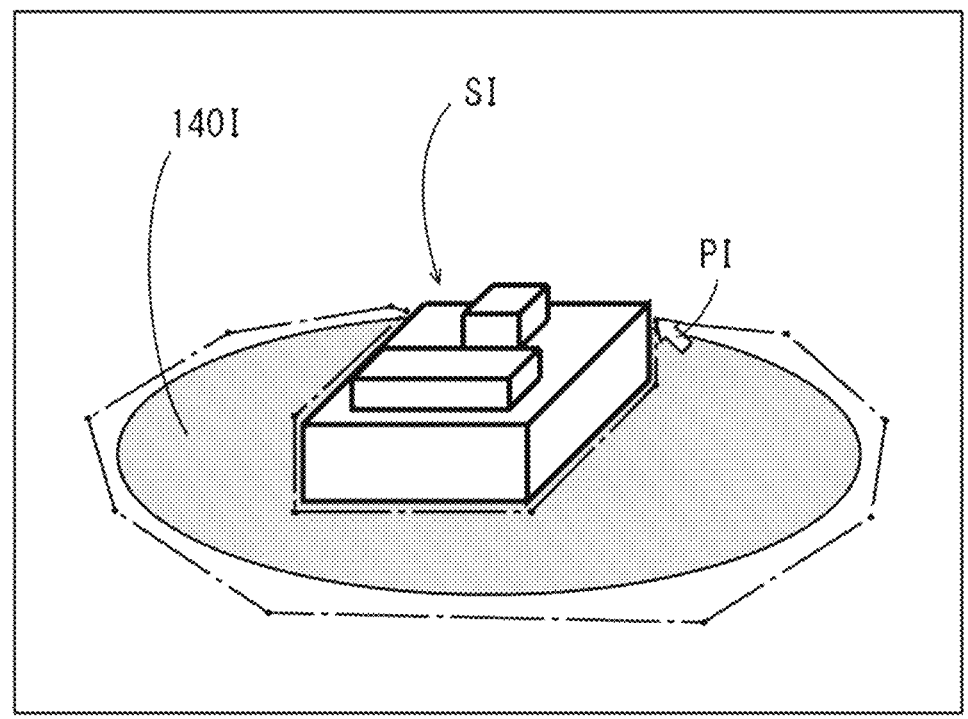
FIG. 21 is a view illustrating an example of a method for designating a region to be removed.

FIG. 21 is a view illustrating an example of a method for designating the region to be removed. As illustrated in FIG. 21, for example, in the state where the textured three-dimensional shape image including the observation object S and the placement surface of the stage 140 are displayed on the display unit 400, the user designates the plurality of portions on the textured three-dimensional shape image while moving a pointer PI displayed together with the textured three-dimensional shape image, which allows the user to designate the region to be removed. In the example of FIG. 21, the region corresponding to the portion surrounded by an alternate long and dash line by the pointer PI in the textured three-dimensional shape image is designated as the region to be removed. Therefore, the point cloud data corresponding to the designated region is removed from the three-dimensional shape data corresponding to the textured three-dimensional shape image in FIG. 21.

Figure 22:
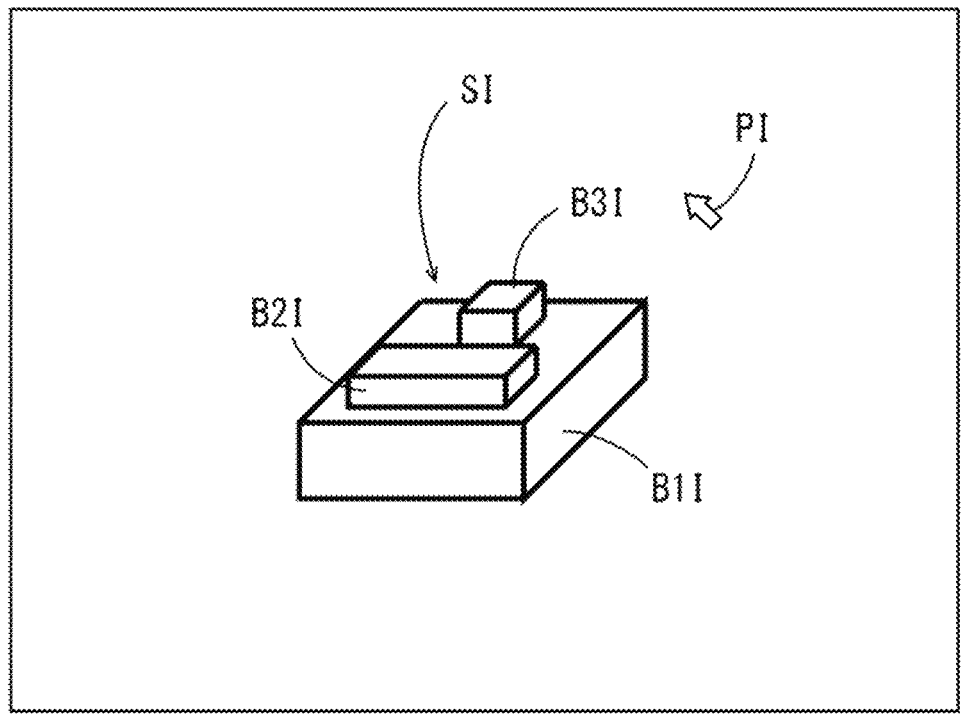
FIG. 22 is a view illustrating an example of the textured three-dimensional shape image in which a portion corresponding to the designated region is removed from the textured three-dimensional shape image in FIG. 21.

FIG. 22 is a view illustrating an example of the textured three-dimensional shape image in which the portion corresponding to the designated region is removed from the textured three-dimensional shape image in FIG. 21. The user checks the textured three-dimensional shape image displayed on the display unit 400 to determine that the region to be removed does not exist, and then sets the measurement condition. At this time, the three-dimensional shape data corresponding to the textured three-dimensional shape image displayed on the display unit 400 becomes the measurement data.

In the textured three-dimensional shape image of FIG. 22, the user can clearly distinguish the images B1I, B2I, B3I of the board B1, element B2, and element B3 from one another in the image SI of the measuring object S.

The user designates the measurement point on the textured three-dimensional shape image while roughly recognizing the shape of each portion of the measuring object S. At this time, in order to specify the measurement point, the user can designate a geometric shape (such as a point, a straight line, a circle, a surface, a sphere, a cylinder, and a cone) including the measurement point. The user can designate the measurement item with respect to the designated geometric shape. The measurement item is the type of the parameter to be measured at the measurement point designated by the user in the measuring object S, and includes a distance, a height, a diameter, an area and the like.

Figure 23:
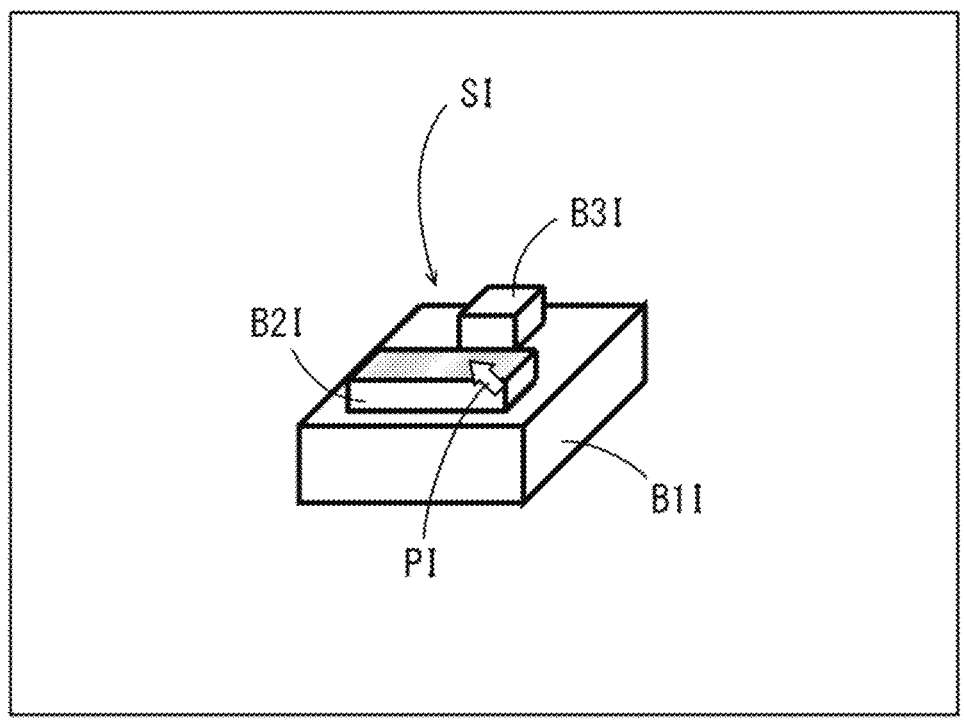
FIG. 23 is a view illustrating a setting example of a measurement condition in measuring a distance between a top surface of a board and a top surface of an element in FIG. 18.
Figure 24:
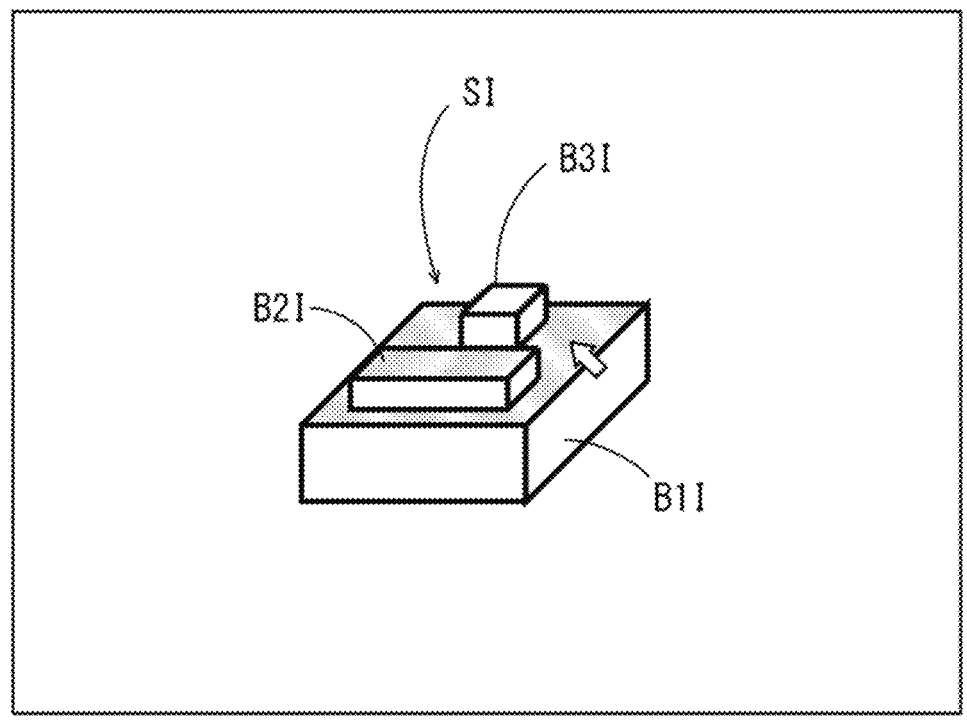
FIG. 24 is a view illustrating a setting example of the measurement condition in measuring the distance between the top surface of the board and the top surface of the element in FIG. 18.
Figure 25:
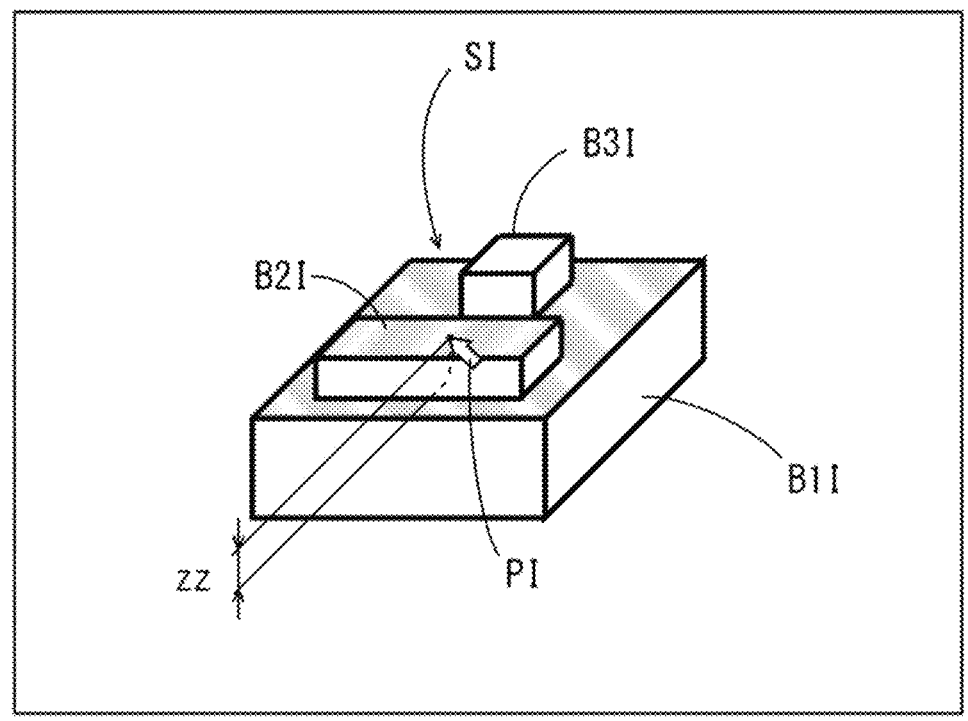
FIG. 25 is a view illustrating a setting example of the measurement condition in measuring the distance between the top surface of the board and the top surface of the element in FIG. 18.

FIGS. 23 to 25 are views illustrating a setting example of the measurement condition in measuring the distance between the top surface of the board B1 and the top surface of the element B2 in FIG. 18. For example, as illustrated in FIG. 23, the user operates the pointer PI displayed on the screen of the display unit 400 to designate the portion, in the image B2I, corresponding to the top surface of the element B2 as the measurement point. Then, as illustrated in FIG. 24, the user operates the pointer PI to designate the portion, in the image B1I, corresponding to the top surface of the board B1 as the measurement point.

Preferably, during the setting of the measurement condition, the measurement point designated by the user is displayed in a mode different from other portions. The measurement point designated by the user is hatched in the examples of FIGS. 23 and 24. Therefore, the user can easily identify the measurement point designated by the user.

Subsequently, the user designates a distance between the two measurement points (plane) designated as the measurement item. Therefore, the distance between the top surface of the board B1 and the top surface of the element B2 is calculated based on the point cloud data corresponding to the top surface of the board B1 and the point cloud data corresponding to the top surface of the element B2. As a result, as illustrated in FIG. 25, a calculation result is displayed on the textured three-dimensional shape image as a measurement result. In the example of FIG. 25, "zz (mm)" is displayed as the distance between the top surface of the board B1 and the top surface of the element B2.

Figure 26:
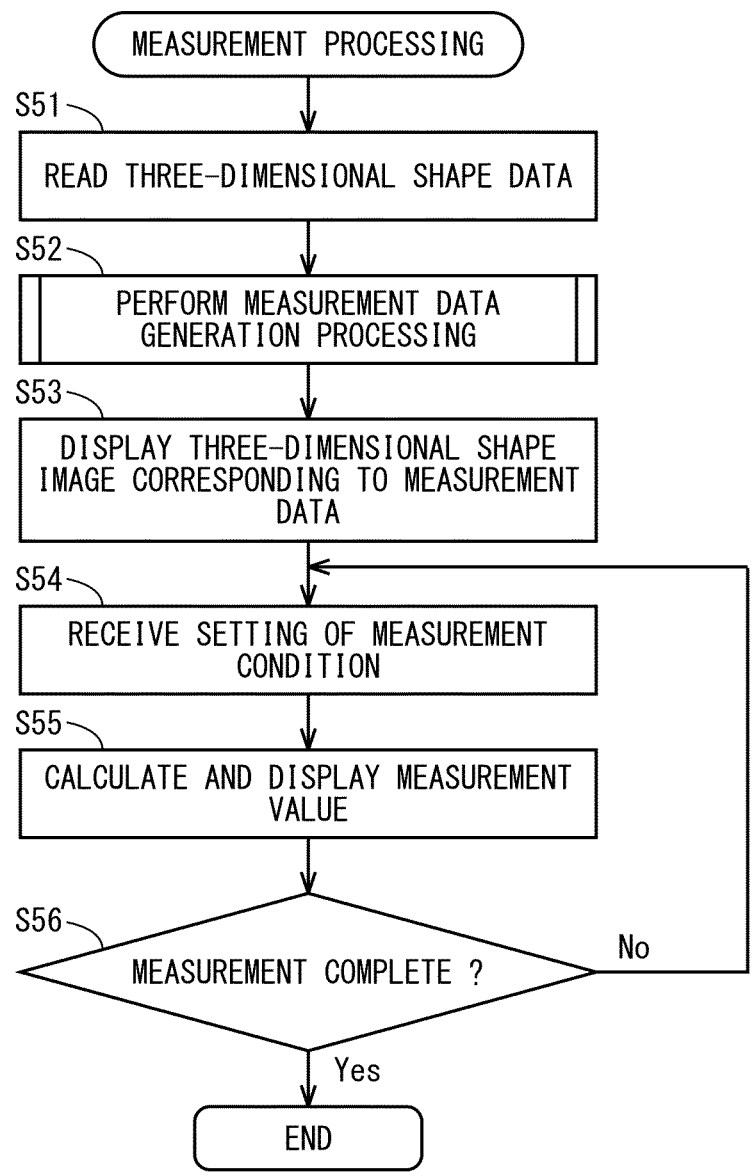
FIG. 26 is a flowchart illustrating measurement processing.

FIG. 26 is a flowchart illustrating measurement processing. The CPU 210 in FIG. 1 performs the measurement program stored in the storage device 240 in FIG. 1 in response to the instruction to start the setting of the measurement condition from the user.

The CPU 210 firstly reads the three-dimensional shape data of the measuring object S from the storage device 240 (step S51). At this time, the user may designate the desired three-dimensional shape data as a reading target from one or a plurality of pieces of three-dimensional shape data stored in the storage device 240. In this case, the CPU 210 reads the three-dimensional shape data designated by the user from the storage device 240.

The CPU 210 then performs measurement data generation processing of generating the measurement data based on the user operation of the operation unit 250 in FIG. 1 and the region information previously stored in the storage device 240 (step S52). Details of the measurement data generation processing will be described later.

The CPU 210 then displays the three-dimensional shape image of the measuring object S corresponding to the measurement data generated through the measurement data generation processing on the display unit 400 (step S53). At this time, the CPU 210 adjusts the display orientation, size, or attitude of the three-dimensional shape image of the measuring object S according to the user designation of the direction.

The CPU 210 then receives the user setting of the measurement condition (step S54). Specifically, when the user operates the operation unit 250 in FIG. 1, the CPU 210 receives the information about the measurement point and measurement item, which are designated as illustrated in FIG. 23 to FIG. 25, and stores the received information in the storage device 240 in FIG. 1.

The CPU 210 then calculates the measurement value corresponding to the set measurement condition based on the measurement data, and displays the calculated measurement value on the display unit 400 (step S55).

In the present embodiment, the user operates the operation unit 250 in FIG. 1 to be able to issue an instruction to the CPU 210 to complete the measurement. After the processing in step S54, the CPU 210 determines whether the user issues the instruction to complete the measurement (step S56). When the user does not issue the instruction to complete the measurement, the CPU 210 returns to the processing in step S54. On the other hand, when the user issues the instruction to complete the measurement, the measurement processing is ended.

After the end of the measurement processing, the CPU 210 may store one or a plurality of measurement values obtained through the previously-performed measurement processing in the storage device 240 in FIG. 1 as a data file with a predetermined format. At this time, the CPU 210 may decide a name of the data file stored in the storage device 240 in response to the user designation of a file name. In the case where a printing device is connected to the PC 200 as an external device of the measuring device 500, the CPU 210 may control the printing device to print on paper the obtained one or a plurality of measurement values in a report format.

In step S51, the CPU 210 may read the textured three-dimensional shape data of the measuring object S instead of the three-dimensional shape data of the measuring object S. In this case, the CPU 210 displays the textured three-dimensional shape image of the measuring object S corresponding to the measurement data on the display unit 400 in step S53. In the measuring device 500, the user can select the type of the data to be read during the measurement processing. In this case, one of the three-dimensional shape data and the textured three-dimensional shape data, which is selected by the user, is read in step S51.

Figure 27:
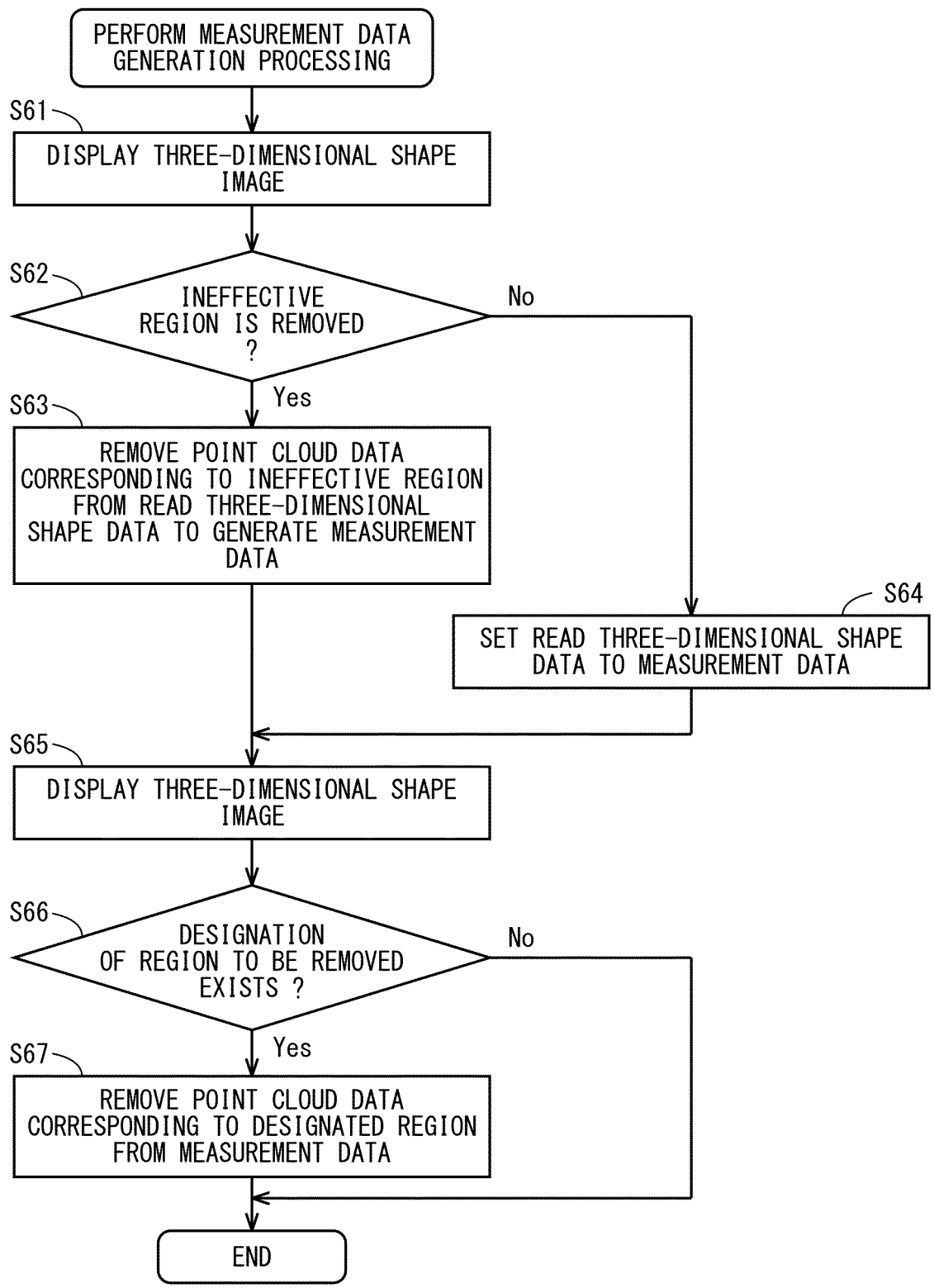
FIG. 27 is a flowchart illustrating measurement data generation processing.

Details of the measurement data generation processing will be described below. FIG. 27 is a flowchart illustrating the measurement data generation processing performed in step S52 of FIG. 26. As illustrated in FIG. 27, the CPU 210 displays the three-dimensional shape image on the display unit 400 based on the three-dimensional shape data read in step S51 of FIG. 26 (step S61).

Then, based on the user operation of the operation unit 250, the CPU 210 determines whether the obtainment of the point cloud data corresponding to the effective region from the three-dimensional shape data generated through the data generation processing or the obtainment of the point cloud data corresponding to the effective region and the point cloud data corresponding to the ineffective region as the measurement data has been selected (step S62). That is, the CPU 210 determines whether the point cloud data corresponding to the ineffective region should be removed from the three-dimensional shape data.

Upon receiving the selection (the selection to remove the ineffective region) to obtain the point cloud data corresponding to the effective region as the measurement data, the CPU 210 generates the measurement data corresponding to the effective region by removing the point cloud data corresponding to the ineffective region from the three-dimensional shape data read in step S51 of FIG. 26, based on the region information previously stored in the storage device 240 in FIG. 1 (step S63).

On the other hand, upon receiving the selection (the selection that does not remove the ineffective region) to obtain the point cloud data corresponding to the effective region and the point cloud data corresponding to the ineffective region as the measurement data, the CPU 210 sets the three-dimensional shape data read in step S51 of FIG. 26 to the measurement data (step S64). This measurement data corresponds to the effective region and the ineffective region.

Subsequently, the CPU 210 displays the three-dimensional shape image corresponding to the measurement data obtained through the processing in step S63 or S64 on the display unit 400 (step S65).

The CPU 210 then determines whether the designation of the region to be removed is received based on the user operation of the operation unit 250 in FIG. 1 (step S66). At this time, as illustrated in the example of FIG. 21, by operating the operation unit 250 in FIG. 1, the user can designate the portion corresponding to the region to be removed while moving the pointer PI on the three-dimensional shape image displayed on the display unit 400.

When the region to be removed is not designated (for example, when the user does not designate the region to be removed for at least a given period), the CPU 210 ends the measurement data generation processing, and proceeds to the processing in step S53 of FIG. 26. On the other hand, when the region to be removed is designated, the CPU 210 removes the point cloud data corresponding to the designated region from the measurement data obtained through the processing in step S63 or S64 (step S67), ends the measurement data generation processing, and proceeds to the processing in step S53 of FIG. 26.

In the case where the textured three-dimensional shape data is read in step S51 of FIG. 26, the CPU 210 displays the textured three-dimensional shape image on the display unit 400 in steps S61 and S65.

In the measurement data generation processing according to the present embodiment, the pieces of processing in steps S62 and S64 may be omitted. In this case, in the measurement data generation processing, the positional data corresponding to the ineffective region is automatically removed from the three-dimensional shape data generated through the data generation processing in FIG. 17, and the measurement data is generated.

In the measurement data generation processing, the pieces of processing in steps S65 to S67 may be omitted. In this case, a generation error of the measurement data due to erroneous operation is prevented because the point cloud data is not removed based on the user designation.

In the measurement processing, the measurement data obtaining unit 502 in FIG. 3 mainly performs the pieces of processing in steps S61 and S63 to S65 of the measurement data generation processing, and the measurement data correcting unit 503 in FIG. 3 mainly performs the processing in step S67 of the measurement data generation processing. The receiving unit 505 in FIG. 3 mainly performs the pieces of processing in steps S62 to S66 of the measurement data generation processing, and the measurement unit 504 in FIG. 3 mainly performs the pieces of processing in steps S51 and S53 to S56.

(6) First Function Usable During Setting of Measurement Condition

As described above, during the setting of the measurement condition, the user designates the direction in which the measuring object S is viewed, which allows the user to easily change the orientation of the measuring object S on the three-dimensional shape image displayed on the display unit 400.

A display mode suitable for the setting exists depending on a setting content of the measurement condition. For example, in the case where the distance between the two straight lines is measured in any plane of the measuring object S, preferably, the three-dimensional shape image of the measuring object S is displayed such that the plane is viewed in the direction orthogonal to the plane. Therefore, the user can easily and accurately designate the two straight lines on the plane. The measuring device 500 according to the present embodiment has a first function usable during the setting of the measurement condition.

The first function is a function of, during the setting of the measurement condition, causing the user to designate any surface of the measuring object S, and of adjusting and fixing the orientation of the measuring object S on the three-dimensional shape image such that the reference surface that is the designated surface is viewed in the direction orthogonal to the reference surface.

Figure 28:
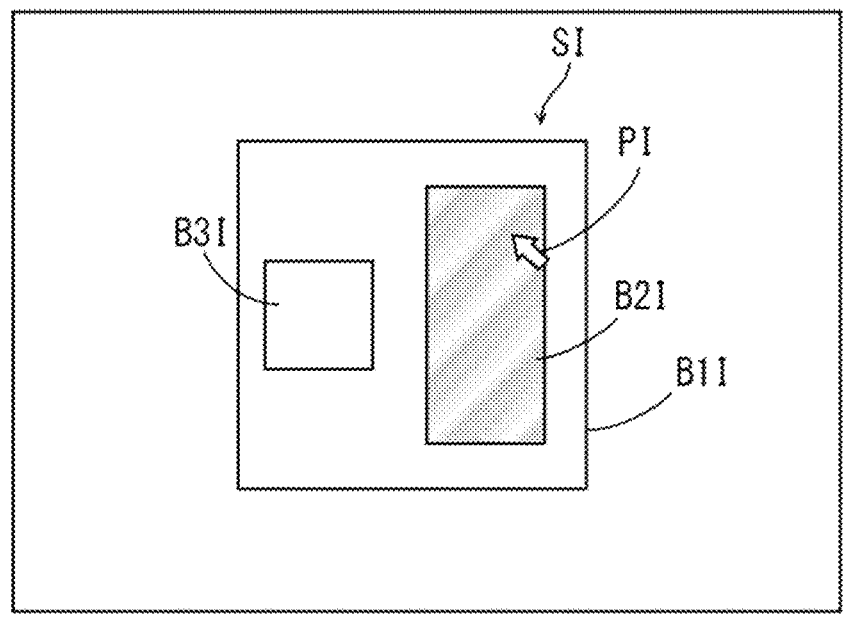
FIG. 28 is a view illustrating a setting example of the measurement condition that uses a first function.
Figure 29:
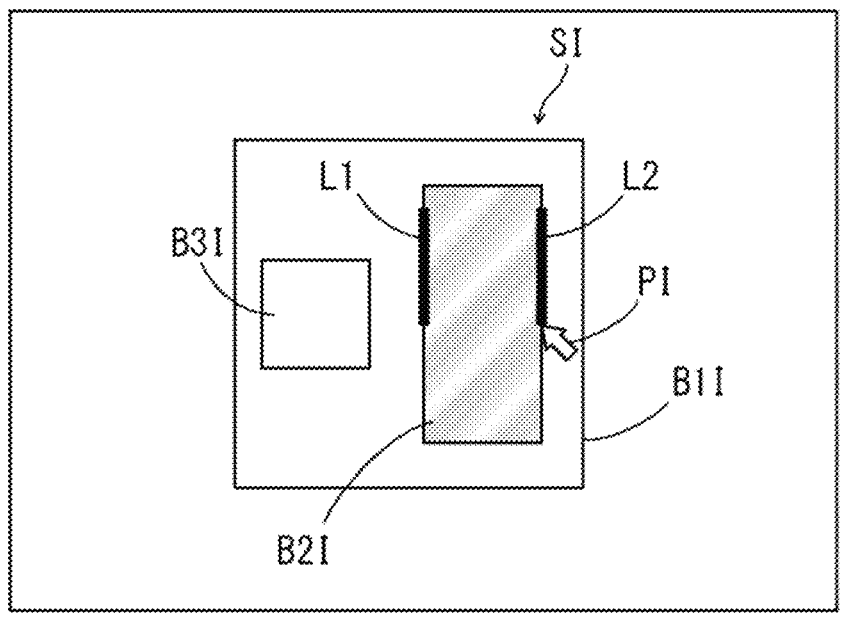
FIG. 29 is a view illustrating a setting example of the measurement condition that uses the first function.
Figure 30:
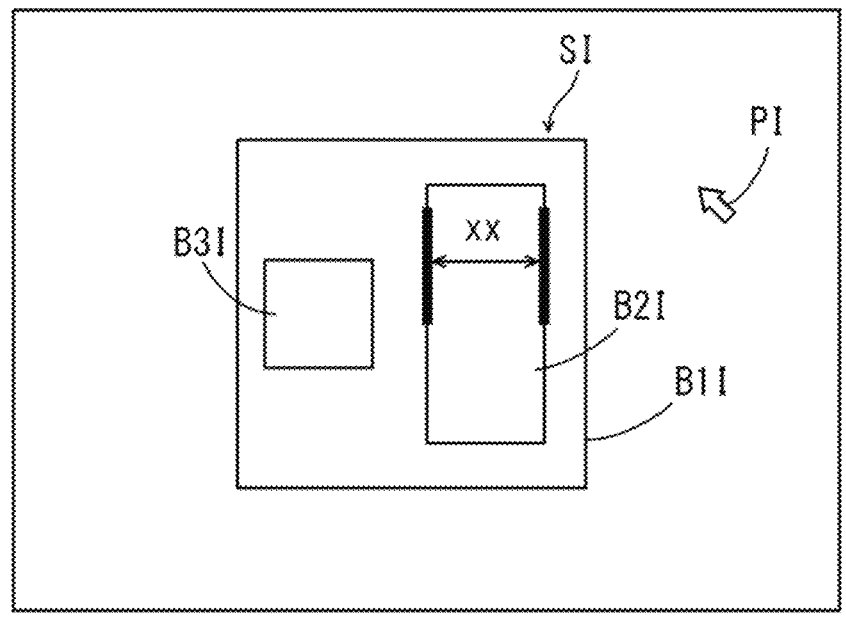
FIG. 30 is a view illustrating a setting example of the measurement condition that uses the first function.

FIGS. 28 to 30 are views illustrating a setting example of the measurement condition that uses the first function. For example, as illustrated in FIG. 23, it is considered that the user designates the top surface of the element B2 of the measuring object S in FIG. 18. In this state, the user can issue an instruction to use the first function with the designated surface as a reference surface by operating the operation unit 250 in FIG. 1.

In this case, as illustrated in FIG. 28, the orientation of the measuring object S on the three-dimensional shape image is adjusted and fixed such that the designated reference surface is viewed in the direction orthogonal to the reference surface. Thus, the planar image is displayed, in which the measuring object S is viewed in the direction orthogonal to the reference surface. Hereinafter, the planar three-dimensional shape image, which is fixed while the measuring object S is viewed in the direction orthogonal to the reference surface, is referred to as a reference surface image.

Then, as illustrated in FIG. 29 for example, the user designates two sides parallel to each other in the element B2 as the measurement point on the designated reference surface, and designates the distance between two lines of the two sides as the measurement item. At this time, in the element B2, images L1, L2 of the two sides designated by the user are highlighted compared with other portions. The measurement value corresponding to the measurement condition designated based on the measurement data is calculated by the setting of the measurement condition. The calculated measurement value is displayed on the reference surface image as illustrated in FIG. 30. In the example of FIG. 30, "xx (mm)" is displayed as the distance between the two sides of the element B2 in FIG. 18.

As described above, according to the first function, the use of the reference surface image allows the user to intuitively set the measurement condition without being conscious of the three-dimensional shape of the measuring object S.

Figure 31:
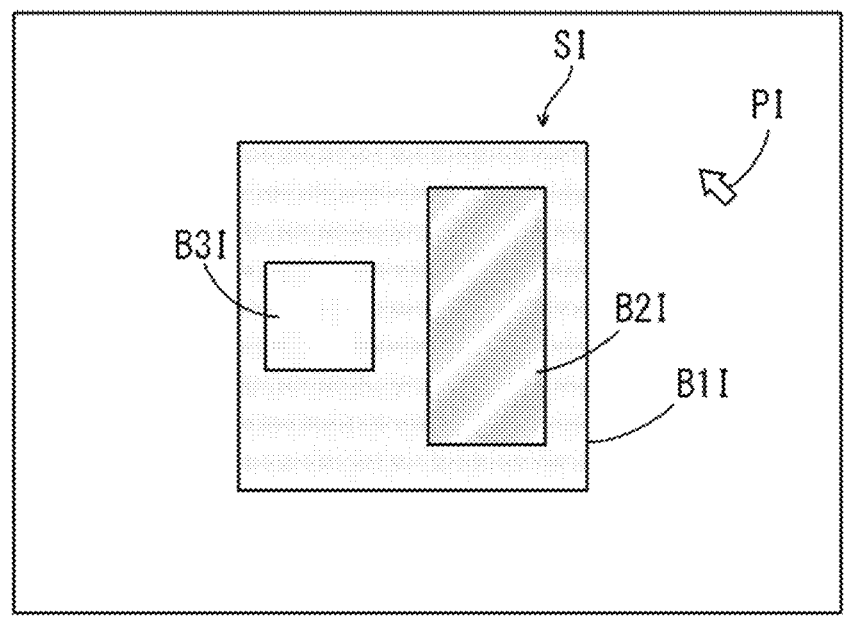
FIG. 31 is a view illustrating another display example of a reference surface image.

The reference surface image may be displayed as follows. FIG. 31 is a view illustrating another display example of the reference surface image. In the reference surface image of FIG. 31, the portion of the measuring object S other than the reference surface is colored according to a height difference relative to the reference surface. As used herein, the height means the distance from the reference surface in the direction orthogonal to the reference surface. In FIG. 31, a color difference is represented by a difference of a dot pattern. In this case, the user can easily recognize a difference in height between the reference surface and other portions. As described above, the reference surface image serves as the height image in which the three-dimensional shape data or the textured three-dimensional shape data is represented by the height from a predetermined reference surface.

(7) Second Function Usable During Setting of Measurement Condition

As described above, the display mode suitable for the setting exists depending on the setting content of the measurement condition. For example, in the case where an angle between two surfaces intersecting each other is measured in the measuring object S, preferably, an image (hereinafter, referred to as a profile image) representing a profile (sectional shape) of the measuring object S is displayed. In this case, the two straight lines included in each of the two target surfaces can easily and accurately be designated on the profile image. The measuring device 500 according to the present embodiment has the second function usable during the setting of the measurement condition.

The second function is a function of, during the setting of the measurement condition, causing the user to designate any section in the measuring object S, and of displaying the profile image of the designated section.

Figure 32:
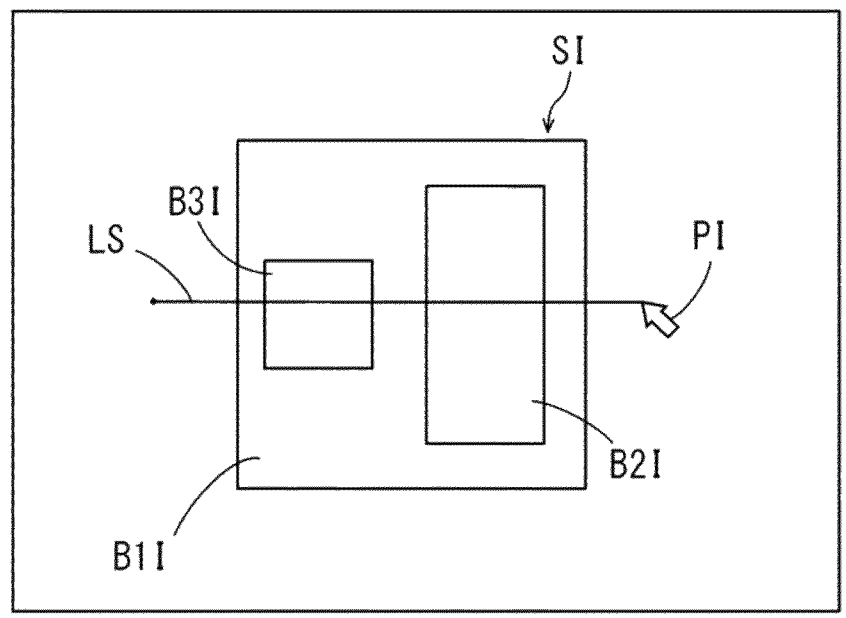
FIG. 32 is a view illustrating a setting example of the measurement condition that uses a second function.
Figure 33:
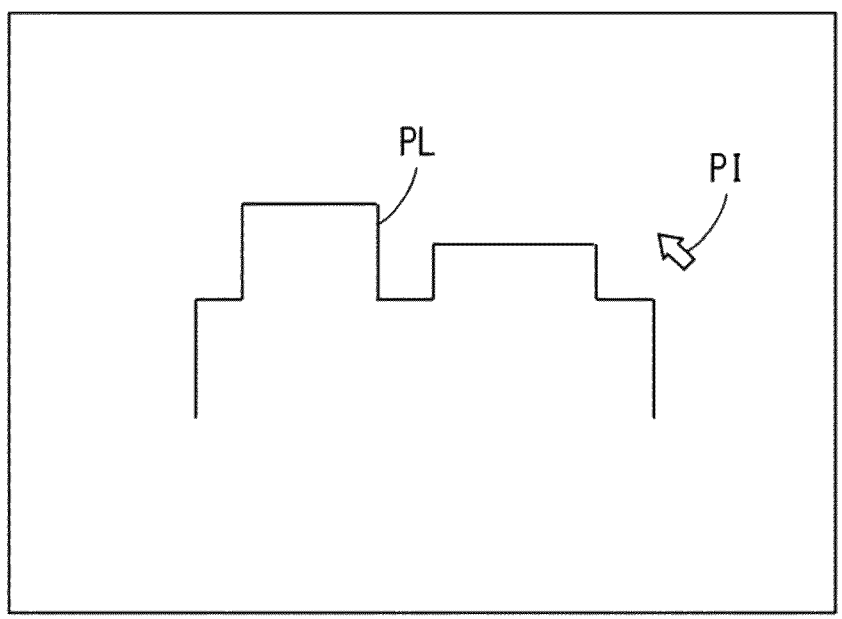
FIG. 33 is a view illustrating a setting example of the measurement condition that uses the second function.
Figure 34:
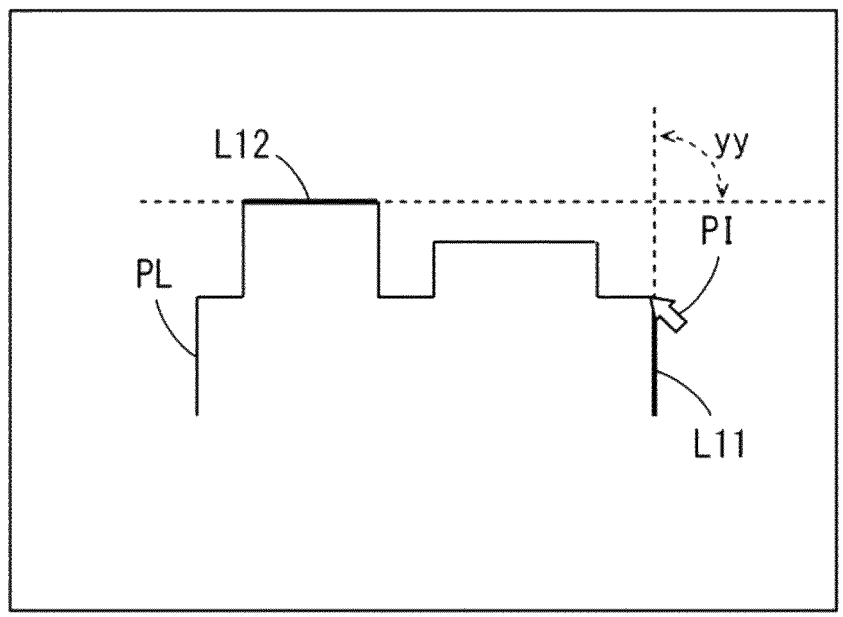
FIG. 34 is a view illustrating a setting example of the measurement condition that uses the second function.

FIGS. 32 to 34 are views illustrating a setting example of the measurement condition that uses the second function. For example, the user can issue an instruction to use the second function by operating the operation unit 250 in FIG. 1. In this case, the designation of the sectional position where the profile image is to be displayed is received. In this example, as illustrated in FIG. 32, the sectional position of the measuring object S in which the profile image is to be displayed is designated by a line segment LS on the reference surface image displayed by the first function.

In this case, based on the measurement data, profile data representing the profile of the measuring object S is generated on the surface, which passes through the line segment LS and is orthogonal to the reference surface. The profile image in FIG. 33 is displayed based on the generated profile data. The profile image includes a profile line PL representing the profile of the measuring object S. At this time, the reference surface image in FIG. 32 may be displayed on the screen of the display unit 400 together with the profile image.

Then, as illustrated in FIG. 34 for example, the user designates the angle between the straight line corresponding to the top surface of the element B2 in FIG. 18 and the straight line corresponding to one end face of the board B1 in FIG. 18 as the measurement item on the displayed profile line PL. At this time, images L11, L12 representing the top surface of the element B2 and one end face of the board B1, which are designated by the user, are highlighted compared with other portions as illustrated in FIG. 34. The measurement value corresponding to the measurement condition designated based on the measurement data is calculated by the setting of the measurement condition. The calculated measurement value is displayed on the profile image. In the example of FIG. 34, "yy (degree)" is displayed as the angle between the top surface of the element B2 and one end face of the board B1.

As described above, according to the second function, the use of the profile image improves convenience in setting of the measurement condition.

[5] Calibration

The user can detach the head unit 190 from the stand 162 by grasping the grips 179 provided on both the sides of the mount 170 of the head unit 190 in FIG. 4. In this case, the head unit 190 is attached to a support body different from the stand 162 or placed on an installation surface. Therefore, the shape of the measuring object S that cannot be placed on the stage 140 can be measured.

However, in the case where the head unit 190 detached once is attached to the stand 162 again, the head unit 190 is not always attached to the same position as that before the head unit 190 is detached. In this case, there is a possibility that displacement occurs in the positional relationship between the head unit 190 and the rotation axis Ax of the stage 140 before and after the attachment and detachment of the head unit 190.

As described above, the device parameter previously stored in the storage device 240 of FIG. 1 is used to generate the three-dimensional shape data. When the device parameter stored in the storage device 240 differs from the actual positional relationship between the head unit 190 and the stage 140, the plurality of pieces of three-dimensional shape data, which are generated while the stage 140 is rotated, cannot accurately be synthesized in the data generation processing.

Because the effective regions MR1, MR2 are set based on the positions of the light receiving units 120A, 120B of the head unit 190, when the above positional displacement occurs every time the head unit 190 is attached and detached, a positional displacement also occurs between the effective regions MR1, MR2 and the stage 140.

For this reason, it is necessary to calibrate the device parameter when the head unit 190 is attached to the stand 162 again after the head unit 190 is detached from the stand 162.

In the present embodiment, the rotation axis calibration processing is performed in order to calibrate the device parameter. For example, the rotation axis calibration processing is performed based on the user instruction when the head unit 190 is attached to the stand 162 again after the head unit 190 is detached from the stand 162.

Figure 35:
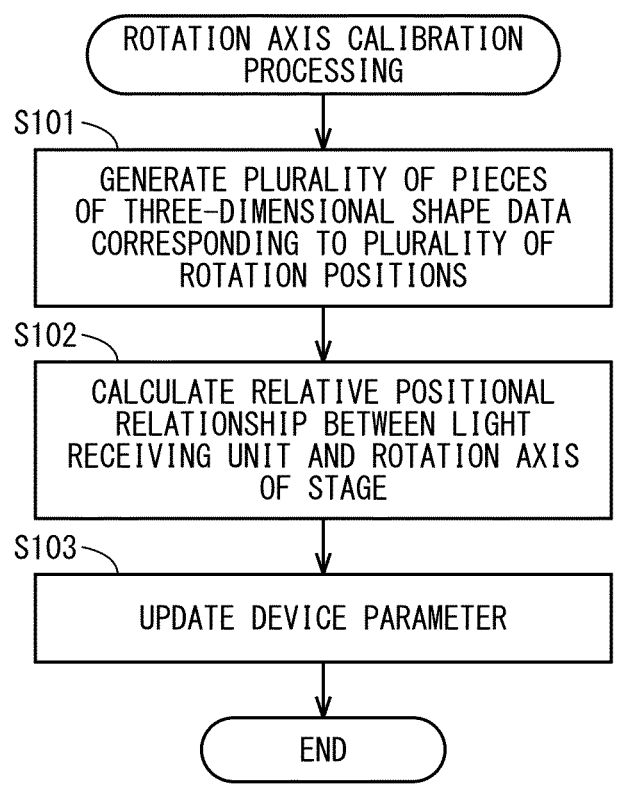
FIG. 35 is a flowchart illustrating an example of rotation axis calibration processing.

FIG. 35 is a flowchart illustrating an example of the rotation axis calibration processing. The CPU 210 in FIG. 1 performs the rotation axis calibration processing stored in the storage device 240 in FIG. 1 in response to the instruction to start the rotation axis calibration processing from the user.

Before the rotation axis calibration processing is performed, the user previously disposes a flat-plate calibration board on the stage 140 such that the calibration board is inclined with respect to the placement surface of the stage 140. A calibration index is provided in the calibration board. The index may be formed by engraving, or marking using paint.

In response to the instruction to start the rotation axis calibration processing, the CPU 210 firstly generates a plurality of pieces of three-dimensional shape data corresponding to a plurality of (for example, three) predetermined rotation positions of the stage 140 (step S101). Specifically, when the stage 140 is rotated in a stepwise manner, the rotation position of the stage 140 is changed to a plurality of predetermined angle positions in the stepwise manner. When the stage 140 is located at each rotation position, the light projecting unit 110 irradiates the calibration board with the measurement light, and the light receiving unit 120 obtains the pattern image data. The three-dimensional shape data is generated based on each pattern image data. Therefore, the plurality of pieces of three-dimensional shape data corresponding to the plurality of rotation positions are generated.

Then, the CPU 210 calculates a relative positional relationship between the light receiving units 120A, 120B and the rotation axis Ax of the stage 140 in the device coordinate system based on the plurality of predetermined rotation positions and the point cloud data corresponding to the calibration index in the plurality of pieces of three-dimensional shape data (step S102). The CPU 210 then updates the device parameter stored in the storage device 240 based on the calculated positional relationship (step S103). Therefore, the rotation axis calibration processing is ended.

The relative positional relationship between the light receiving units 120A, 120B and the rotation axis Ax of the stage 140 is accurately calculated through the rotation axis calibration processing. Therefore, the plurality of pieces of three-dimensional shape data generated through the data generation processing can accurately be synthesized based on the device parameter including the calculated positional relationship. Additionally, the effective regions MR1, MR2 are prevented from being displaced from the position to be located on the stage 140. As a result, the degradation of the measurement accuracy of the observation object S is suppressed. In the rotation axis calibration processing, the positional relationship calculating unit 507 in FIG. 3 mainly performs the processing in step S102.

The shape of the calibration board is known, and the position of the calibration index in the calibration board is also known. In the case where the plurality of pieces of three-dimensional shape data are generated at the plurality of rotation positions through the rotation axis calibration processing, the calibration can be performed in order to secure the accuracy of the generated three-dimensional shape data based on the pieces of three-dimensional shape data, the shape of the calibration board, and the position of the calibration index. That is, the three-dimensional shape data generation processing can be calibrated such that the shape of the calibration board is more accurately reproduced from the obtained plurality of pieces of three-dimensional shape data. The accuracy of the generated three-dimensional shape data is secured by the calibration even if the positional relationship between the light projecting unit 110 and the light receiving unit 120 is displaced in the head unit 190. Thus, in the rotation axis calibration processing according to the present embodiment, the relative positional relationship between the light receiving units 120A, 120B and the rotation axis Ax of the stage 140 can accurately be calculated, and at the same time, the three-dimensional shape data generation processing can be calibrated.

[6] Light Shielding Member Attachable to Light Shielding Mechanism

Figure 36:
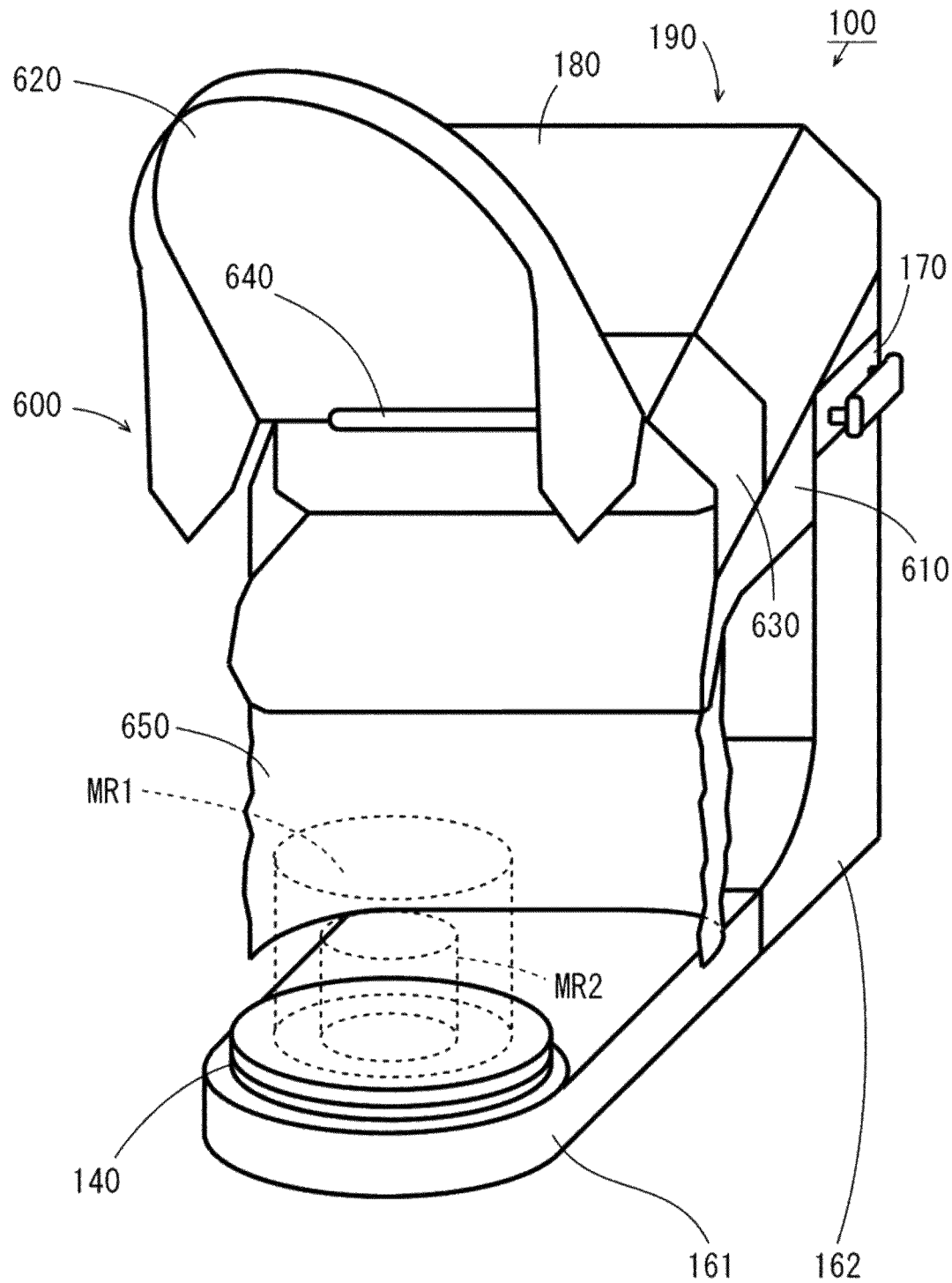
FIG. 36 is a perspective view of an appearance of the measuring unit, illustrating an example of a rear light shielding member attached to a rear cover member.

The following light shielding member may be attached to the light shielding mechanism 600 in order to further block the ambient light from the rear of the space on the stage 140. FIG. 36 is a perspective view of the measuring unit 100 illustrating an example of the rear light shielding member attached to the rear cover member 610. In the example of FIG. 36, the front cover member 620 is in the open state. As illustrated in FIG. 36, a rear light shielding member 650 is attached to the rear cover member 610 so as to extend from the whole lower end of the rear cover member 610 to the top surface of the installation part 161.

Figure 37:
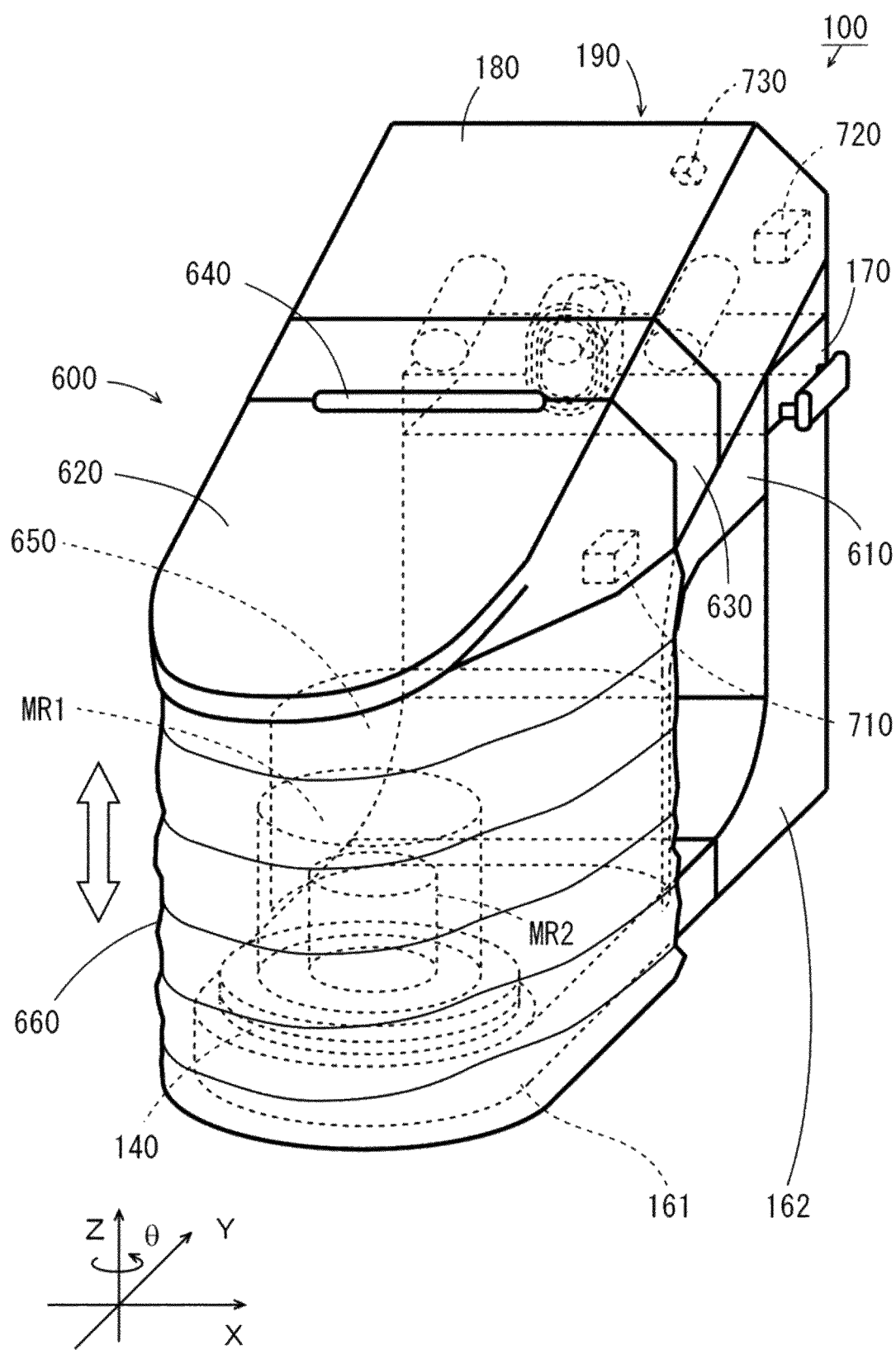
FIG. 37 is a perspective view of an appearance of the measuring unit, illustrating an example of a front and side light shielding member attached to a front cover member.

Further, the following light shielding member may be attached to the light shielding mechanism 600 in order to block the ambient light from the front, the right, and the left of the space on the stage 140. FIG. 37 is a perspective view of the measuring unit 100 illustrating an example of the front and side light shielding member attached to the front cover member 620. In the example of FIG. 37, the front cover member 620 is in the closed state. In the example of FIG. 37, the rear light shielding member 650 in FIG. 36 is attached to the rear cover member 610. As illustrated in FIG. 37, a front and side light shielding member 660 is attached to the front cover member 620 so as to extend downward from an outer edge at the lower end of the front cover member 620 having a substantially U-shape to a periphery of the installation part 161.

As illustrated in FIG. 37, the rear light shielding member 650 and the front and side light shielding member 660 are attached to the light shielding mechanism 600, whereby an entire circumference of the space on the stage 140 is surrounded by the rear light shielding member 650 and the front and side light shielding member 660. Therefore, the rear light shielding member 650 and the front and side light shielding member 660 block the ambient light from all sides including the front, the rear, the right, and the left of the space on the stage 140. Accordingly, the noise component caused by the ambient light is further reduced because the ambient light incident on the light receiving units 120A, 120B is further reduced.

As a result, the degradation of the accuracy of the point cloud data is further suppressed.

The rear light shielding member 650 and the front and side light shielding member 660 may be made of resin or metal, or may be made of cloth or rubber. Preferably, the rear light shielding member 650 and the front and side light shielding member 660 are made of a flexible, soft material such as cloth and rubber. In this case, for example, the measuring object S is not damaged even if a part of the measuring object S on the stage 140 makes contact with the rear light shielding member 650 or the front and side light shielding member 660 during the rotation of the stage 140. Furthermore, the rear light shielding member 650 and the front and side light shielding member 660 can be compactly folded with the rear light shielding member 650 and the front and side light shielding member 660 detached from the rear cover member 610 and the front cover member 620.

The front and side light shielding member 660 in FIG. 37 includes nylon cloth and a plurality of metallic frame members, and is formed into a bellows shape expandable and contractible in the vertical direction. In this case, the user can vertically expand and contract the front and side light shielding member 660 as indicated by an outline arrow in FIG. 37. Accordingly, the user can easily perform the operation to place the measuring object S on the stage 140 from the outside of the space on the stage 140 and the operation to take out the measuring object S on the stage 140 to the outside of the space on the stage 140.

In the configuration of FIG. 37, the rear cover member 610, the front cover member 620, the rear light shielding member 650, and the front and side light shielding member 660 block the ambient light from above the space on the stage 140 and the ambient light from all sides of the space on the stage 140. Therefore, the ambient light does not substantially enter the space on the stage 140 when the rear cover member 610, the front cover member 620, the rear light shielding member 650, and the front and side light shielding member 660 are accurately attached.

As illustrated in FIG. 37, for example, a speaker 720 and an alarm lamp 730 may be provided in the head unit 190 while an ambient light determination device 710 is provided in the light shielding mechanism 600. In this case, the ambient light determination device 710 determines whether the ambient light has entered the space on the stage 140. The speaker 720 outputs an alarm sound in response to the determination by the ambient light determination device 710 that the ambient light has entered the space on the stage 140. The alarm lamp 730 emits light in response to the determination by the ambient light determination device 710 that the ambient light has entered the space on the stage 140. This enables the user to easily recognize the light shielding state of the ambient light blocked by the light shielding mechanism 600, the rear light shielding member 650, and the front and side light shielding member 660.

The ambient light determination device 710 may include an optical sensor. In this case, the ambient light determination device 710 determines that the ambient light has entered the space on the stage 140 when a light amount detected by the optical sensor exceeds a predetermined threshold while the stage 140 is irradiated with neither the illumination light nor the measurement light, and the ambient light determination device 710 determines that the ambient light has not entered the space on the stage 140 when the detected light amount is less than or equal to the threshold. Alternatively, the light shielding state detection device 710 may include a magnetic sensor that magnetically detects an open or closed state of the front cover member 620. In this case, the ambient light determination device 710 determines that the ambient light has entered the space on the stage 140 when the magnetic sensor detects that the front cover member 620 is in the open state, and the ambient light determination device 710 determines that the ambient light has not entered the space on the stage 140 when the magnetic sensor detects that the front cover member 620 is in the closed state.

In this example, the speaker 720 and the alarm lamp 730 are provided in the head unit 190. Alternatively, the speaker 720 and the alarm lamp 730 may be provided away from the measuring unit 100.

Figure 38:
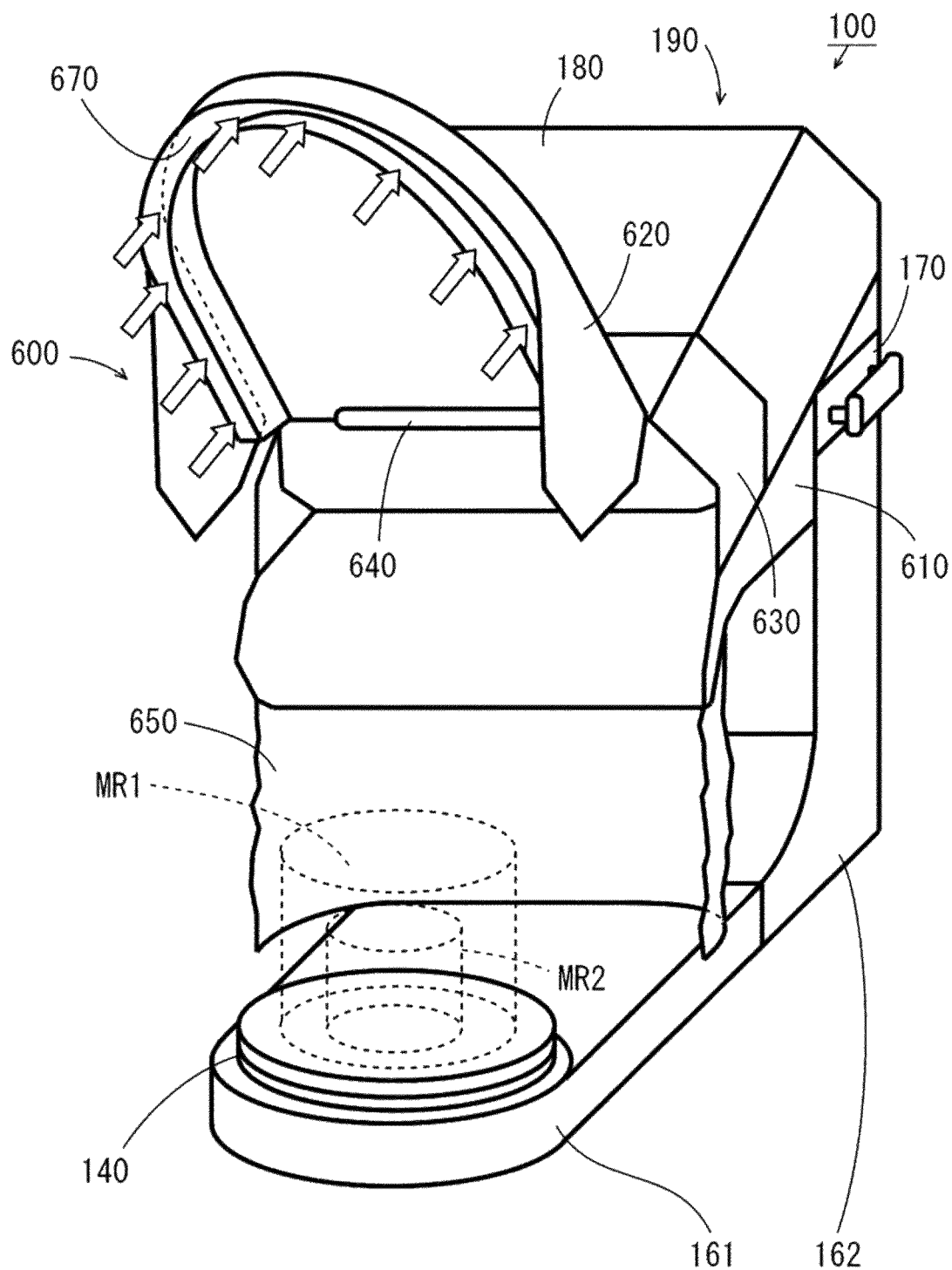
FIG. 38 is a perspective view of an appearance of the measuring unit, illustrating an example of an accommodation part for the front and side light shielding member in FIG. 37.

The accommodation part that accommodates the front and side light shielding member 660 may be provided in the front cover member 620 of the light shielding mechanism 600. FIG. 38 is a perspective view of the measuring unit 100 illustrating an example of the accommodation part for the front and side light shielding member 660 in FIG. 37.

In the example of FIG. 38, a groove-like accommodation part 670 having a given width is provided along an outer edge of the front cover member 620 having a substantial U-shape in the bottom surface of the front cover member 620. For example, the vertically-reduced front and side light shielding member 660 in FIG. 37 is accommodated in the accommodation part 670. The user accommodates the front and side light shielding member 660 in the accommodation part 670 and takes the front and side light shielding member 660 out from the accommodation part 670 as necessary, which allows the user to easily handle the front and side light shielding member 660.

Figure 39:
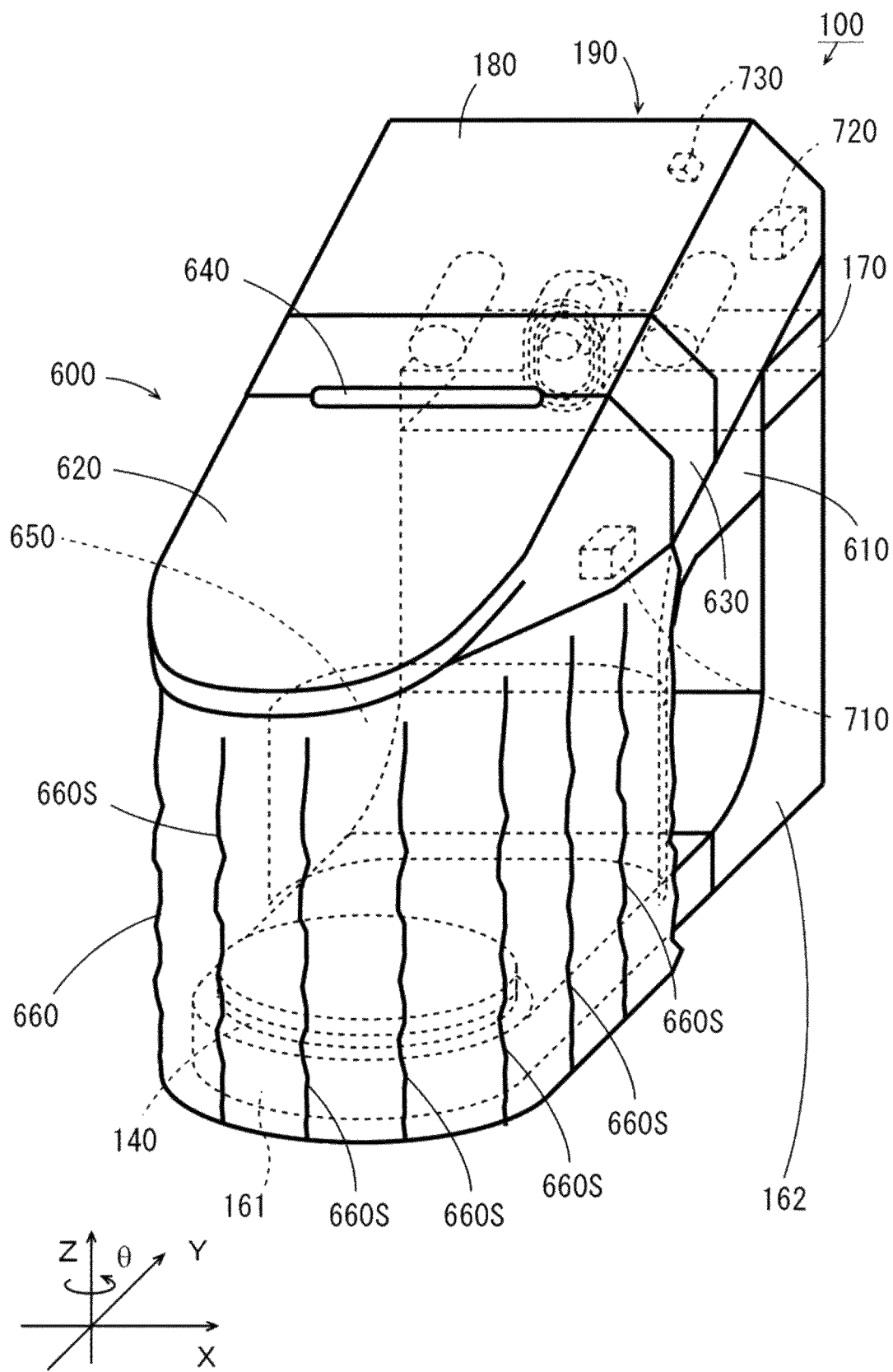
FIG. 39 is a perspective view of an appearance of the measuring unit illustrating another configuration example of the front and side light shielding member.

FIG. 39 is a perspective view of the measuring unit 100 illustrating another configuration example of the front and side light shielding member 660. In the example of FIG. 39, the front and side light shielding member 660 is not formed into the bellows shape unlike the example of FIG. 37. The front and side light shielding member 660 in FIG. 39 is formed into a curtain shape using a flexible, soft material such as cloth and rubber. In this example, a plurality of slits 660S extending vertically are formed in the front and side light shielding member 660.

In the front and side light shielding member 660 of FIG. 39, by turning over the slit 660S of the front and side light shielding member 660, the user can easily perform the operation to place the measuring object S on the stage 140 from the outside of the space on the stage 140 and the operation to take out the measuring object S on the stage 140 to the outside of the space on the stage 140.

In the configurations of FIGS. 36 to 39, preferably, the rear light shielding member 650 and the front and side light shielding member 660 are configured in the light absorbing color (for example, black) in order to suppress the generation of the ambient light caused by the measurement light output from the head unit 190. This enables the reduction of the noise component caused by the measurement light reflected or scattered by the rear light shielding member 650 and the front and side light shielding member 660.

[7] Stage Plate

Figure 40A:
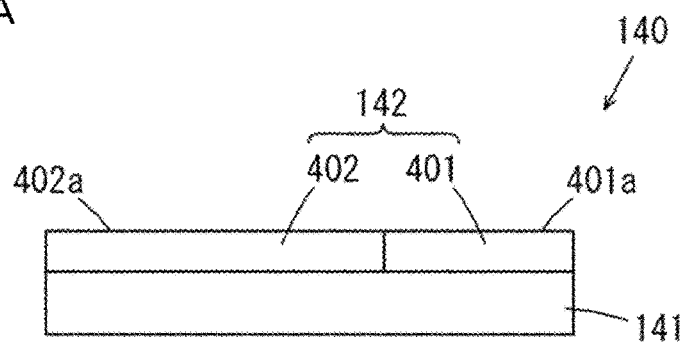
FIGS. 40A and 40B are views illustrating a configuration example of a stage plate.
Figure 40B:
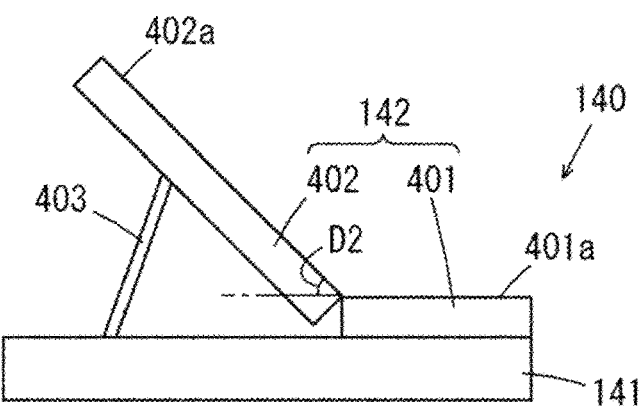

The stage plate 142 in FIG. 2 may have the following configuration. FIGS. 40A and 40B are views illustrating a configuration example of the stage plate 142. Referring to FIGS. 40A and 40B, the stage plate 142 includes a fixed part 401 and an inclination part 402. The fixed part 401 includes a flat fixed placement surface 401a, and the inclination part 402 includes a flat inclination placement surface 402a.

The fixed part 401 is fixed to the stage base 141, and the fixed placement surface 401a is kept horizontal. On the other hand, the inclination part 402 can be switched between a horizontal attitude in which the inclination placement surface 402a is kept horizontal and an inclination attitude in which the inclination placement surface 402a is inclined with respect to the fixed placement surface 401a. The inclination part 402 is in the horizontal attitude in FIG. 40A, and the inclination part 402 is in the inclination attitude in FIG. 40B. When the inclination part 402 is in the inclination attitude, the bottom surface of the inclination part 402 is supported by a support member 403.

An inclination angle (an inclination angle of the inclination placement surface 402a with respect to the horizontal surface) D2 of the inclination placement surface 402a may be set to an angle, at which the inclination placement surface 402a is orthogonal to the optical axes A1, A2 of the light receiving units 120A, 120B, or may be set to another angle, or may be set so as to be changeable to a plurality of angles.

Figure 41:
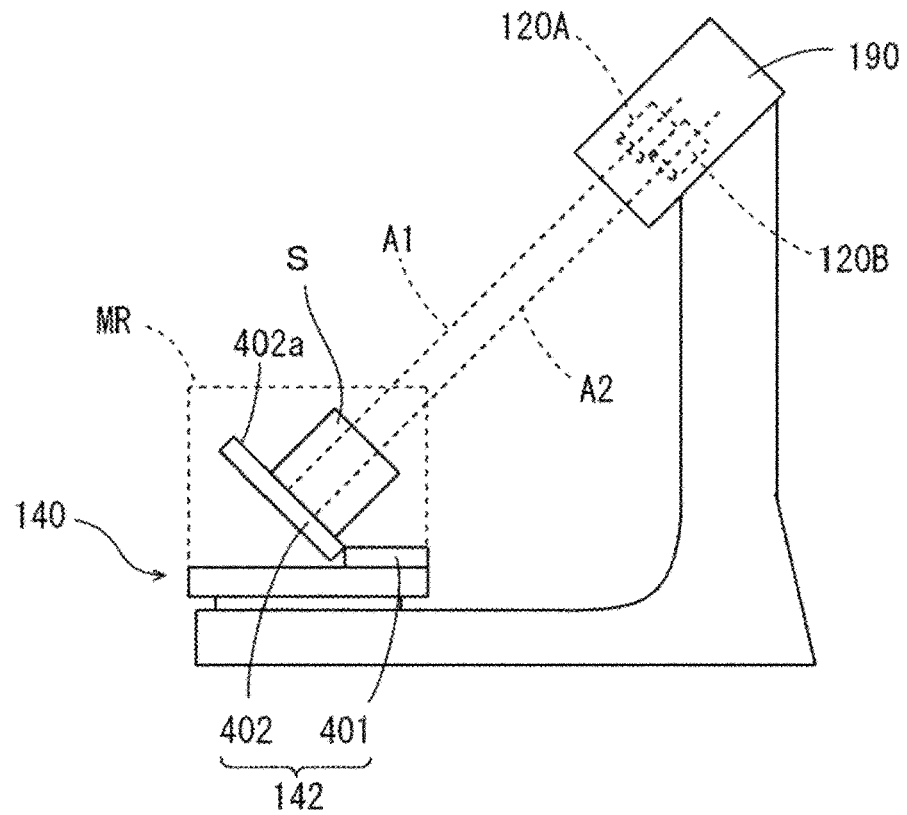
FIG. 41 is a schematic side view of the measuring unit illustrating an example in which the measuring unit captures the image of the measuring object while an inclination part is in an inclination attitude.

FIG. 41 is a schematic side view of the measuring unit 100 illustrating an example in which the image of the measuring object S is captured while the inclination part 402 is in the inclination attitude. In this example, it is assumed that the inclination angle D2 (see FIG. 40B) of the inclination placement surface 402a is set such that the inclination placement surface 402a is orthogonal to the optical axes A1, A2 of the light receiving units 120A, 120B. For example, the measuring object S having the top surface and bottom surface, which are parallel to each other, is placed on the inclination placement surface 402a such that the bottom surface of the measuring object S makes contact with the inclination placement surface 402a. At this time, the top surface of the measuring object S is orthogonal to the optical axes A1, A2 of the light receiving units 120A, 120B.

When the image of the measuring object S is captured in the state of FIG. 41, the live image is displayed on the display unit 400 as the image of the measuring object S when the top surface of the measuring object S is seen from immediately above. Therefore, the user can observe the measuring object S with a feeling similar to when using a general microscope.

As described above, in the stage plate 142 of this example, the angle between the inclination placement surface 402a and the fixed placement surface 401a can be changed such that the inclination placement surface 402a is inclined with respect to the fixed placement surface 401a. This enables the user to selectively place the measuring object S on one of the inclination placement surface 402a and the fixed placement surface 401a. Accordingly, the attitude of the measuring object S can easily be changed. Additionally, the angle of the inclination placement surface 402a can appropriately be changed according to the measuring object S and the measurement point of the measuring object S. Accordingly, the convenience of the measurement of the measuring object S is improved.

[8] Region Information

As described above, in the measuring device 500 according to the present embodiment, the effective regions MR1, MR2 are the regions, which can be irradiated with the measurement light using the light projecting units 110A, 110B and in which the image of the region can be captured using the light receiving unit 120. Additionally, the effective region of the light receiving unit 120 may be set in consideration of the following points.

The effective region may be set such that the placement surface of the stage plate 142 of the stage 140 is removed. In this case, the effective region may be set according to the state of the inclination part 402 of the stage plate 142 in the configuration in which the inclination part 402 of the stage plate 142 can be switched between the horizontal attitude and the inclination attitude as illustrated in the examples of FIGS. 40A and 40B and FIG. 41. In these cases, the user can measure the measuring object S without considering the presence of the stage plate 142.

As illustrated in the examples of FIGS. 37 and 39, it is assumed that while the light shielding mechanism 600 is attached to the measuring unit 100, the rear light shielding member 650 and the front and side light shielding member 660 are attached to the rear cover member 610 and the front cover member 620, respectively. In this case, when the imaging visual field of the light receiving unit 120 is large, the image of the inner surface of the front and side light shielding member 660 is partially captured together with the measuring object S during the imaging of the measuring object S using the light receiving unit 120. Therefore, the effective region may be set so as to be located on the inner side of the front and side light shielding member 660, and such that the outer edge of the effective region comes close to the front and side light shielding member 660. This enables the effective region to be widely ensured on the inner side of the front and side light shielding member 660.

[9] Effects (1) In the measuring device 500 according to the present embodiment, the head unit 190 including the light projecting units 110A, 110B and the light receiving units 120A, 120B is fixedly coupled to the installation part 161. The measuring object S is placed on the stage 140 held by the installation part 161, and the light projecting units 110A, 110B irradiate the measuring object S with the measurement light having the pattern. The measurement light reflected by the measuring object S is received by the light receiving units 120A, 120B, and a light reception signal representing a light reception amount is output. The point cloud data representing the three-dimensional shape of the measuring object S is generated based on the light reception signal. The measurement value at the designated point is calculated based on the generated point cloud data.

When the ambient light other than the measurement light is reflected by the measuring object S and is incident on the light receiving units 120A, 120B, a noise component caused by the ambient light is included in the light reception signal output from the light receiving unit. In this case, the accuracy of the point cloud data is degraded.

According to the above configuration, the light shielding mechanism 600 provided above the space on the stage 140 including the effective regions MR1, MR2 blocks the ambient light from above the space on the stage 140. This enables the ambient light incident on the light receiving units 120A, 120B to be reduced without installing the measuring device 500 in the darkroom. Accordingly, the noise component caused by the ambient light is reduced, and the degradation of the accuracy of the point cloud data is suppressed. As a result, the high-accuracy measurement can easily be performed at low cost.

(2) As described above, the positional relationship between the light receiving units 120A, 120B and the predetermined effective regions MR1, MR2 on the stage 140 is uniquely fixed because the light projecting units 110A, 110B, the light receiving units 120A, 120B, and the stage 140 are integrally provided.

Therefore, in the processing of obtaining the point cloud data corresponding to the effective regions MR1, MR2 from the three-dimensional shape data generated through the data generation processing as the measurement data, the measurement data corresponding only to the effective regions MR1, MR2 can accurately be obtained based on the positional relationship between the light receiving units 120A, 120B and the effective regions MR1, MR2. The measurement value at the designated point is calculated based on the obtained measurement data.

The measurement data corresponding only to the effective regions MR1, MR2 does not include the point cloud data corresponding to the ineffective region. Therefore, the measurement value at the point designated by the user is not mistakenly calculated based on the point cloud data corresponding to the ineffective region. Additionally, even if the user mistakenly designates the point in the ineffective region as the point to be measured in the measuring object S, the point cloud data corresponding to the ineffective region is not used to calculate the measurement value. Accordingly, the calculation of an abnormal measurement value is prevented. As a result, the shape at the desired point of the measuring object S can easily and accurately be measured.

(3) In the measurement data generation processing, the measurement data is obtained according to the selection of either the obtainment of only the point cloud data corresponding to the effective regions MR1, MR2 as the measurement data or the obtainment of the pieces of point cloud data corresponding to the effective regions MR1, MR2 and the ineffective region as the measurement data.

In this case, by selecting the obtainment of the pieces of point cloud data corresponding to the effective regions MR1, MR2 and the ineffective region as the measurement data, the user can obtain the measurement value of the measuring object S as the target point in the ineffective region using the point cloud data corresponding to the ineffective region together with the point cloud data corresponding to the effective regions MR1, MR2. In the measuring object S, the measurement value of the portion existing in the ineffective region can be obtained.

(4) In the measurement data generation processing, when the region to be removed is designated, the point cloud data corresponding to the designated region is removed from the measurement data. In this case, the user can obtain the measurement data, in which the point cloud data corresponding to the designated region is removed, by designating the region to be removed. Therefore, the user can correct the once-obtained measurement data according to the measurement content. Accordingly, the convenience of the measurement of the measuring object S is improved.

(5) In the data generation processing, depending on the data generation condition, the image of the measuring object S is captured at a plurality of rotation positions while the stage 140 is rotated. In this case, because the rotation axis Ax of the stage 140 is not parallel to the optical axes A1, A2 of the light receiving units 120A, 120B, the point of the measuring object S oriented toward the light receiving units 120A, 120B changes by the rotation of the stage 140. The measuring object S is irradiated with the measurement light while the rotation position of the stage 140 varies, whereby the light receiving units 120A, 120B receive the light reflected at different points of the measuring object S.

Thus, when the imaging is performed at the plurality of rotation positions, the plurality of pieces of three-dimensional shape data corresponding to the plurality of rotation positions are generated. The plurality of pieces of three-dimensional shape data are generated, whereby the three-dimensional shape data is generated in the wide range of the outer surface of the measuring object S.

[10] Other Embodiments (1) In the above embodiment, the light shielding mechanism 600 is attached to the measuring unit 100. However, the present invention is not limited thereto. The light shielding mechanism 600 may be supported by a support different from the measuring unit 100.

(2) In the above embodiment, the rear light shielding member 650 and front and side light shielding member 660, which are laterally provided in the space on the stage 140, are attached to the light shielding mechanism 600. However, the present invention is not limited thereto. Alternatively, the rear light shielding member 650 and the front and side light shielding member 660 may be supported by a support different from the light shielding mechanism 600.

(3) In the above embodiment, the rear light shielding member 650 and the front and side light shielding member 660 are used to block the ambient light from all sides of the space on the stage 140. However, the present invention is not limited thereto. Alternatively, the configuration for blocking the ambient light from all sides of the space on the stage 140 may be achieved with a single member or at least three members.

(4) In the above embodiment, the effective region is set in each light receiving unit 120. However, the present invention is not limited thereto. A plurality of effective regions having different sizes may be set to one light receiving unit 120. In this case, the CPU 210 may receive the user selection of the effective region, and generate the measurement data based on the effective region selected by the user.

(5) In the above embodiment, the information indicating the effective region is previously stored in the storage device 240 as the region information at the time of shipment of the measuring device 500. However, the present invention is not limited thereto. For example, the region information may be edited by the user before the measurement of the measuring object S. In this case, the user can set the more appropriate region information according to the measurement content of the measuring object S. Therefore, the convenience of the measuring device 500 is improved.

(6) In the above embodiment, in the measuring unit 100 of the measuring device 500, the two light receiving units 120A, 120B that differ from each other in the magnification of the optical system is provided in order to capture the image of the measuring object S. However, the present invention is not limited thereto. In the measuring device 500, only one light receiving unit 120 may be provided as the configuration that captures the image of the measuring object S. In this case, the configuration of the measuring device 500 is further simplified.

(7) In the above embodiment, the monocular camera is used as the light receiving units 120A, 120B. A compound-eye camera may be used instead of or in addition to the monocular camera. Alternatively, a plurality of light receiving units 120A and a plurality of light receiving units 120B may be used to generate the three-dimensional shape data by a stereo method. In the above embodiment, the two light projecting units 110 are used. Alternatively, as long as the three-dimensional shape data can be generated, only one light projecting unit 110 may be used or at least three light projecting units 110 may be used.

In the case where the texture image data is obtained using the uniform measurement light from the light projecting unit 110, the illumination light output unit 130 and the illumination light source 320 do not need to be provided. The texture image data can be generated by the synthesis of the pieces of pattern image data. In this case, the illumination light output unit 130 and the illumination light source 320 do not need to be provided.

In the above embodiment, the pattern image data and the texture image data are obtained using the common light receiving units 120A, 120B. Alternatively, a light receiving unit that obtains the three-dimensional shape data and a light receiving unit that obtains the live image data and the texture image data may separately be provided.

In the above embodiment, the point cloud data is generated by the triangular distance measuring method. Alternatively, the point cloud data may be generated by other methods such as TOF (Time Of Flight).

(8) In the above embodiment, the magnification of the optical system does not change in the light receiving units 120A, 120B. However, the present invention is not limited thereto. A zoom lens may be provided as the optical system for each of the light receiving units 120A, 120B. In this case, the sizes of the effective regions MR1, MR2 corresponding to the light receiving units 120A, 120B may be changed according to the magnification of the zoom lens.

(9) In the above embodiment, the stage 140 is rotatable about the rotation axis Ax using the stage drive unit 146, and is not moved in other directions. However, the present invention is not limited thereto.

For example, the stage 140 may be movable in at least one of the X-direction, the Y-direction, and the Z-direction while being rotatable about the rotation axis Ax. In this case, the rotation position and position of the stage 140 can freely be changed while the measuring object S is placed on the stage 140 in the constant attitude. Accordingly, during the data generation processing, the image of the measuring object S can be captured from various directions. As a result, the three-dimensional shape data can be obtained in the wider range of the surface of the measuring object S.

[11] Correspondence Relationship Between Each Component of the Claims and Each Section of the Embodiment An example of a correspondence between each component of the claims and each section of the embodiment will be described below, but the present invention is not limited to the following examples.

In the above embodiment, the installation part 161 and the rotation mechanism 143 are examples of the stage holding unit, the measuring object S is an example of the measuring object, the stage 140 is an example of the stage, the light projecting units 110, 110A, 110B are examples of the light projecting unit, the light receiving units 120, 120A, 120B are examples of the light receiving unit, the head unit 190 is an example of the head unit, the stand 162 is an example of the coupling part, and the effective regions MR, MR1, MR2 and the space between the front cover member 620 in the closed state and the stage 140 are examples of the space on the stage.

The point cloud data generating unit 501 is an example of the point cloud data generating section, the measurement unit 504 is an example of the measuring section, the light shielding mechanism 600 is an example of the first light shielding member, the measuring device 500 is an example of the measuring device, the rear cover member 610 is an example of the second light shielding member, the rear light shielding member 650 and the front and side light shielding member 660 are examples of the third light shielding member, the ambient light determination device 710 is an example of the ambient light determining section, the speaker 720 and the alarm lamp 730 are examples of the report section, the accommodation part 670 is an example of the light shielding member accommodation part, the slit 660S is an example of the slit, and the imaging element 121a is an example of the monochrome imaging element.

The effective regions MR,MR1,MR2 are examples of the effective region, the storage device 240 is an example of the first and second storage section, the measurement data obtaining unit 502 is an example of the measurement data obtaining section, the operation unit 250, the display unit 400, and the receiving unit 505 are examples of the first receiving section, the operation unit 250, the display unit 400, and the receiving unit 505 are examples of the second receiving section, and the measurement data correcting unit 503 is an example of the measurement data correcting section.

The optical axes A1, A2 are examples of the optical axis of the light receiving unit, the rotation axis Ax is an example of the rotation axis, the rotation mechanism 143, the stage drive unit 146, and the rotation control unit 506 are examples of the rotation control section, the calibration board and the positional relationship calculating unit 507 are examples of the calculating section, the fixed placement surface 401a is an example of the first placement surface, and the inclination placement surface 402a is an example of the second placement surface.

Various components having the configuration or function described in the claims may be used as the components of the claims.

The present invention can be applied to various measuring devices that measure the measuring object.

What is claimed is:

1. A measuring device comprising:
a stage holding unit;
a stage rotatably held by the stage holding unit and on which a measuring object is placed the stage being rotatable about a rotation axis in a vertical direction;
a rotation control section that controls rotation of the stage;
a head unit including a light projecting unit and a light receiving unit, the light projecting unit irradiating the measuring object within a space on the stage with measurement light having a pattern, the light receiving unit receiving the measurement light reflected by the measuring object and outputting a light reception signal representing a light reception amount;
a coupling part that fixedly couples the head unit and the stage holding unit, wherein the measurement light is guided obliquely downward from the light projecting unit to the space on the stage, and the light receiving unit receives the measurement light reflected by the measuring object along an optical axis extending obliquely downward to the space on the stage;
a point cloud data generating section that generates point cloud data representing a three-dimensional shape of the measuring object within the space on the stage based on the pattern of the measurement light and the light reception signal output from the light receiving unit at a first rotation position of the stage controlled by the rotation control section;
a measuring section that receives designation of a point to be measured in the measuring object and calculates a measurement value at the designated point based on the point cloud data generated by the point cloud data generating section; and
a first light shielding member, coupled to the head unit, that is provided across the rotation axis and above the space on the stage so as to block ambient light toward the space on the stage from above the space on the stage, and so as not to block the measurement light, the space being defined on the stage so as to include the measuring object,
wherein the head unit including the light projecting unit and the light receiving unit is supported on the coupling part and is disposed at a position offset from the rotation axis in a first direction orthogonal to the rotation axis, and the point cloud data represent the three-dimensional shape of the measuring object measured obliquely from an oblique angle between the rotation axis and the first direction.

2. The measuring device according to claim 1, wherein the first light shielding member can switch between a closed state in which the space on the stage is covered from above and an open state in which the space on the stage is not covered from above.

3. The measuring device according to claim 1, wherein the first light shielding member includes a second light shielding member provided on at least one side of the space on the stage so as to block the ambient light from one side of the space on the stage, and so as not to block the measurement light.

4. The measuring device according to claim 1, further comprising a third light shielding member formed to surround a whole periphery of the space on the stage so as to block the ambient light from all sides of the space on the stage, and so as not to block at least part of the measurement light.

5. The measuring device according to claim 4, further comprising:
   an ambient light determining section that determines whether the ambient light has entered the space on the stage; and
   a report section that reports the entry of the ambient light when the ambient light determining section determines that the ambient light has entered the space on the stage.

6. The measuring device according to claim 4, wherein the third light shielding member has a bellows shape that is vertically expandable and contractible.

7. The measuring device according to claim 6, wherein the first light shielding member includes a light shielding member accommodation part that accommodates at least part of the third light shielding member.

8. The measuring device according to claim 4, wherein the third light shielding member is made of a flexible material, and includes a vertically extending slit.

9. The measuring device according to claim 1, wherein the first light shielding member is configured to be detachably attached to the coupling part.

10. The measuring device according to claim 1, wherein the light receiving unit includes a monochrome imaging element constituted by a plurality of pixels having a common sensitivity characteristic.

11. The measuring device according to claim 1, further comprising:
   a first storage section that stores region information for distinguishing a predetermined effective region and an ineffective region other than the effective region from each other with respect to the space on the stage;
   a measurement data obtaining section that performs first obtaining processing, in which the point cloud data corresponding to the effective region is obtained as the measurement data from three-dimensional shape data based on the region information stored in the first storage section, the three-dimensional shape data being generated by the point cloud data generating section; and
   a first receiving section that receives selection as to whether the first obtaining processing is performed,
   wherein the measurement data obtaining section performs second obtaining processing, in which the point cloud data corresponding to the effective region and the point cloud data corresponding to the ineffective region are obtained as the measurement data from the three-dimensional shape data generated by the point cloud data generating section, when the selection is made that the first obtaining processing is not performed, and
   the measuring section calculates the measurement value at the designated point based on the measurement data obtained through the first or second obtaining processing.

12. The measuring device according to claim 11, further comprising:
   a second receiving section that receives designation of a region to be removed in a region corresponding to the measurement data obtained by the measurement data obtaining section; and
   a measurement data correcting section that removes, when the region to be removed is designated, the point cloud data corresponding to the designated region from the measurement data obtained by the measurement data obtaining section.

13. The measuring device according to claim 1, wherein the point cloud data generating section generates first three-dimensional shape data as the point cloud data based on a light reception signal output from the light receiving unit when the stage is located at a first rotation position, and generates second three-dimensional shape data as the point cloud data based on a light reception signal output from the light receiving unit when the stage is located at a second rotation position, to synthesize the first three-dimensional shape data and the second three-dimensional shape data.

14. The measuring device according to claim 13, wherein the head unit is configured to be detachably attached to the coupling part,
the measuring device further comprises:
   a calculating section that calculates a positional relationship between the rotation axis of the stage and the light receiving unit in a state where the head unit is attached to the coupling part; and
   a second storage section that stores the positional relationship calculated by the calculating section, and
   the point cloud data generating section synthesizes the first three-dimensional shape data and the second three-dimensional shape data based on the positional relationship stored in the second storage section.

15. The measuring device according to claim 1, wherein the stage includes first and second placement surfaces on which the measuring object can be placed, and the stage is configured such that an angle between the first and second placement surfaces is changeable.

* * * * *